United States Patent
Bidaux

(10) Patent No.: US 11,293,784 B2
(45) Date of Patent: *Apr. 5, 2022

(54) MAGNETIC POSITION SENSOR SYSTEM AND METHOD

(71) Applicant: Melexis Technologies SA, Bevaix (CH)

(72) Inventor: Yves Bidaux, Yverdon-les-Bains (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 59 days.

This patent is subject to a terminal disclaimer.

(21) Appl. No.: 16/867,721

(22) Filed: May 6, 2020

(65) Prior Publication Data
US 2021/0348945 A1    Nov. 11, 2021

(51) Int. Cl.
*G01D 5/14* (2006.01)
*H01F 7/02* (2006.01)

(52) U.S. Cl.
CPC ............... *G01D 5/145* (2013.01); *H01F 7/02* (2013.01)

(58) Field of Classification Search
CPC .................................. G01D 5/145; H01F 7/02
See application file for complete search history.

(56) References Cited

U.S. PATENT DOCUMENTS

| | | | |
|---|---|---|---|
| 11,092,461 B2 * | 8/2021 | Bidaux | G01D 5/145 |
| 2011/0291645 A1 | 12/2011 | Franke et al. | |
| 2012/0084051 A1 | 4/2012 | Hackner et al. | |
| 2013/0099777 A1 | 4/2013 | Heberle | |
| 2015/0115940 A1 | 4/2015 | Haible | |
| 2016/0069708 A1 | 3/2016 | Ausserlechner | |
| 2017/0241802 A1 | 8/2017 | Ausserlechner | |
| 2019/0346285 A1 | 11/2019 | Kimmerle | |

FOREIGN PATENT DOCUMENTS

| | | |
|---|---|---|
| EP | 3457155 A1 | 3/2019 |
| WO | 2014029885 A1 | 2/2014 |
| WO | 2018122283 A1 | 7/2018 |

OTHER PUBLICATIONS

Nara et al., "A Closed-Form Formula for Magnetic Dipole Localization by Measurement of Its Magnetic Field and Spatial Gradients," IEEE Transactions on Magnetics, vol. 42, No. 10, Oct. 2006, pp. 3291-3293.

* cited by examiner

*Primary Examiner* — Clayton E. LaBalle
*Assistant Examiner* — Michael A Harrison
(74) *Attorney, Agent, or Firm* — Workman Nydegger

(57) ABSTRACT

A position sensor system for determining a position of a sensor device relative to a magnetic structure, the system comprising: said magnetic structure comprising a plurality of poles; said sensor device comprising a plurality of magnetic sensors; the magnetic structure being movable relative to the sensor device, or vice versa; wherein: a distance between centres of adjacent poles varies along the movement direction; the sensor device is adapted: for determining a first magnetic field component parallel to, and a second magnetic field component perpendicular to a movement direction, and for calculating a fine signal based on a ratio of the first and second magnetic field component; and for determining a coarse signal based on components and/or gradients; and for determining said position based on the coarse signal and the fine signal.

15 Claims, 25 Drawing Sheets

Bx w.r.t. magnet = Bx (in-plane) w.r.t. sensor device
Bz w.r.t. magnet = Bz (out-of-plane) w.r.t. sensor device Bx w.r.t. magnet = Bu (in-plane) w.r.t. sensor device
Bz w.r.t. magnet = Bv (in-plane) w.r.t. sensor device
By w.r.t. magnet = Bw (out-of-plane) w.r.t. sensor device Circumferential w.r.t. magnet = Bu (in-plane) w.r.t. sensor device
Radial w.r.t. magnet = Bv (in-plane) w.r.t. sensor device
Axial w.r.t. magnet = Bw (out-of-plane) w.r.t. sensor device Circumferential w.r.t. magnet = Bu (in-plane) w.r.t. sensor device
Radial w.r.t. magnet = Bw (out-of-plane) w.r.t. sensor device
Axial w.r.t. magnet = Bv (in-plane) w.r.t. sensor device

Example with 4 Horizontal Hall and 2 Integrated Magn Concentrators

Example with 2 Horizontal Hall and 2 Vertical Hall elements

Example with only 1 Integrated Magn Concentrator + 2 Hor Hall

Example with only 1 Horizontal and only 1 Vertical Hall element

Example with 6 Horizontal Hall and 3 Integrated Magn Concentrators

Example with 3 Horizontal Hall and 3 Vertical Hall elements

Example with 8 Horizontal Hall and 2 Integrated Magn Concentrators

Example with 4 Vertical Hall elements

Example with only 1 IMC + 4 Horizontal Hall

Example with only 2 Vertical Hall elements

FIG 15          1500

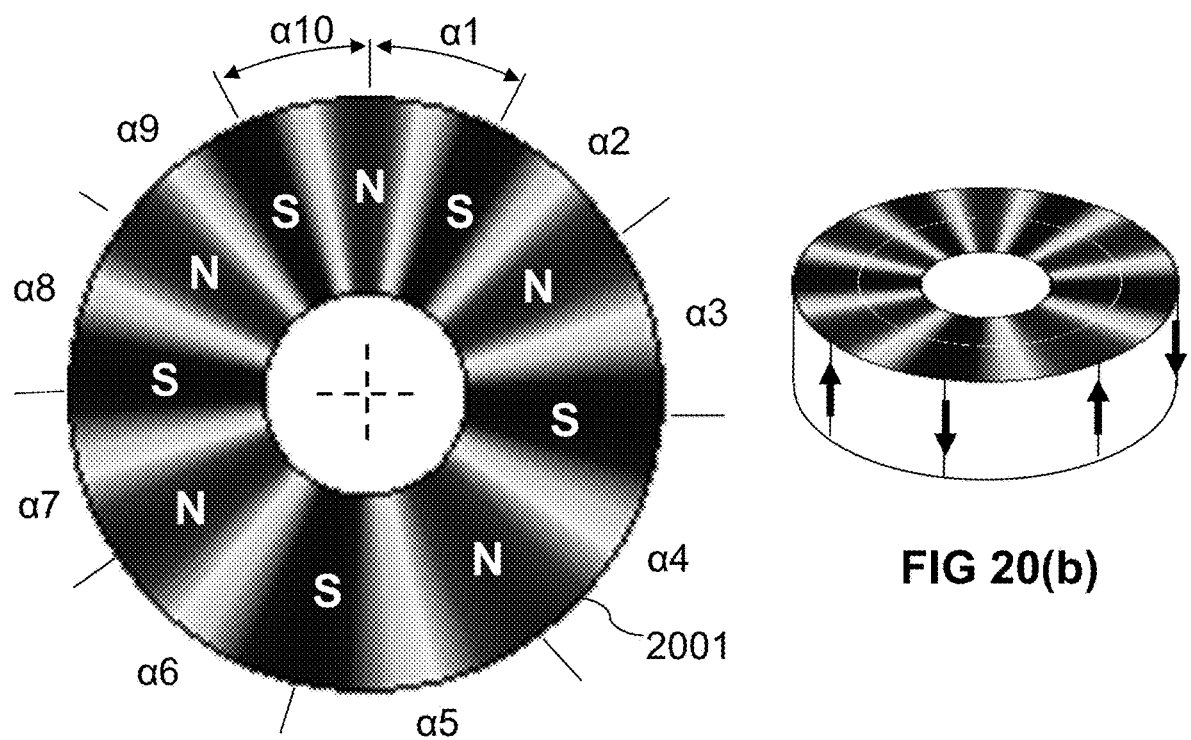
FIG 20(a)
FIG 20(b)
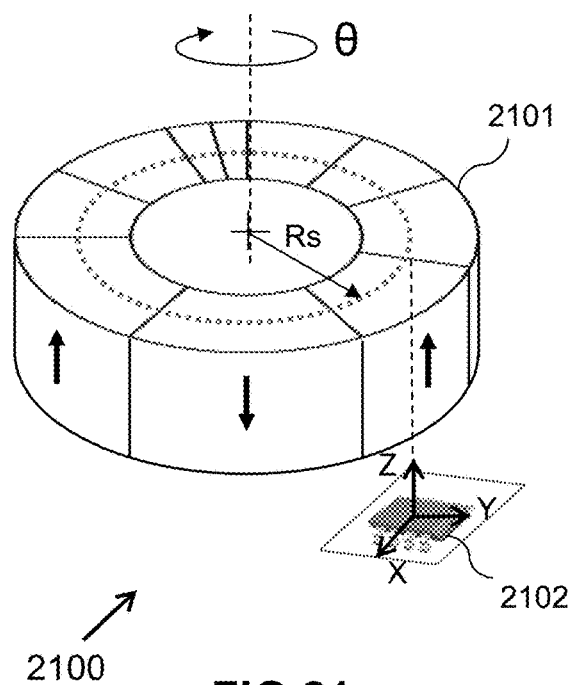
FIG 21

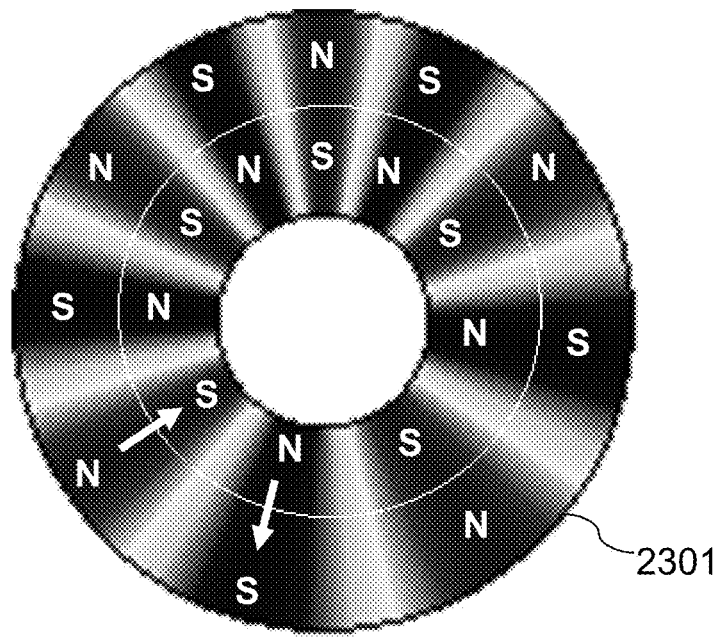
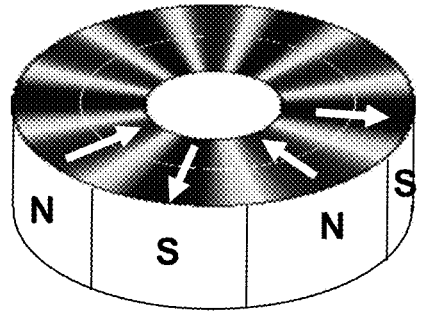
FIG 23(b)
FIG 23(a)
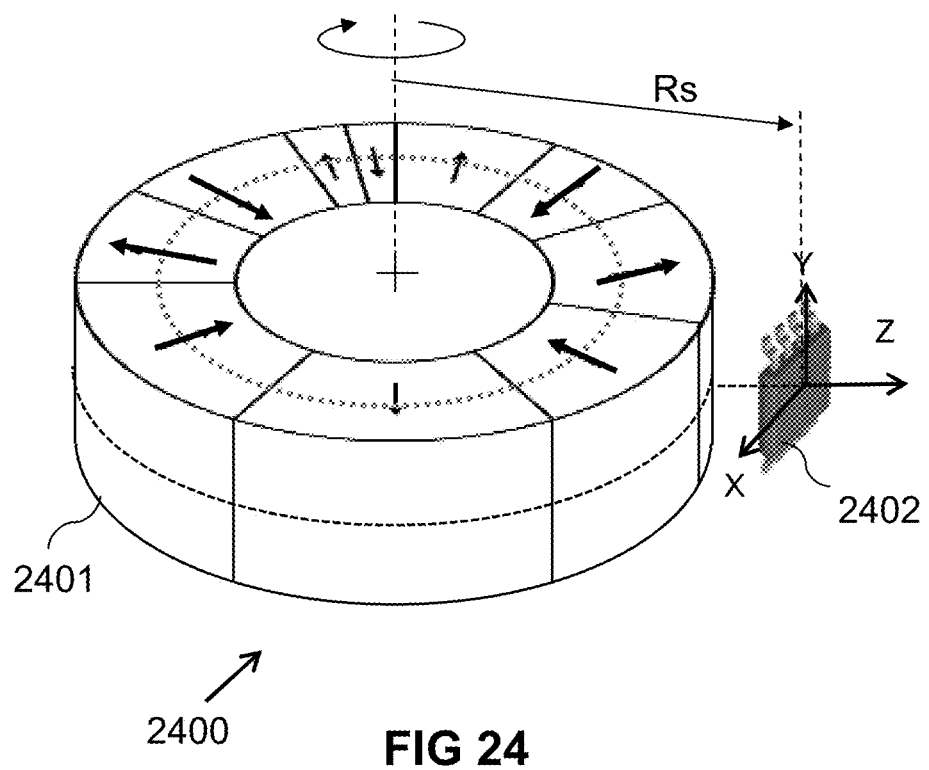
FIG 24

MAGNETIC POSITION SENSOR SYSTEM AND METHOD

FIELD OF THE INVENTION

The present invention relates in general to the field of magnetic position sensor systems, and more in particular to a position sensor system for determining a position over a relatively large range with relatively high accuracy. The present invention also relates to a method of determining such position.

BACKGROUND OF THE INVENTION

Magnetic sensor systems, in particular linear position sensor systems and angular position sensor systems are known in the art. They offer the advantage of being able to measure a linear or angular position without making physical contact, thus avoiding problems of mechanical wear, scratches, friction, etc.

Many variants of position sensor systems exist, solving one or more of the following requirements: using a simple or cheap magnetic structure, using a simple or cheap sensor device, being able to measure over a relatively large range, being able to measure with great accuracy, requiring only simple arithmetic, being able to measure at high speed, being highly robust against positioning errors, being highly robust against an external disturbance field, providing redundancy, being able to detect an error, being able to detect and correct an error, having a good signal-to-noise ratio (SNR), etc.

Often two or more of these requirements conflict with each other, hence a trade-off needs to be made. A typical example is the trade-off between a large measurement range and high accuracy.

There is always room for improvements or alternatives.

SUMMARY OF THE INVENTION

It is an object of embodiments of the present invention, to provide a position sensor system and a method of determining a position of a sensor device relative to a magnetic structure.

It is also an object of embodiments of the present invention to provide a specific magnetic structure and a specific sensor device which can be used in such a position sensor system.

It is a particular object of embodiments of the present invention, to provide a position sensor system having a relatively large measurement range and a relatively high accuracy, and to a method of determining a position having the same properties.

It is an object of embodiments of the present invention, to provide a position sensor system and method which requires only relatively simple arithmetic (such as for example addition, subtraction, multiplication, division, a look-up table, interpolation) that can be performed on a simple micro-controller, but not including a Discrete Fourier-Transform (DFT) or Fast Fourier Transform (FFT) which typically requires a Digital Signal Processor (DSP), and typically also requires considerably more RAM.

It is an object of particular embodiments of the present invention to provide such a position sensor system having a reduced number of sensor elements.

These objectives are accomplished by a position sensor system and by a method for determining a position (e.g. a linear or angular position) according to embodiments of the present invention.

According to a first aspect, the present invention relates to a position sensor system for determining a position of a sensor device relative to a magnetic structure, the system comprising: said magnetic structure comprising a plurality of poles; said sensor device comprising at least two sensor elements located at a first sensor location; the magnetic structure being movable relative to the sensor device in a movement direction or along a movement trajectory, or vice versa; wherein a distance between centres of adjacent poles of the magnetic structure varies along the movement direction or along the movement trajectory; and wherein the sensor device is adapted: a) for measuring at said first sensor location a first magnetic field component oriented in a first direction substantially parallel to said movement direction or tangential to said movement trajectory, and a second magnetic field component oriented in a second direction substantially perpendicular to the first direction; b) for determining a fine signal based on a ratio of said first and said second magnetic field component; c) for calculating a coarse signal based on said first and second magnetic field component; and d) for determining said position based on both the coarse signal and the fine signal.

The sensor device may comprise a semiconductor substrate, and the sensors may be embedded in said semiconductor substrate. The substrate may have a rectangular shape.

The coarse signal is indicative of the relative position in a first range (e.g. in an overall range). The fine signal is indicative of the relative position in a second range which is a subset of the first range.

It is an advantage of this position sensor system that it uses a combination of a coarse signal and a fine signal, because in this way the fine granularity (high accuracy) can be combined with a large range.

It is an advantage of this position sensor system that the position can be determined using a relatively simple controller and does not require a powerful processor, such as a Digital Signal Processor (DSP), because the mathematics required for determining the position can for example be based on basic operations like additions, subtractions, multiplications, divisions, a goniometric function and/or a look-up table, but does not require for example a Discrete Fourier Transform (DFT). It is noted that also the goniometric function itself can be performed using a look-up table, and optional interpolation.

It is an advantage of this position sensor system that the fine signal and the coarse signal contain at least some redundancy, which can be used to detect an error condition.

It is an advantage of this position sensor system that the position of the sensor device relative to the magnetic structure can be uniquely determined without first having to move to a "known position", e.g. after power-ON.

In an embodiment, the fine signal is determined in accordance with the following formula: $Sf = \arctan(Bx1/Bz1)$, wherein Sf is the fine signal, Bx1 is the first magnetic field component oriented in the first direction, Bz1 is the second magnetic field component oriented in the second direction.

In preferred embodiments, the sensor device is a semiconductor chip containing a semiconductor substrate comprising said plurality of magnetic sensors.

In an embodiment (see e.g. FIGS. 1(a) to 1(c), FIGS. 3(a) to 3(d), FIG. 12, FIGS. 18(a) and 18(b), FIG. 21, FIG. 24), the sensor device is oriented such that the semiconductor substrate is oriented perpendicular to the direction of the remanent magnetic field of the magnetic structure. A coordinate axis system with three orthogonal axes X,Y,Z can be defined which is fixed to the sensor device, wherein the substrate plane defines the XY-plane. The X-direction may be oriented in the movement direction, and the remanent magnetic field may be oriented parallel to the Z-axis, thus perpendicular to the semiconductor substrate.

In another embodiment (see e.g. FIGS. 2(a) and 2(b), FIGS. 4(a) to 4(d), FIG. 13), the sensor device is oriented such that the semiconductor substrate is oriented parallel to the direction of the remanent magnetic field of the magnetic structure. A coordinate axis system with three orthogonal axes U,V,W can be defined which is fixed to the sensor device, wherein the substrate plane defines the UV-plane. The U-direction may be oriented in the movement direction, and the remanent magnetic field may be oriented parallel to the V-axis, thus parallel to the semiconductor substrate.

In an embodiment, the magnetic structure has a substantially flat surface or a substantially planar surface (e.g. a surface without grooves) facing the sensor device.

In an embodiment, the magnetic structure has a non-planar surface (e.g. a surface with grooves) facing the sensor device.

In an embodiment, the orientation of the remanent magnetic field inside the magnetic structure is substantially parallel to the second direction.

In an embodiment, the sensor device is movably arranged relative to the magnetic structure at a substantially constant distance from the magnetic structure.

In an embodiment, the magnetic structure comprises at least four, or at least five, or at least six pole pairs. What is meant is that the sensor device is adapted for facing at least four, or at least five, etc. poles when moving along its trajectory, but the magnet itself may have for example four axially magnetized pole pairs, only one of which poles (of each pair) can be "seen" by the sensor device.

In an embodiment, the magnetic structure is an assembly of a plurality of discrete permanent magnets.

In an embodiment, the magnetic structure comprises a monolithic magnetic material which is magnetized so as to have multiple poles oriented in opposite directions.

In an embodiment, the magnetic structure has an (overall) elongated shape having a longitudinal axis, e.g. having a substantially linear shape. This is referred to as "a linear position sensor system", in which case the sensor device may be adapted for moving relative to the magnetic structure along a trajectory coinciding with or substantially parallel to said longitudinal axis.

In an embodiment, the magnetic structure has a curved shape having a curved axis (e.g. circular, spiral, elliptical, parabolic, etc). This is referred to as an "angular position sensor system", in which case the sensor device may be adapted for moving relative to the magnetic structure along a trajectory coinciding with or located at a substantially constant distance from said curved axis. The curved axis may but need not necessarily be closed. It can for example be a circle segment or an arc segment.

In an embodiment, the remanent magnetic field inside the magnetic material is oriented substantially perpendicular to the first (e.g. linear or curved) axis. In other words, in this embodiment, the remanent magnetic field is (locally) oriented perpendicular to the direction of (local) relative movement.

In an embodiment, said distance between centres of adjacent poles varies strict monotonically along said longitudinal or linear or curved axis, or along a periphery of the magnet (e.g. circular magnet).

In other words, when moving from a start position of the magnetic structure to an end position, the distance between centres of the poles increases or decreases for each new pole encountered.

It is an advantage of this embodiment that the position of the sensor device relative to the magnetic structure is uniquely defined by the two signals (the coarse and the fine signal).

It is an advantage of this position sensor system that a rough position indication can be quickly determined based on the coarse signal alone, if required or desired.

In an embodiment, the sensor device is configured for measuring only two orthogonal magnetic field components at a single sensor location, and for deriving the coarse signal and the fine signal based on only these two orthogonal components. Optionally temperature and/or stress or other parameters are taken into account, but not on other magnetic field components or gradients.

In an embodiment, the sensor device comprises only one integrated magnetic concentrator and only two horizontal Hall elements, including a first and a second horizontal Hall element arranged on opposite sides of the magnetic concentrator.

In an embodiment, the sensor device comprises only one integrated magnetic concentrator and only four horizontal Hall elements, arranged at a periphery of the magnetic concentrator and spaced apart by approximately 90°.

In an embodiment, the sensor device comprises only one horizontal Hall element and only one vertical Hall element, arranged at substantially a single sensor location. For example, spaced apart by less than 400 nm, or less than 300 nm, or less than 250 nm, or less than 200 μm.

In an embodiment, the sensor device comprises only two vertical Hall element, arranged at substantially a single sensor location, and oriented with their axes of maximum sensitivity in two orthogonal directions. For example, spaced apart by less than 400 nm, or less than 300 nm, or less than 250 nm, or less than 200 μm.

In an embodiment, the sensor device comprises a first integrated magnetic concentrator and a first and a second horizontal Hall element arranged on opposite sides of the first magnetic concentrator; and a second integrated magnetic concentrator located at a predefined distance from the first magnetic concentrator, and a third and a fourth horizontal Hall element arranged on opposite sides of the second magnetic concentrator; the first, second, third and fourth horizontal Hall element being collinear.

Such a sensor device can e.g. measure Bx1, Bz1 at the first sensor location, and Bx2, Bz2 at the second sensor location, from which optionally a gradient dBx/dx and a gradient dBz/dx can be derived, for example as shown in FIGS. 1(a) to 1(c).

In an embodiment, the sensor device comprises a first integrated magnetic concentrator and a first group of four horizontal Hall element arranged near an edge of the first integrated magnetic concentrator, e.g. 90° angularly spaced apart; and a second group of four horizontal Hall elements arranged near an edge of the second integrated magnetic concentrator, e.g. 90° angularly spaced apart; the second IMC located at a predefined distance ΔX from the first magnetic concentrator.

Such a sensor device can measure Bu1, Bv1 at the first sensor location, and Bu2, Bv2 at the second sensor location, from which optionally a gradient dBu/du and a gradient dBv/du can be derived, for example as shown in FIGS. 2(a) and 2(b).

In an embodiment, the sensor device comprises two horizontal Hall elements spaced over a first distance in the first direction; and comprises two vertical Hall elements spaced over a second distance in the first direction.

The first distance may be equal to the second distance, but that is not absolutely required. The horizontal Hall elements are adapted to measure a magnetic field vector Bz oriented in a direction perpendicular to the sensor plane, at two different locations. The two vertical Hall elements are adapted to measure a magnetic field vector Bx oriented in a direction parallel to the sensor plane, at two different locations. From these signals, optionally a gradient dBx/dx and a gradient dBz/dx can be calculated.

In an embodiment, the sensor device is adapted for determining said position by determining a plurality of at least two candidate positions based on the fine signal, and then selecting one of these candidate positions based on the coarse signal, for one deviating least from the coarse signal.

According to a second aspect, the present invention also provides a method of determining a position of a sensor device relative to a magnetic structure having a plurality of poles, said sensor device comprising at least two sensor elements located at a first sensor location, the magnetic structure being movable relative to the sensor device in a movement direction or along a movement trajectory, or vice versa; wherein a distance between centres of adjacent poles of the magnetic structure varies along the movement direction or along the movement trajectory; and wherein the method comprises the steps of: a) measuring at said first sensor location a first magnetic field component oriented in a first direction substantially parallel to said movement direction or tangential to said movement trajectory, and a second magnetic field component oriented in a second direction substantially perpendicular to the first direction; b) determining a fine signal based on a ratio of said first and second magnetic field component measured at said first sensor location; c) calculating a coarse signal based on at least said first and second magnetic field component; and d) determining said position based on both the coarse signal and the fine signal.

In an embodiment, the method comprises the steps of: a) measuring at a first sensor location a first magnetic field component oriented in a first direction, and a second magnetic field component oriented in a second direction perpendicular to the first direction; b) determining a fine signal based on a ratio of said first and second magnetic field component measured at the first sensor location; c) determining a coarse signal based on (e.g. based solely on) said first and second magnetic field component; d) determining the position based on both the coarse signal and the fine signal.

In an embodiment, the method comprises the steps of: a) measuring at a first sensor location, a first magnetic field component oriented in a first direction, and a second magnetic field component oriented in a second direction perpendicular to the first direction; b) determining a first fine signal based on a first ratio of the first and second magnetic field component measured at the first sensor location; c) measuring at a second sensor location, spaced from the first sensor location in the first direction, a third magnetic field component parallel with the first magnetic field component, and a fourth magnetic field component parallel with the second magnetic field component; d) determining a second fine signal based on a second ratio of said third and fourth magnetic field component measured at said second location; e) determining a coarse signal based on said first and second fine signal; f) determining a third fine signal as the first fine signal, or as the second fine signal, or as a sum or average or weighted average of the first and the second fine signal; g) determining the position based on both the coarse signal and the third fine signal.

In an embodiment, the method comprises the steps of: a) measuring at a first sensor location, a first magnetic field component oriented in a first direction, and a second magnetic field component oriented in a second direction perpendicular to the first direction; b) determining a first fine signal based on a first ratio of said first and second magnetic field component measured at the first location; c) measuring at a second sensor location, spaced from the first sensor location in the first direction, a third magnetic field component parallel with the first magnetic field component, and a fourth magnetic field component parallel with the second magnetic field component; d) optionally determining a second fine signal based on a second ratio of the third and fourth magnetic field component measured at the second location; e) calculating a first gradient along the first direction based on the first and third magnetic field component, and calculating a second gradient along the first direction based on the second and fourth magnetic field component; f) determining a coarse signal based on at least some of said magnetic field components and/or said magnetic field gradients; g) determining a third fine signal as the first fine signal, or as the second fine signal, or as a sum or average or weighted average of the first and the second fine signal; h) determining the position based on both the coarse signal and the third fine signal.

In an embodiment, the method comprises the steps of: a) measuring three first magnetic field components oriented in a first direction at three different locations spaced apart along said first direction, and calculating two first gradients of these first magnetic field components; b) measuring three magnetic field components oriented in a second direction perpendicular to the first direction at said three different locations, and calculating two second gradients of these second magnetic field components; c) calculating a coarse signal based on these gradients; d) calculating a fine signal based on one or more ratio, each ratio being a division of a first magnetic field component and a corresponding second magnetic field component measured at the same location as the first magnetic field component; e) determining said position based on the coarse signal and the fine signal.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 3(a) shows the sensor system in top view, FIG. 3(b) and FIG. 3(c) show the sensor system in side view, when looking in the Y-direction or from the X-direction respectively. FIG. 3(d) shows an coordinate system U,V,W connected to the sensor device.

FIG. 20(a) and FIG. 20(b) show an axially magnetized ring magnet, in top view and perspective view respectively, which can be seen as a variant of the ring magnet shown in FIGS. 3(a) to 3(d). The distances between adjacent poles of the ring magnet increase in a first portion and decrease in a second portion of the ring magnet.

FIG. 21 shows an angular position sensor system according to an embodiment of the present invention, comprising an axially magnetized magnet like the one shown in FIGS. 20(a) and 20(b), and a position sensor device located offset from the rotation axis, facing an annular bottom surface of the magnet.

FIG. 23(a) and FIG. 23(b) show a radially magnetized ring magnet, in top view and perspective view respectively, which can be seen as a variant of the ring magnet shown in FIGS. 3(a) to 3(d) and FIGS. 20(a) to 20(b). The distances between adjacent poles of the ring magnet increase in a first portion and decrease in a second portion of the ring magnet.

FIG. 24 shows an angular position sensor system according to an embodiment of the present invention, comprising a radially magnetized magnet like the one shown in FIGS.

Figure 1A:
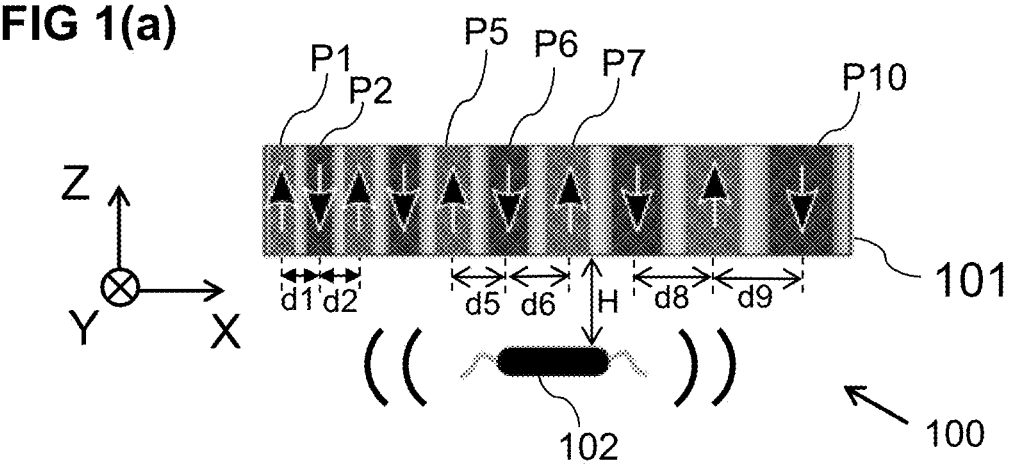
FIG. 1(a) to FIG. 1(c) illustrate an exemplary linear position sensor system according to an embodiment of the present invention.

23(a) and 23(b), and a position sensor device located outside of the magnet, facing a cylindrical side surface of the ring magnet.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, the function sqrt(·) means the square root function.

In this document, the "multiplicative inverse" or "reciprocal" of a function f(x) is 1/f(x).

In this document, unless explicitly mentioned otherwise, the term "magnetic sensor device" or "sensor device" refers to a device comprising at least one magnetic "sensor element". The sensor device may be comprised in a package, also called "chip", although that is not absolutely required.

In this document, the term "sensor element" or "magnetic sensor element" or "sensor" can refer to a component or a group of components or a sub-circuit or a structure capable of measuring a magnetic quantity, such as for example a magneto-resistive element, an XMR element, a horizontal Hall plate, a vertical Hall plate, a Wheatstone-bridge containing at least one (but preferably four) magneto-resistive elements, etc.

In this document, the expression "in-plane components of a vector" and "projection of the field component in the sensor plane" mean the same. Examples are the Bx component in FIGS. 1(a) to 1(c); and the Bu and Bv component in FIGS. 2(a) and 2(b), etc.

In this document, the term "sensor plane" refers to the plane defined by the semiconductor substrate containing the sensor elements.

In this document, the expression "out-of-plane component of a vector" and "projection of the field component on an axis perpendicular to the sensor plane" mean the same. An example is the Bz component in FIGS. 1(a) to 1(c); and the Bw component of FIGS. 2(a) and 2(b).

In this document, the expression "spatial derivative" or "derivative" or "spatial gradient" or "gradient" are used as synonyms, unless clear from the context that something else was meant. In this document, the gradient of a component is taken along the direction of movement, or the relative direction of movement, for example d/dx in FIGS. 1(a) to 1(c), d/du which is equal to d/dx in FIGS. 2(a) and 2(b), d/du in a circumferential direction, i.e. a direction tangential to a circular path in FIGS. 3(a) to 3(d) and FIGS. 4(a) to 4(d).

In the context of the present invention, the formulas arctan(x/y), atan 2(x,y), arccot(y/x) are considered to be equivalent.

It is an object of the present invention, to provide a position sensor system and a method of determining a position of a sensor device relative to a magnetic structure.

The present invention provides a position sensor system comprising: a magnetic structure comprising a plurality of poles (e.g. at least four poles, or at least six poles), and a sensor device comprising a plurality of magnetic sensor elements. The magnetic structure is movable relative to the sensor device in a movement direction or along a movement trajectory, or the sensor device is movable relative to the magnetic structure in a movement direction or along a movement trajectory. A distance between centres of adjacent poles of the magnetic structure varies along the movement direction or the movement trajectory. The sensor device is adapted for measuring one or more first (e.g. in-plane) magnetic field components oriented in a first direction parallel to said movement direction or tangential to said movement trajectory, and one or more second (e.g. in-plane or out-of-plane) magnetic field components oriented in a second direction perpendicular to the first direction, and for calculating a fine signal "Sf" and a coarse signal "Sc" based on the measured signals, and for determining the position (e.g. linear or angular position) of the sensor device relative to the magnetic structure based on the coarse signal "Sc" and the fine signal "Sf".

Several ways of determining the fine signal Sf and the coarse signal Sc are possible, as can be appreciated for example from the following tables (table 1A, table 1B):

As can be seen, in all of these cases, the fine signal Sf is determined as a function of one or more ratios R1, R2, R3. Each ratio is a ratio of two orthogonal magnetic field components measured at a particular location. For example, the first ratio R1 is a division of two magnetic field components (e.g. Bx1, Bz1), both measured at the first sensor location (e.g. X1). Likewise, the second ratio R2 is a division of two magnetic field components (e.g. Bx2, Bz2) both measured at the second sensor location (e.g. X2). Likewise, the third ratio R3 is a division of two magnetic field components (e.g. Bx3, Bz3) both measured at the third sensor location (e.g. X3).

With "both measured at the same sensor location" is meant in practice that the sensor elements need to be located at a distance smaller than about 400 μm (micron), preferably smaller than 300 μm, or smaller than 250 μm, or smaller than 200 μm).

TABLE 1A (several possibilities for determining coarse and fine signal)

Figure 14:
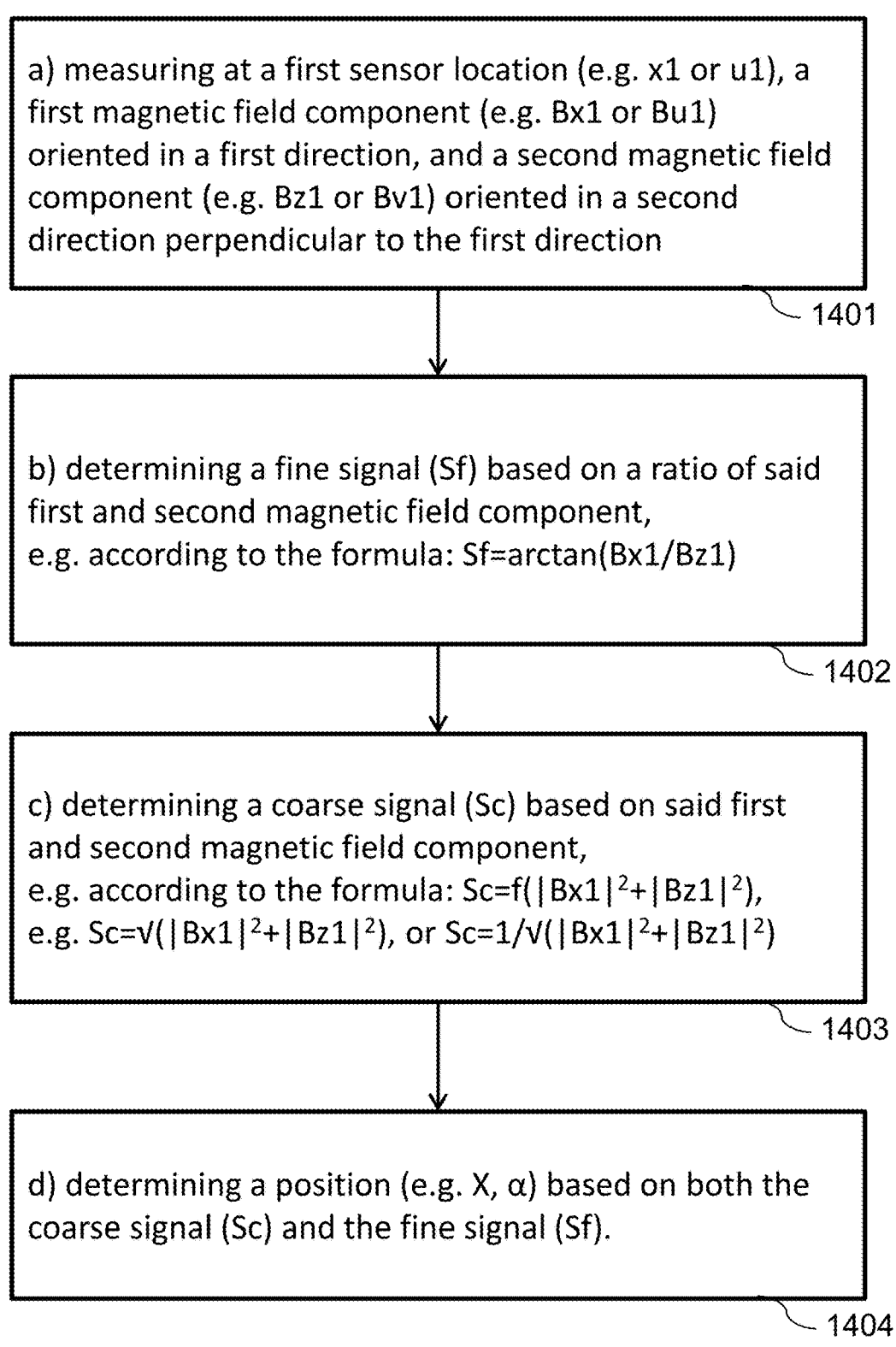
FIG. 14 illustrates a first method of determining a position of a sensor device relative to a magnetic structure, according to an embodiment of the present invention.
Figure 15:
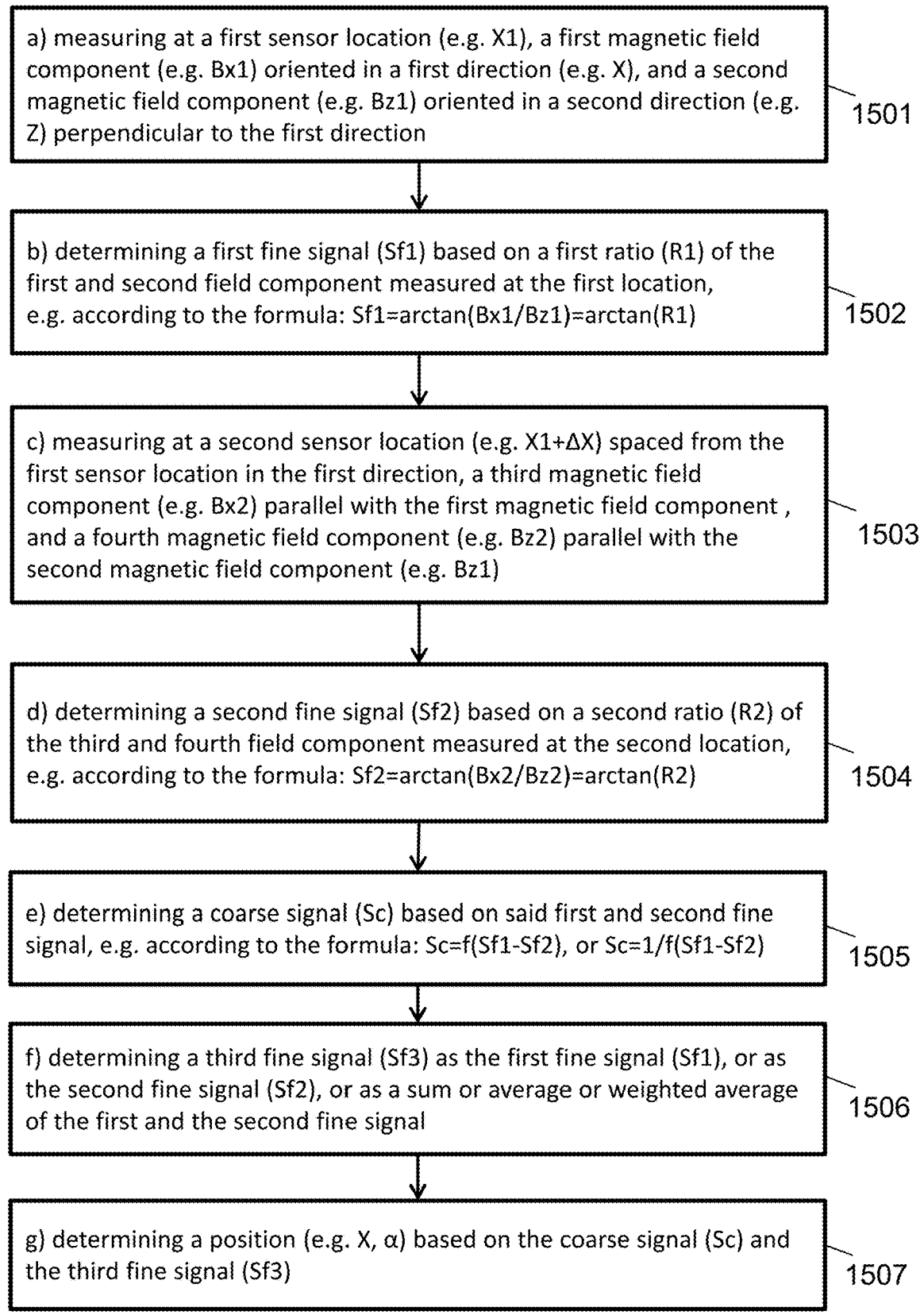
FIG. 15 illustrates a second method of determining a position of a sensor device relative to a magnetic structure, according to an embodiment of the present invention.
Figure 16:
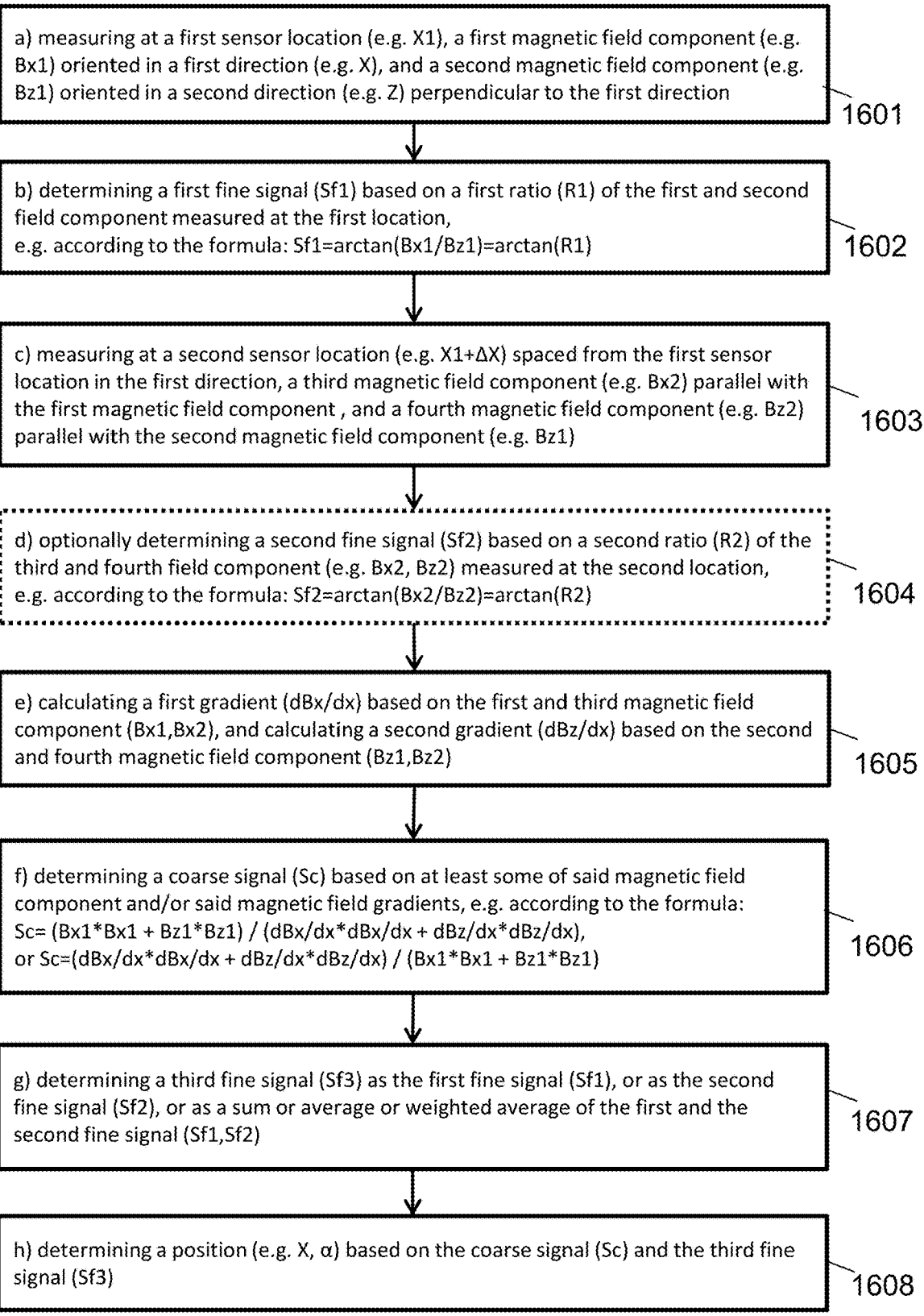
FIG. 16 illustrates a third method of determining a position of a sensor device relative to a magnetic structure, according to an embodiment of the present invention.
Figure 17:
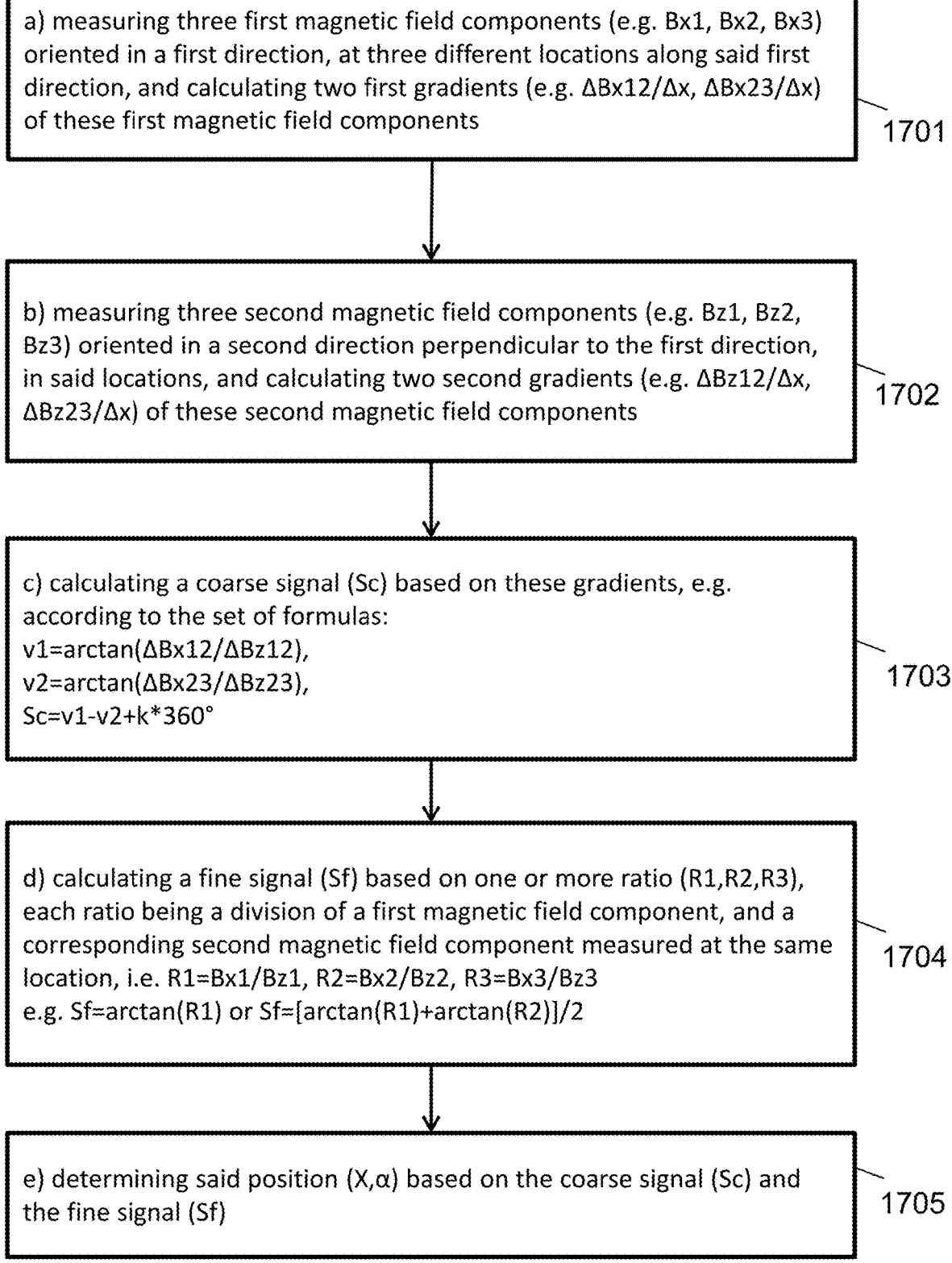
FIG. 17 illustrates a fourth method of determining a position of a sensor device relative to a magnetic structure, according to an embodiment of the present invention.

| measure | use gradient? | fine signal Sf | coarse signal Sc | note |
|---|---|---|---|---|
| Bx1, Bz1 | — | R1 = (Bx1/Bz1), Sf = arctan(R1) | Sc = f($\|Bx1\|^2 + \|Bz1\|^2$) | see method of FIG. 14 |
| Bx1, Bz1, Bx2, Bz2 | — | R1 = (Bx1/Bz1), R2 = (Bx2/Bz2), Sf = arctan(R1) (*1) | v1 = arctan(R1), v2 = arctan(R2), Sc = (v1 − v2) | see method of FIG. 15 |
| Bx1, Bz1 Bx2, Bz2 | ΔBx12 = Bx1 − Bx2 ΔBz12 = Bz1 − Bz2 | R1 = (Bx1/Bz1), Sf = arctan(R1) (*1) | $\|B\| = (Bx1)^2 + (Bz1)^2$ $\|dB\| = (ΔBx12)^2 + (ΔBz12)^2$ Sc = $\|B\|/\|dB\|$ | see method of FIG. 16 |
| Bx1, Bz1, Bx2, Bz2, Bx3, Bz3 | ΔBx12 = Bx1 − Bx2 ΔBz12 = Bz1 − Bz2 ΔBx23 = Bx2 − Bx3 ΔBz23 = Bz2 − Bz3 | R1 = (Bx1/Bz1), Sf = arctan(R1) (*2) | v1 = arctan(ΔBx12/ΔBz12), v2 = arctan(ΔBx23/ΔBz23), Sc = (v1 − v2) | see method of FIG. 17 |

TABLE 1B (several possibilities for determining coarse and fine signal)

| measure | use gradient? | fine signal Sf | coarse signal Sc | note |
|---|---|---|---|---|
| Bx1, Bz1, Bx2, Bz2 | ΔBx12 = Bx1 − Bx2 ΔBz12 = Bz1 − Bz2 | R = ΔBx12/ΔBz12 Sf = arctan(R) | R1 = (Bx1/Bz1), R2 = (Bx2/Bz2), v1 = arctan(R1), v2 = arctan(R2), Sc = (v1 − v2) | |
| Bx1, Bz1, Bx2, Bz2 | ΔBx12 = Bx1 − Bx2 ΔBz12 = Bz1 − Bz2 | R = ΔBx12/ΔBz12 Sf = arctan(R) | Sc = f($\|Bx1\|^2 + \|Bz1\|^2$) or Sc = f($\|Bx2\|^2 + \|Bz2\|^2$) or Sc = f($\|Bx1 + Bx2\|^2 + \|Bz1 + Bz2\|^2$) | |

(*1): Alternatively, Sf=arctan(R2); or Sf=[arctan(R1)+arctan(R2)]/2;
  or Sf=w1*arctan(R1)+w2*arctan(R2), wherein w1 and w2 are values in the range from 0.0 to 1.0, chosen such that (w1+w2)=1.0

(*2): Alternatively, Sf=arctan(R2), wherein R2=(Bx2/Bz2); or Sf=arctan(R3), wherein R3=(Bx3/Bz3);
  or Sf=[arctan(R1)+arctan(R2)]/2; or Sf=[arctan(R1)+arctan(R3)]/2;
  or Sf=[arctan(R2)+arctan(R3)]/2; or Sf=[arctan(R1)+arctan(R2)+arctan(R3)]/3;
  or Sf=w1*arctan(R1)+w2*arctan(R2)+w3*arctan(R3), wherein w1, w2, w3 are values in the range from 0.0 to 1.0, chosen such that (w1+w2+w3)=1.0

The second sensor location (e.g. X2), if present, is typically offset from the first sensor location (e.g. X1) by at least 500 μm or at least 600 μm or at least 800 μm (micron) or at least 1.0 mm.

Likewise, the third sensor location (e.g. X3), if present, is typically offset from the first and the second sensor location by at least 500 μm or at least 600 μm or at least 800 μm (micron) or at least 1.0 mm.

The inventors are aware that such a fine signal Sf is not robust against an external disturbance field (also known as "strayfield"), but for many applications this is not required.

As can be appreciated from the table, some methods (e.g. as in FIG. 14) require or make use of only a single pair of two orthogonal components measured at a single location (e.g. Bx1 and Bz1);

other methods (e.g. as in FIG. 15 and FIG. 16) make use of two pairs of orthogonal components measured at two different locations (e.g. Bx1, Bz1 measured at X1; and Bx2, Bz2 measured at x2);

yet other methods (e.g. as in FIG. 17) make use of three pairs of orthogonal components measured at three different locations.

As can also be appreciated from the table, some methods (e.g. as in FIG. 16 and FIG. 17) make use of gradient signals, while others do not.

While not shown in the table, the sensor device may further comprise at least one temperature sensor and/or at least one stress sensor, for example one temperature sensor and/or one stress sensor near or around each sensor location, for correcting the measured signals for temperature and/or stress variations.

The sensor system of the present invention makes use of a specific magnetic structure, where a distance between the poles is not constant, but varies. This magnetic structure generates a specific magnetic field, having specific properties. As far as is known to the inventors, such a magnetic structure and its properties are not known in the art.

The solutions proposed herein are based on one or more of the following insights:
(1) that the first magnetic field component (e.g. Bx) and the second magnetic field component (e.g. Bz), measured at a predefined distance from the magnet structure, are or may be substantially shifted over 90°,
(2) that a fine signal "Sf" can be calculated based on a ratio of these magnetic field components, (resulting in a waveform very similar to the sawtooth of FIG. 5(d)), even if the sensor device only has a single sensor location (see e.g. FIG. 6(c) and FIG. 6(d)),
(3) a second fine signal "Sf2" can be calculated in case the sensor device has at least two sensor locations (see e.g. FIG. 6(a) and FIG. 6(b)), and that a coarse signal Sc can be calculated as a difference between this first and second fine signal,
(4) that the magnitude |Bxz| of these magnetic field components (Bx, Bz) increases as the distance between adjacent pole pairs increases (thus the sum of the squares of the two field components measured at a predefined distance from the magnet is not constant), (see e.g. FIG. 5(b)),
(5) that a coarse signal "Sc" can be calculated based on this magnitude;
(6) that the spatial derivatives of these magnetic field components along the direction of movement turn out to be substantially constant, despite that the magnitude of the field components themselves increase (e.g. substantially linearly), because the distance between centres of the poles also increases and hence the spatial derivative remains largely constant, and
(7) that the ratio of the sum of squares of the first and the second field component (in FIGS. 1(a) to 1(c): Bx and Bz) (as nominator) and the sum of squares of the spatial derivatives (as denominator) is substantially independent of the actual magnetic field strength,
(8) that the ratio of the first gradient (dBx/dx) and the second gradient (dBz/dx) is substantially independent of the actual magnetic field strength,
(9) in case the coarse signal is calculated based only on gradient signals, the coarse signal is substantially independent of an external disturbance field,
(10) in case the sensor device has three sensor locations, four gradient signals can be determined, from which a coarse signal can be derived,
(11) neither the fine signal, or the coarse signal have to change monotonically over the measurement range. It suffices that a unique combination of a fine signal value and a coarse signal value exists over the measurement range to allow the determination of a unique linear or angular position.

The embodiments described herein use various combinations of some of these features, which in all cases provide a the position sensor system and method which is highly accurate (fine positioning), and has a large measurement range (despite the high accuracy), in the absence of an external disturbance field.

In existing solutions, often a trade-off needs to be made between accuracy and range (for example as described in WO2014029885A1, where the maximum range of some embodiments is reduced to 360°/N).

These are the main underlying principles of the present invention.

Referring now to the Figures.

FIG. 1(a) is a schematic block-diagram of an exemplary linear position sensor system 100 according to an embodiment of the present invention.

It is a linear position sensor system, comprising a sensor device 102 in the form of an integrated chip, which is movable relative to a magnetic structure 101, meaning that the magnetic structure 101 may be fixed while the sensor device 102 is movable, or that the sensor device 102 is fixed while the magnetic structure 101 is movable, or both the sensor device 102 and the magnetic structure 101 are movable. The invention will be further described assuming that the magnetic structure 101 is fixed, and the sensor device 102 is movable to simplify the discussion, but the present invention is not limited thereto.

Figure 1B:
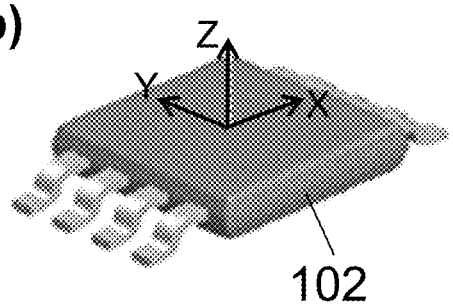
Figure 1C:
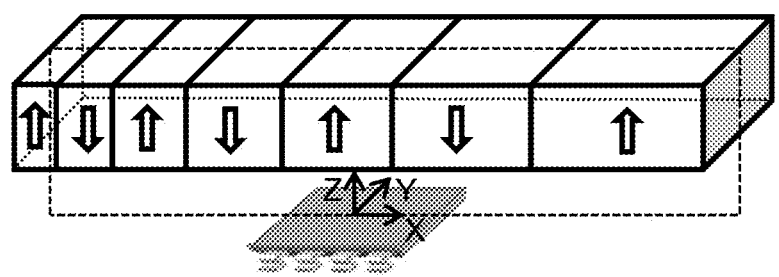

The sensor device 102 of FIGS. 1(a) to 1(c) is preferably arranged at a substantially constant distance H from the magnetic structure 101, for example in the order of about 0.5 to about 5.0 mm, and can be moved in the X-direction, substantially parallel to a surface of the magnetic structure, hence maintaining a constant distance "H" from the magnetic structure.

The magnetic structure 101 comprises magnetic material which is magnetised in a particular manner. FIG. 1(a) shows a vertical cross-section of the magnetic structure, and the arrows show that the remanent magnetic field inside the magnetic material is oriented either in the positive Z-direction, or the negative Z-direction, hence perpendicular to the direction of movement X.

One of the underlying ideas of the present invention is that the magnetic structure 101 has a plurality of magnetic poles P1, P2, P3, . . . which are not located equidistantly, but the distances between centers of adjacent poles vary along the X-direction. In the embodiment of FIGS. 1(a) to 1(c), these distances vary strictly monotonically from one end of the magnetic structure to the other end, but that is not absolutely required (see e.g. FIG. 18(a) to FIG. 19(f)).

In the example of FIG. 1(a), the magnetic structure 101 has 10 magnetic poles P1 . . . P10, and in the example of FIG. 1(c) the magnetic structure 101 has seven magnetic poles which can be "seen" by the sensor device, but of course the present invention is not limited thereto, and a magnetic structure with a larger or smaller number of poles can also be used, for example any number in the range from 3 to 50, or from 4 to 50, or from 5 to 50, or any number in the range from 3 to 30, or any number in the range from 4 to 20.

In the example of FIG. 1(a), the distance d1 between the first pole P1 and the second pole P2 is smaller than the distance d2 between the second pole P2 and the third pole P3, etc. In the example of FIG. 1(a), the distance monotonically increases from the left of FIG. 1(a) to the right of FIG. 1(a), meaning that d1<d2<d3< . . . <d9. The inventors found that based on the signals which can be measured by the sensor device 102, the position of the sensor device 102 on the X-axis can be uniquely determined, and with high accuracy (e.g. with a higher accuracy than would be possible if the magnetic structure 101 would contain only two or only three or only four equidistant poles), as will be explained further, when discussing FIGS. 5(a) to 5(h).

Without limiting the invention thereto, in preferred embodiments the distance d[i+1] may be chosen to be substantially equal to the distance d[i] multiplied by a factor F chosen in the range from about 103% to 200%, depending on the application. The factor F may be constant over the entire length of the magnetic structure 101, but that is not absolutely required. In other embodiments, the factor F may vary for each pair, or for some of the pairs.

In the specific example shown in FIGS. 1(a) to 1(c), the factor F is constant and about equal to 111%, but other values could also be used, for example approximately 103% or approximately 104% or approximately 105% or approximately 106% or approximately 107% or approximately 108% or approximately 109% or approximately 110% or approximately 111% or approximately 112% or approximately 114% or approximately 116% or approximately 118% or approximately 120% or approximately 125% or approximately 130% or approximately 135% or approximately 140% or approximately 145% or approximately 150% or approximately 160% or approximately 170% or approximately 180% or approximately 190% or approximately 200%. The impact hereof will become clear when discussing FIGS. 5(a) to 5(h).

While the distance d9 of the magnetic structure shown in FIG. 1(a) is about 2.3 times larger than the distance d1, this is only an example, and another ratio dmax/dmin between the maximum distance "dmax" and minimum distance "dmin" can also be chosen, for example but without limiting the present invention thereto, any ratio in the range from about 110% to about 800%, or a ratio in the range from about 150% to about 400%. The impact hereof will become clear when discussing FIGS. 5(a) to 5(h).

In the embodiments of FIG. 1(a) to FIG. 1(c), the sensor device 102 is oriented such that its semiconductor substrate is substantially perpendicular to the orientation of the remanent magnetic field inside the magnetic structure.

As shown in FIG. 1(b), coordinate axes X, Y, Z can be considered fixedly attached to the magnetic structure 101. The magnetic sensor device 102 is preferably configured to measure one or more magnetic field components Bx in the X-direction, oriented parallel to the semiconductor substrate, which can therefore be referred to as "in-plane" magnetic field component(s) for the sensor device of FIGS. 1(a) to 1(c), and for measuring one or more magnetic field components Bz in the Z-direction, perpendicular to the semiconductor substrate, which can therefore be referred to as "out-of-plane" magnetic field component(s) for the sensor device. In case of FIGS. 1(a) to 1(c) one could therefore also consider that the X, Y, Z axes are fixed to the sensor device.

FIG. 1(c) shows a perspective view for a magnetic structure having seven magnet poles, to better illustrate the preferred relative position of the magnetic structure 101 and the sensor device 102.

The sensor device may comprise various sensor configurations. Depending on the sensor configuration, one or more of the above described methods can be used to determine the unique position.

Figure 6A:
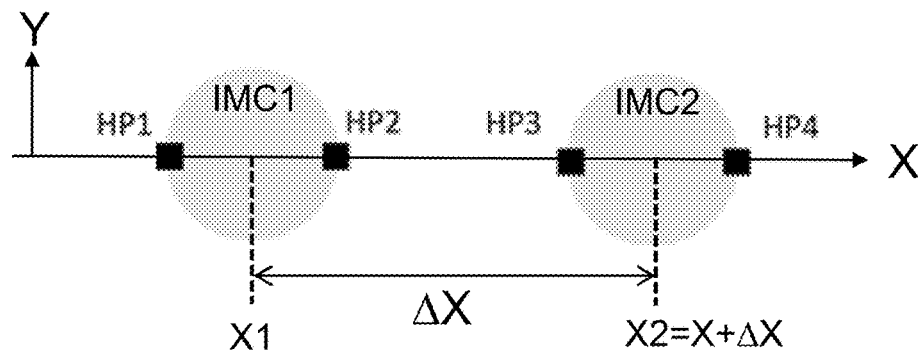
FIG. 6(a) is a schematic block-diagram showing an exemplary arrangement of sensor elements as can be used in a sensor device of the linear position sensor system of FIGS. 1(a) to 1(c) and/or in the angular position sensor system of FIGS. 3(a) to 3(d). This sensor arrangement contains four collinear horizontal Hall elements and two IMC elements.
Figure 6B:
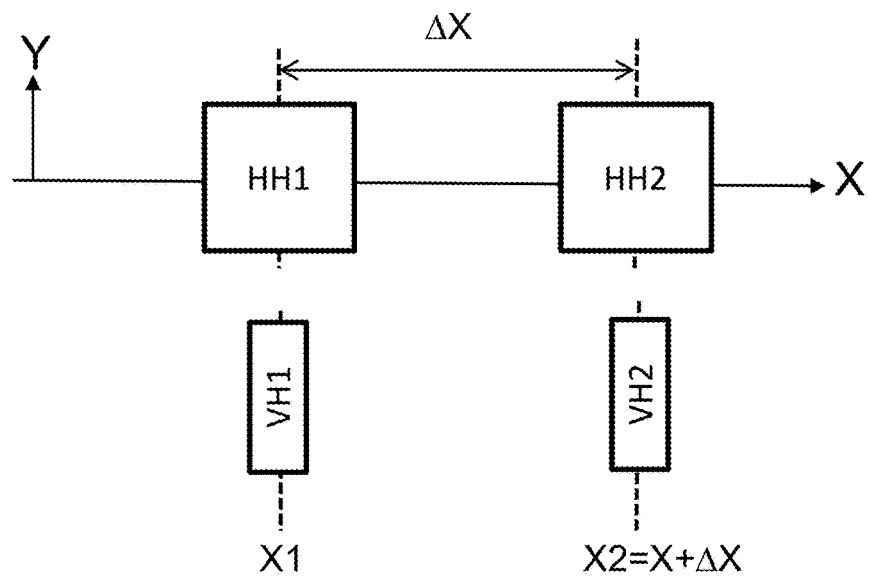
FIG. 6(b) is a schematic block-diagram showing another exemplary arrangement of sensor elements as can be used in a sensor device of the linear position sensor system of FIGS. 1(a) to 1(c) and/or in the angular position sensor system of FIGS. 3(a) to 3(d). This sensor arrangement contains two horizontal Hall elements and two vertical Hall elements.
Figure 6C:
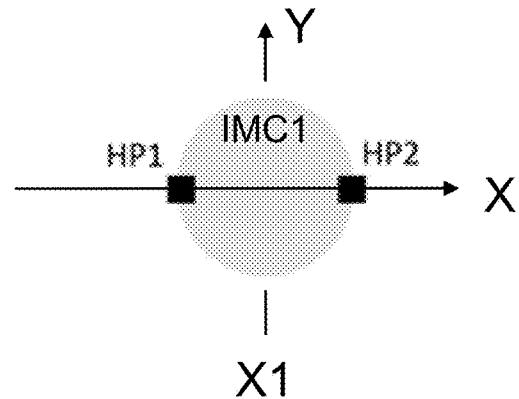
FIG. 6(c) shows a variant of the block-diagram of FIG. 6(a) having only one IMC and only two horizontal Hall elements, as can be used in a sensor device of the sensor system of FIGS. 1(a) to 1(c) and FIGS. 3(a) to 3(d).
Figure 6D:
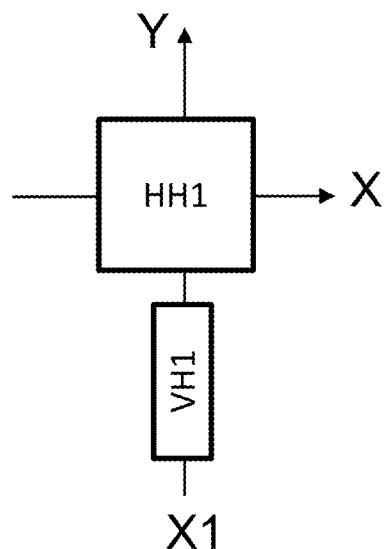
FIG. 6(d) shows a variant of the block-diagram of FIG. 6(b) having only one horizontal Hall element and only one vertical Hall element, as can be used in a sensor device of the sensor system of FIGS. 1(a) to 1(c) and FIGS. 3(a) to 3(d).

For example, if the sensor device 102 has a sensor structure as shown in FIG. 6(c) or FIG. 6(d), the sensor device is only capable of measuring Bx1 and Bz1 at a first sensor location X1. A processing circuit of such a sensor device can apply the method of FIG. 14 for determining the relative position of the sensor device relative to the magnet, but not the methods of FIG. 15 to FIG. 16 which require at least two sensor locations, or the method of FIG. 17 which requires at least three sensor locations.

For example, if the sensor device 102 has a sensor structure as shown in FIG. 6(a) or FIG. 6(b), the sensor device is capable of measuring Bx1 and Bz1 at a first sensor location X1, and measuring Bx2 and Bz2 at a second sensor location $X2=X1+\Delta X$. A processing circuit of such a sensor device can apply the method of FIG. 14, FIG. 15 or FIG. 16 for determining the position, but not the method of FIG. 17, which requires at least three sensor locations.

Figure 6E:
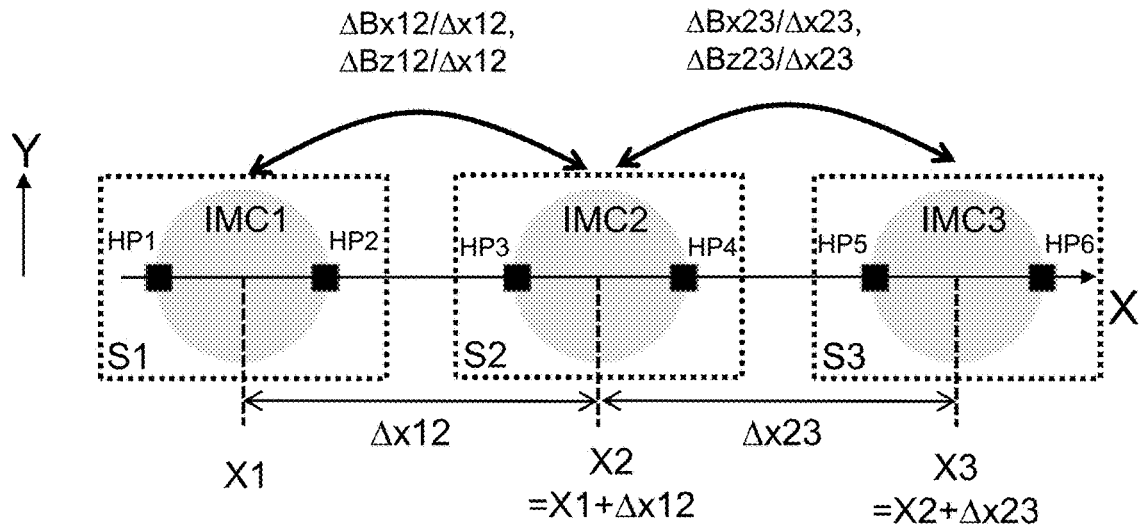
FIG. 6(e) shows a variant of the block-diagram of FIG. 6(a) having three sensor structures spaced apart along an X-axis, each having an IMC and two horizontal Hall elements, as can be used in a sensor device of the sensor system of FIGS. 1(a) to 1(c) and FIGS. 3(a) to 3(d).
Figure 6F:
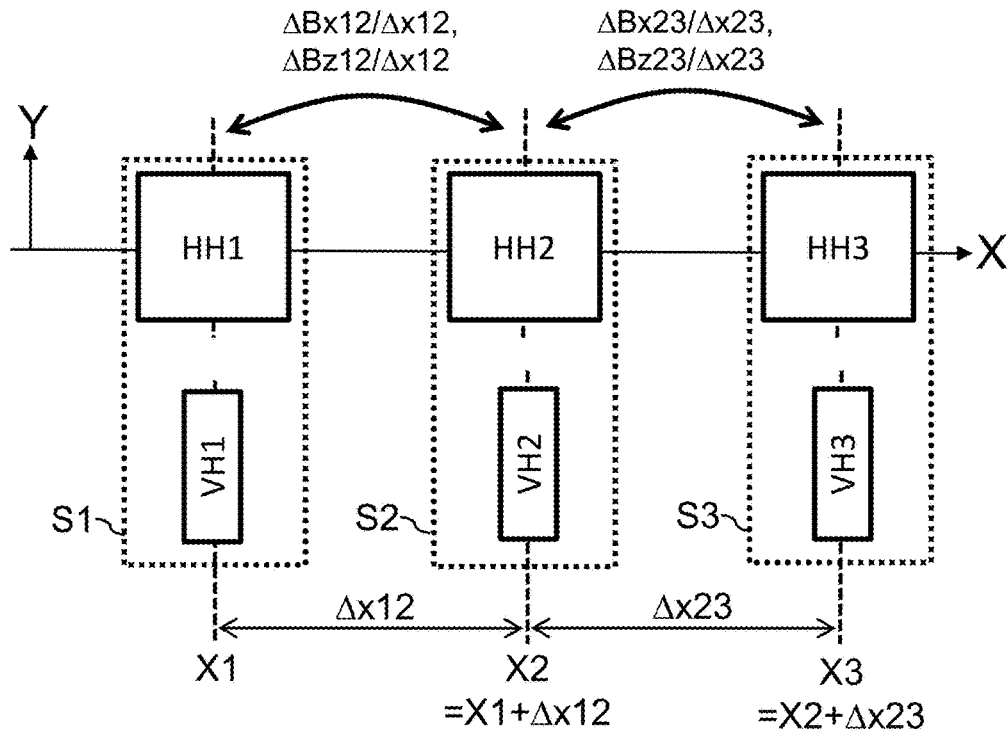
FIG. 6(f) shows a variant of the block-diagram of FIG. 6(b) having three sensor structures spaced apart along an X-axis, each having a horizontal Hall element and a vertical Hall element, as can be used in a sensor device of the sensor system of FIGS. 1(a) to 1(c) and FIGS. 3(a) to 3(d).

For example, if the sensor device 102 has a sensor structure as shown in FIG. 6(e) or FIG. 6(f), the sensor device is capable of measuring Bx1 and Bz1 at a first sensor location X1, measuring Bx2 and Bz2 at a second sensor location X2, and measuring Bx3 and Bz3 at a third sensor location X3. A processing circuit of such a sensor device can apply the method of FIG. 14, FIG. 15, FIG. 16 or FIG. 17 for determining the position.

Figure 2A:
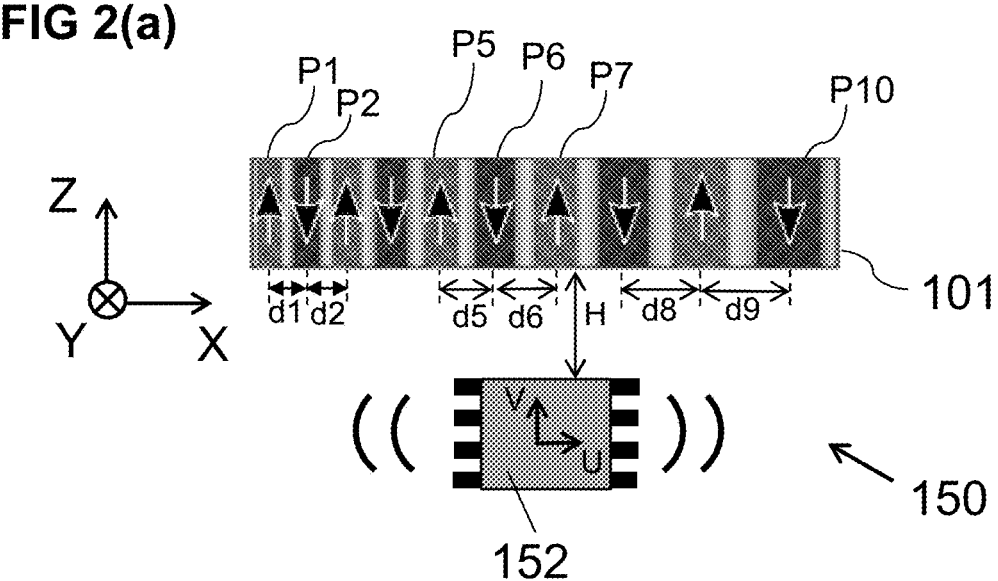
FIG. 2(a) and FIG. 2(b) illustrate another exemplary linear position sensor system according to an embodiment of the present invention, which can be seen as a variant of FIGS. 1(a) to 1(c).
Figure 2B:
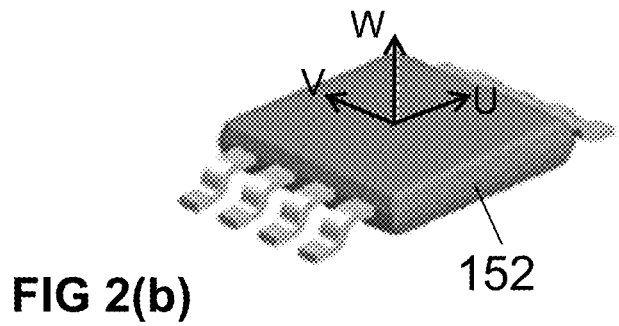
Figure 7A:
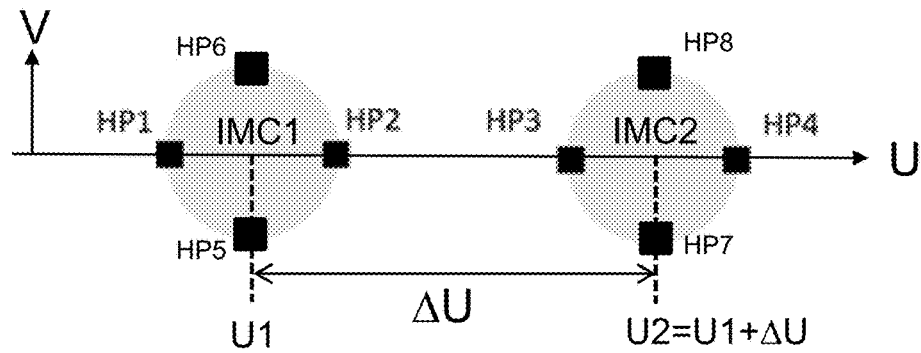
FIG. 7(a) is a schematic block-diagram showing an exemplary arrangement of sensor elements as can be used in a sensor device of the linear position sensor system of FIGS. 2(a) and 2(b) and/or in the angular position sensor system of FIGS. 4(a) to 4(d). This sensor arrangement contains two IMC elements and eight horizontal Hall elements.
Figure 7B:
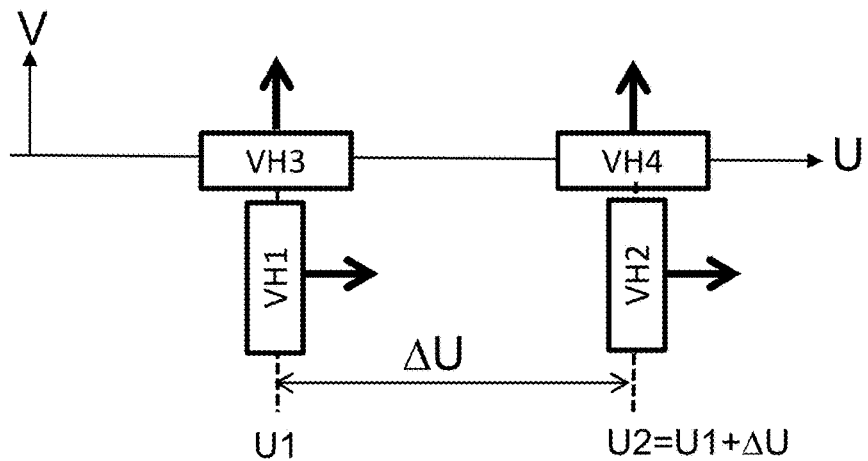
FIG. 7(b) is a schematic block-diagram showing another exemplary arrangement of sensor elements as can be used in the sensor device of the linear position sensor system of FIGS. 2(a) and 2(b) and/or in the angular position sensor system of FIGS. 4(a) to 4(d). This sensor arrangement contains four vertical Hall elements.
Figure 7C:
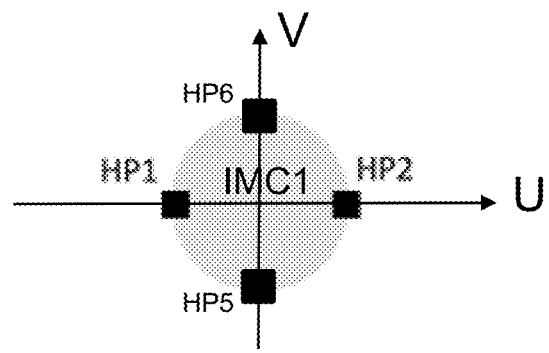
FIG. 7(c) shows a variant of the block-diagram of FIG. 7(a) having only one IMC with four horizontal Hall elements, as can be used in a sensor device of the sensor system of FIGS. 2(a) and 2(b) and FIGS. 4(a) to 4(d).
Figure 7D:
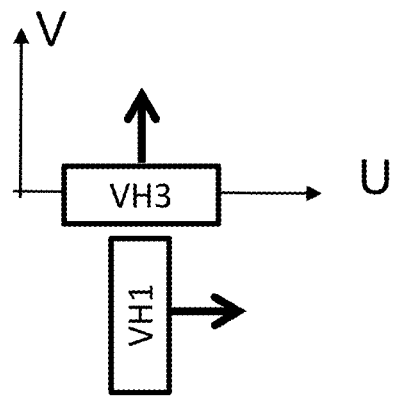
FIG. 7(d) shows a variant of the block-diagram of FIG. 7(b) having only two vertical Hall elements, as can be used in a sensor device of the sensor system of FIGS. 2(a) and 2(b) and FIGS. 4(a) to 4(d).

FIGS. 2(a) and 2(b) shows a variant of FIGS. 1(a) to 1(c), where the sensor device 152 is oriented such that its semiconductor substrate is substantially parallel to the remanent magnetic field inside the magnetic structure 101. Assuming that orthogonal axes X, Y, Z are fixed to the magnetic structure 101, and assuming that orthogonal axes U, V, W are fixed to the sensor device, the skilled reader will understand that, if the U-axis is parallel to the X-axis, and the V-axis is parallel to the Z-axis, and the W-axis is parallel to the Y-axis, the magnetic field components Bu and Bv relative to the sensor device correspond to the magnetic field components Bx and Bz relative to the magnetic structure 101. As will be explained further (see FIGS. 7(a) to 7(d)), the sensor device 152 may be configured:

i) for measuring only two in-plane field components Bu1, Bv1 oriented parallel to the semiconductor substrate (see e.g. FIG. 7(c) and FIG. 7(d)); or ii) for measuring four in-plane field components Bu1, Bv1, Bu2, Bv2, (see e.g. FIG. 7(a) and FIG. 7(b)) and optionally for calculating two gradients along the U-axis, namely $dBu/du=Bu1-Bu2$ and $dBv/du=Bv1-Bv2$; or iii) for measuring six in-plane field components Bu1, Bv1, Bu2, Bv2, Bu3, Bv3 (variant of FIG. 7(a) and FIG. 7(b) with three sensor locations), and optionally for calculating four gradients along the U-axis, namely: $\Delta Bx12=Bx1-Bx2$, $\Delta Bz12=Bz1-Bz2$, $\Delta Bx23=Bx2-Bx3$, and $\Delta Bz23=Bz2-Bz3$.

In another variant of FIGS. 1(a) to 1(c) (not shown), the magnetic material is magnetised substantially in the movement direction (e.g. in the direction of the longitudinal axis), e.g. the positive X-axis or the negative X-axis.

FIGS. 3(a) to 3(d) is a schematic block-diagram of an exemplary angular position sensor system 200 according to an embodiment of the present invention.

The same principles as described above are also applicable here, mutatis mutandis, meaning inter alia that "linear distance" needs to be converted into "angular distance", and "shift over the linear X-axis" needs to be converted into "rotation about the Z axis", etc.

One of the underlying ideas of the present invention applied to this embodiment is that the magnetic structure 201 has a plurality of magnetic poles, in the example of FIGS. 3(a) to 3(d) ten poles, P1, P2, ... P10, which poles P1, P2, ... are not located equidistantly, but the angular distances α1, α2, ... between centres of adjacent poles vary (see also FIG. 11).

In the embodiment of FIGS. 3(a) to 3(d) and FIGS. 4(a) to 4(d) and FIG. 11 these pole distances increase or decrease strictly monotonically, in the sense that α1<α2<<α9, but the present invention is not limited thereto, and it is also possible to create a ring magnet or disk magnet where the pole distances increase over a first portion of the magnet and decrease over a second portion of the magnet (as will be discussed further in FIG. 20(a) to FIG. 24).

The structure may be axially magnetized, or the magnetization may be in-plane (e.g. oriented radially, or oriented tangentially), or the structure may be isotropically magnetized in the Z-direction. This is illustrated for example in FIGS. 20(a) and 20(b) and FIG. 21 for an axially magnetized ring magnet, and in FIGS. 23(a) and 23(b) and FIG. 24 for a radially magnetized ring magnet.

Referring back to FIGS. 3(a) to 3(d), the inventors found that, based on the magnetic signals which can be measured by the sensor device 202, the angular position α of the sensor device 202 with respect to a reference position of the magnetic structure 201 can be uniquely determined, and with high accuracy (e.g. larger than would be possible if the magnetic structure would contain only three or only four poles).

The same or similar remarks with respect to the multiplication factor F (e.g. being a value in the range from about 103% to about 200%) and to the ratio dmax/dmin (representing an angular distance in this example) are also applicable here.

In the example of FIGS. 3(a) to 3(d), the sensor device 202 is located at an "off-axis position" (i.e. not located on the rotation axis, but at a non-zero distance Rs therefrom, larger than 1 mm, e.g. at least 2 mm or at least 3 mm) and is oriented such that its semiconductor substrate is substantially perpendicular to the rotation axis Z of the magnetic structure 201.

A first coordinate system with three orthogonal axes X, Y, Z is fixed to the magnetic structure 201, and a second coordinate system with three orthogonal axes U, V, W is fixed to the sensor device.

The sensor device 202 is preferably oriented such that the U-axis is tangential to an imaginary circle around the rotation axis, and such that the W-axis of the sensor device is parallel to the Z-axis of the magnetic structure. The magnetic signals Bu and Bw of FIGS. 3(a) to 3(d) are comparable to the signals Bx and Bz of FIG. 1(a), and likewise, the gradient signals dBu/du and dBw/du are comparable to the signals dBx/dx and dBz/dx of FIG. 1(a). The same sensor elements can be used in the sensor device 202 of FIGS. 3(a) to 3(d) and the sensor device 102 of FIGS. 1(a) to 1(c), examples of which are illustrated for example in FIG. 6(a) to FIG. 6(f), but the present invention is not limited hereto, and other sensor elements or sensor configurations may also be used.

FIGS. 4(a) to 4(d) shows a variant of FIGS. 3(a) to 3(d), where the sensor device 252 is oriented such that its semiconductor substrate is substantially parallel to the remanent magnetic field inside the magnetic structure 201. Assuming that orthogonal axes X, Y, Z are fixed to the magnetic structure, and assuming that orthogonal axes U, V, W are fixed to the sensor device, the sensor device 252 is preferably oriented such that the U-axis is tangential to an imaginary circle around the rotation axis, and such that the V-axis of the sensor device is parallel to the Z-axis of the magnetic structure. The magnetic signals Bu and Bv of FIGS. 4(a) to 4(d) are comparable to the signals Bu and Bv of FIGS. 2(a) and 2(b), and thus the gradient signals derived therefrom are also comparable. The same sensor elements can be used in the sensor device 252 of FIGS. 4(a) to 4(d) and the sensor device 152 of FIGS. 2(a) and 2(b), examples of which are illustrated in FIG. 7(a) to FIG. 7(d), but the present invention is not limited hereto, and other sensor elements may also be used, for example a sensor structure with a plurality of magneto-resistive elements (not shown).

FIG. 5(a) to FIG. 5(d) shows signals related to the exemplary linear position system of FIGS. 1(a) to 1(c), illustrating some of the principles of or underlying the present invention.

Figure 5A:
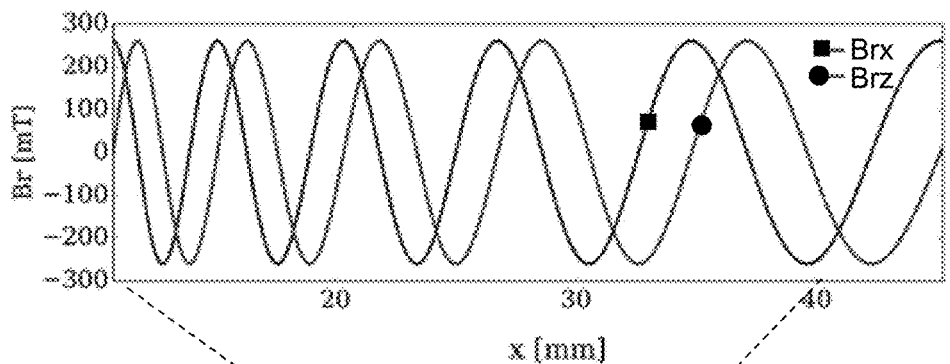
FIG. 5(a) to FIG. 5(h) show signals related to the exemplary linear position system of FIGS. 1(a) TO 1(c), illustrating some of the principles of the present invention.

FIG. 5(a) shows the remanent magnetic field Brx, Brz inside the magnetic material along the X-direction. It is noted that the remanent magnetization can be along Brz and Brx, or along Brz only, or along Brx only.

Figure 5B:
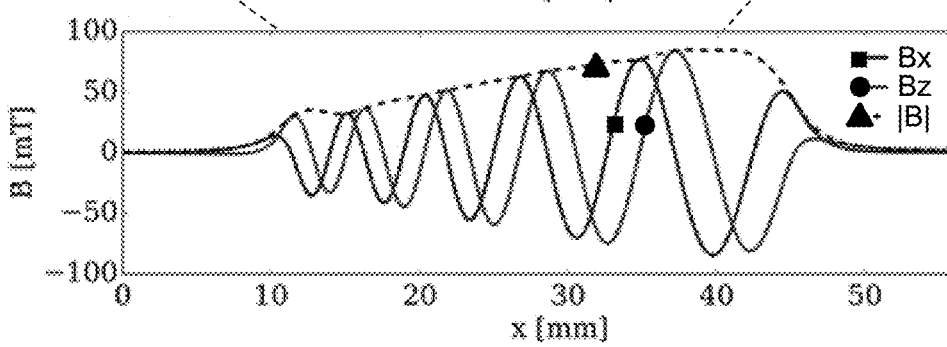

FIG. 5(b) shows the magnetic field components Bx (indicated by a black square), Bz (indicated by a black circle) at a predefined distance "H" outside of the magnetic material, as can be measured by the sensor device 102. The drawing also shows (in dotted line and indicated by a black triangle) the value |B| which is calculated here as:

$$|B|=sqrt(Bx*Bx+Bz*Bz) \qquad [1]$$

As can be seen, the value |B| is a relatively smooth signal which (at least over a portion of the measurement range) monotonically increases with X (although that is not absolutely required for the present invention to work). It was found that if the centres of the poles are located further apart, the magnetic field strength measured by the sensor device (at a relatively small constant distance H) increases.

Figure 5C:
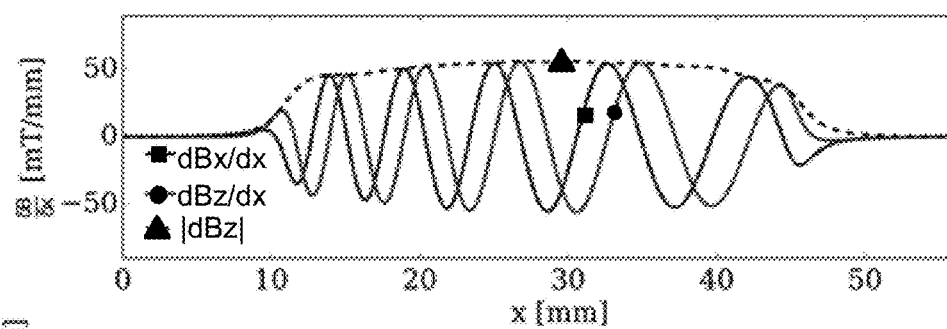

FIG. 5(c) shows the spatial derivative dBx/dx of the in-plane field component Bx (indicated by a black square), and shows the spatial derivative dBz/dx of the out-of-plane magnetic field component Bz (indicated by a black circle). FIG. 5(c) also shows (in dotted line) the value |dB| which is calculated here as:

$$|dB|=sqrt(dBx/dx*dBx/x+dBz/dx*dBz/dx) \qquad [2]$$

As can be seen, the value |dB| is also a relatively smooth signal which (at least over a portion of the measurement range) is substantially constant (although that is not absolutely required for the present invention to work).

The inventors also came to the idea of calculating a first signal "Sc" based on, e.g. as a function of the in-plane magnetic field component Bx and the out-of-plane magnetic field component Bz, more particularly, as the ratio of the signal |B| and the signal |dB|, thus:

$$Sc=|B|/|dB| \qquad [3]$$

which according to [1] and [2] can be written as:

$$Sc=sqrt(Bx*Bx+Bz*Bz)/sqrt(dBx/dx*dBx/x+dBz/dx*dBz/dx) \qquad [4]$$

Figure 5D:
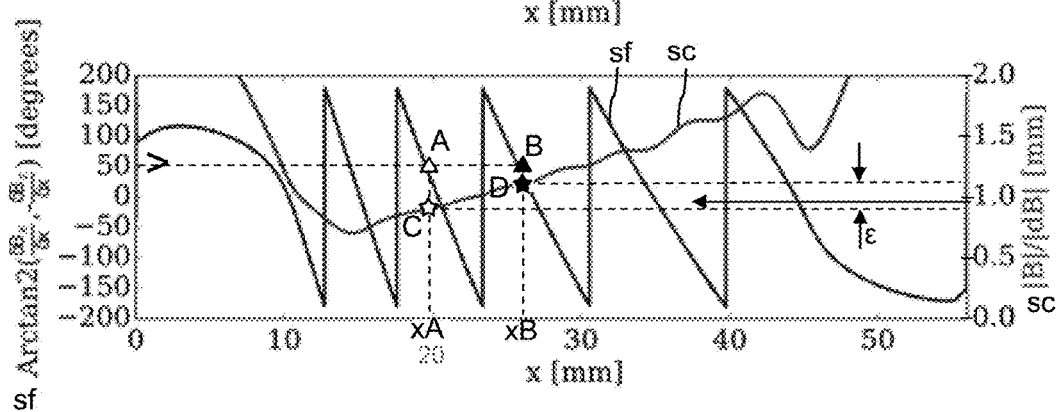

As can be appreciated from FIG. 5(d), this signal can be used as a rough or coarse indicator for the position X of the sensor device 102 relative to the magnetic structure 101, but as can be seen, the accuracy of this signal is relatively low.

In a variant, the signal Sc is defined as:

$$Sc'=(Bx*Bx+Bz*Bz)/(dBx/dx*dBx/dx+dBz/dx*dBz/dx) \qquad [5]$$

which is also substantially smooth, but avoids the calculation of two square root functions. In fact, also the division by "dx" is not required, since it is constant.

These formulas are used in the method of FIG. 16.

The inventors also came to the idea of calculating a second signal "Sf" based on, e.g. as a function of the field gradients dBx/dx and dBz/dx, more particularly, as the function:

$$Sf=\text{Arctan } 2(dBx/dx, dBz/dx) \quad [6]$$

(the function arctan 2 is also known as the atan 2-function, or the two-argument arctangent function. The reader not familiar with this function can find more information, for example on "https://en.wikipedia.org/wiki/Atan 2")

As can be appreciated from FIG. 5(d), this signal Sf looks like a "sawtooth-function", but with non-constant teeth. This signal can be used as a fine indicator (within each tooth) for the position X of the sensor device 102, but as can be seen, the range of each tooth is only a subrange of the total range.

By combining the coarse signal Sc and the fine signal Sf, a unique position X of the sensor device 102 can be defined on the X-axis, with large accuracy. Moreover, since the signal Sf is based on gradient signals, this position is highly insensitive to a (constant) external disturbance field Bext.

The following example will explain how the unique position may be determined, without limiting the present invention to this example, or even to this method, as other methods may also be used. Referring to FIG. 5(d), suppose that the value Sf yields the value 50°, and suppose that the function Sc yields the value 0.96. As indicated in FIG. 5(d), there are multiple possible positions (one on each sawtooth) having the value Sf=50°. Consider for example two candidates xA and xB associated with the point "A" (white triangle) and the point "B" (black triangle). The function Sc=0.96 can then be used to determine which of these candidates is the most likely candidate. In the example shown, the point C (white star) corresponds to a value Sc of approximately 0.93, and the point D (black star) corresponds to a value Sc of approximately 1.10. In this example, the point A is thus the most likely one, because (0.96−0.93=0.03) is smaller than (1.10−0.96=0.14).

The values of Sc for a plurality of positions may be determined by simulation or by calibration and may for example be stored in a non-volatile memory, or may be stored as a piecewise linear function, or in any other suitable way.

The value Sc is slightly sensitive to an external disturbance field; hence the actual value Sc may differ from the stored (or interpolated) value Sc would have at point C or point D, because of the external disturbance field. It is noted however that the external disturbance field needs to be quite high before the algorithm described above "selects the wrong tooth". Hence, the algorithm described above is quite robust against an external disturbance field (of moderate strength). The tolerance margin can be appreciated to be equal to about half the step E. Thus, the larger this step E, the more tolerant the sensor system is against an external disturbance field.

Having the benefit of this disclosure, the skilled person will now understand that, increasing the number of poles (for a given total range) corresponds to decreasing this tolerance against external field disturbances. However, as long as the actual external disturbance field is smaller than this tolerance margin, the sensor provides a highly accurate unique position over a relatively large range (in the example spanning multiple poles).

As can be appreciated from FIG. 5(d), the signals on the left end of the magnetic structure and on the right end of the magnetic structure cannot be used, but in practice the skilled person can make the magnetic structure slightly larger than the range to be measured.

While in the example of FIGS. 5(a) to 5(h), the magnitude |Bxz| of the magnetic field components increases as the distance between adjacent pole pairs increases (see FIG. 5(b)), and the in-plane derivatives of these magnetic field components is substantially constant (see FIG. 5(c)), this is not absolutely required, and the invention will also work if d[Bxz]/dx varies without the derivative itself being substantially constant, as long as the combination of the fine signal Sf and the coarse signal Sc, e.g. in the form of two values in the look-up table, is unique, i.e. correspond to a single position. This also means that the invention will still work, even if the coarse signal Sc (see FIG. 5(d)) does not monotonically increase, but has a constant portion, or even has a local dip, as long as the combination of the two signal values Sf and Sc is unique for each position along the magnetic structure.

The inventors furthermore realised that not all applications have to be highly robust against an external disturbance field. In such cases, it is also possible to define the coarse signal "Sc" for example as one of the following:

$$Sc=|B|=sqrt(Bx*Bx+Bz*Bz), \text{ or}$$

$$Sc=(Bx)^2+(Bz)^2, \text{ or}$$

$$Sc=1/|B|=1/sqrt(Bx*Bx+Bz*Bz), \text{ or}$$

$$Sc=1/(Bx^2+Bz^2),$$

and to define the fine signal "Sf" for example as:

$$Sf=\arctan(Bx/Bz)$$

It is possible to determine a unique position along the magnetic structure also with one of these coarse signals Sc and with this fine signal Sf. While this solution is more sensitive to an external disturbance field, it is an advantage that these formulas are extremely simple to calculate, and they require only a single pair of orthogonal magnetic field component values Bx, Bz measured at a single sensor location (see e.g. FIG. 6(c) and FIG. 6(d)). These formulas are the basis for the method of FIG. 14.

Figure 5E:
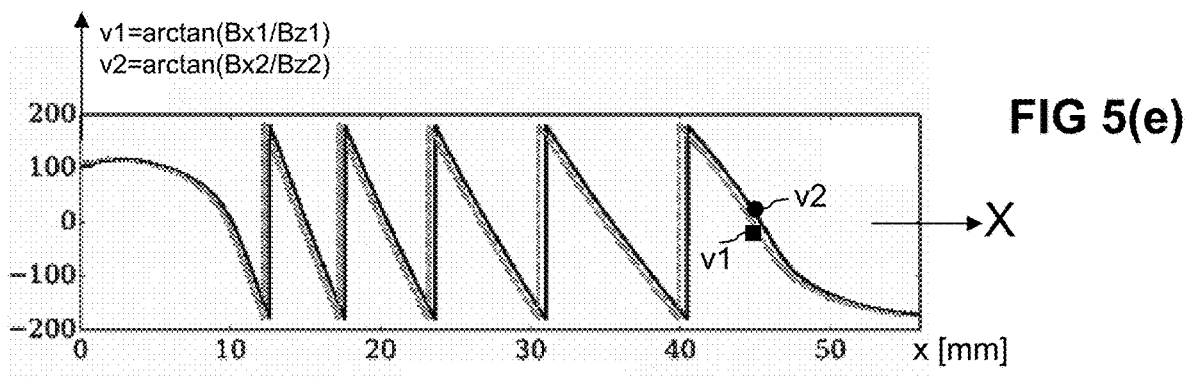
Figure 5F:
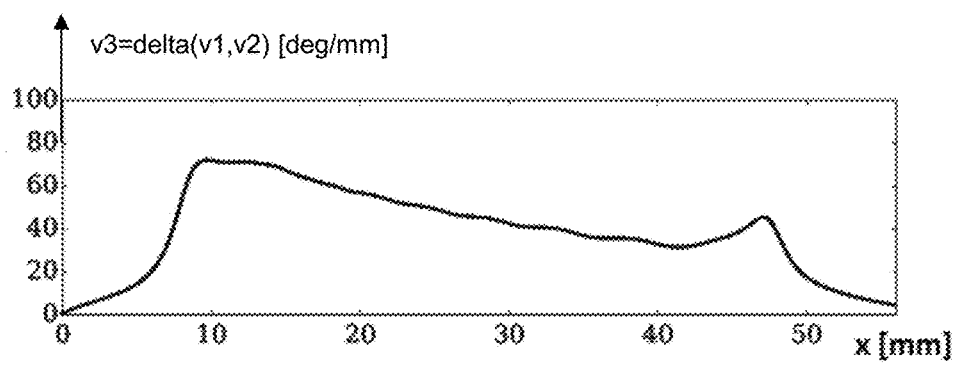
Figure 5G:
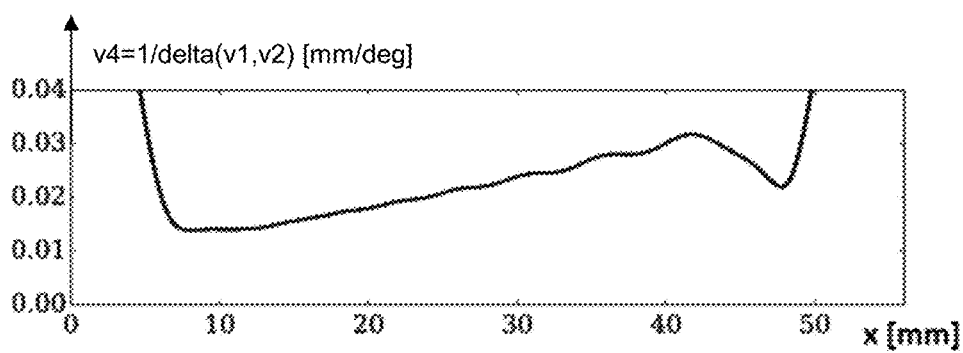

On the other hand, if the sensor device has at least two sensor locations (see e.g. FIG. 6(a) and FIG. 6(b)), it is possible to calculate two signals v1, v2, as follows:

$$v1=\arctan(Bx1/Bz1), \text{ and}$$

$$v2=\arctan(Bx2/Bz2),$$

each having a waveform looking like a sawtooth function, but slightly shifted along the X-axis (see FIG. 5(e)). From these signals v1, v2 a difference signal v3 can be calculated (see FIG. 5(f)), as follows:

$$v3=v1-v2$$

and a reciprocal function of v3 can be calculated (see FIG. 5(g)), as follows:

$$v4=1/v3$$

Figure 5H:
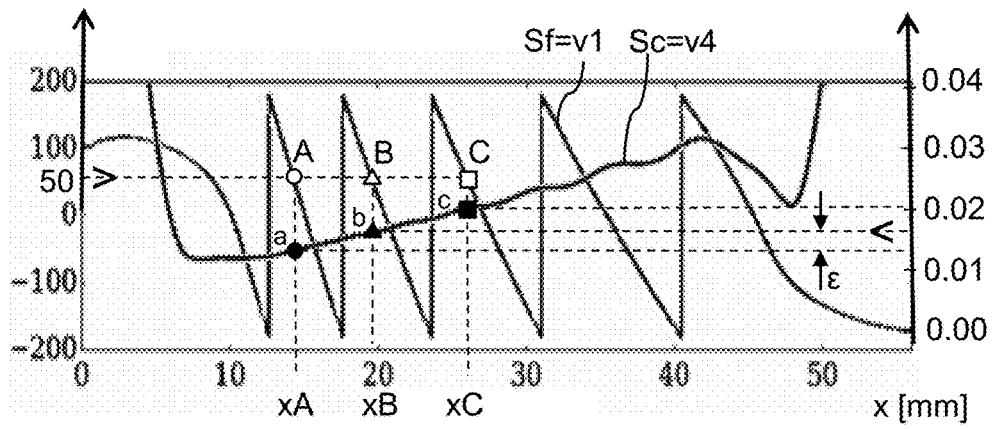

As can be appreciated from FIG. 5(e) to FIG. 5(h), it is possible to use v1 or v2 as fine signal "Sf", and it is possible to use v3 or v4 as coarse signal "Sc". In FIG. 5(h) v1 is used as fine signal, and v4 is used as coarse signal, but the other 3 possibilities, namely: Sf=v1 and Sc=v3; Sf=v2 and Sc=v3;

Sf=v2 and Sc=v4 will also work. These formulas are the basis for the method of FIG. 15.

In fact, it is also possible to calculate Sf as the average of v1 and v2, or as a weighted average of v1 and v2, e.g. using the formulas: Sf=(v1+2*v2)/3, etc.

The example of FIG. 5(h) shows how a unique position of X can be determined based on a value of Sf=50° and a value of Sc=0.017, for example by first determining a number of candidate positions A, B, C based on the value of Sf only, and then selecting one of these candidate positions based on the smallest deviation of the corresponding coarse signal.

FIG. 6(a) is a schematic block-diagram showing an exemplary arrangement of sensor elements as can be incorporated in the linear position sensor device 102 of FIGS. 1(a) to 1(c) and/or in the angular position sensor device 202 of FIGS. 3(a) to 3(d). This sensor arrangement shown in FIG. 6(a) contains four collinear horizontal Hall elements (indicated by black squares) and two IMC elements (indicated by gray circles). As is known in the art (e.g. from WO2014029885A1), such structures can be used to determine (e.g. measure and/or calculate) an in-plane magnetic field component Bx oriented in a direction parallel to the semiconductor substrate, and an out-of-plane magnetic field component Bz oriented in a direction perpendicular to the semiconductor substrate of the sensor device.

More in particular, if the signal provided by the first, second, third and fourth Hall element is HP1, HP2, HP3 and HP4 respectively, then the value of Bx at position X1 can be calculated as:

$$Bx1 = HP1 - HP2 \quad [4.1],$$

and the value Bz at position X1 can be calculated as:

$$Bz1 = HP1 + HP2 \quad [4.2],$$

and the value of Bx at position X2=X1+ΔX can be calculated as:

$$Bx2 = HP3 - HP4 \quad [4.3],$$

and the value of Bz at position X2=X1+ΔX can be calculated as:

$$Bz2 = HP3 + HP4 \quad [4.4]$$

From these magnetic field values Bx1, Bz1, Bx2, Bz2, which are measured directly or indirectly, other values can be calculated, for example one or more of the following:
a first ratio R1=Bx1/Bz1, and a second ratio R2=Bx2/Bz2,
an in-plane field gradient (where the division by/ΔX is omitted, because it is constant):

$$dBx = Bx1 - Bx2 = HP1 - HP2 + HP4 - HP3 \quad [4.5]$$

an out-of-plane field gradient (where the division by/ΔX is omitted, because it is constant):

$$dBz = Bz1 - Bz2 = HP1 + HP2 - HP3 - HP4 \quad [4.6]$$

an average in-plane field value:

$$|Bx| = (Bx1 + Bx2)/2 \quad [4.7]$$

an average out-of-plane field value:

$$|Bz| = (Bz1 + Bz2)/2 \quad [4.8]$$

a magnitude (or norm) of the magnetic field:

$$|Bxz| = sqrt(sqr(Bx) + sqr(Bz)) \quad [4.9]$$

a magnitude (or norm) of the magnetic field gradients:

$$|dBxz| = sqrt(sqr(dBx/dx) + sqr(dBz/dx)) \quad [4.10]$$

a course signal:

$$Sc = |Bx|/|dBxz| \quad [4.11a], \text{ or}$$

$$Sc = |Bxz| \quad [4.11b], \text{ or}$$

$$Sc = (Bx1)^2 + (Bz1)^2 \quad [4.11c], \text{ or}$$

$$Sc = sqrt[(Bx1)^2 + (Bz1)^2] \quad [4.11d], \text{ or}$$

$$Sc = (Bx2)^2 + (Bz2)^2 \quad [4.11e], \text{ or}$$

$$Sc = (Bx1*Bx2) + (Bz1*Bz2) [4.11f], \text{ or}$$

$$Sc = (Bx1 + Bx2)^2 + (Bz1 + Bz2)^2 \quad [4.11g], \text{ or}$$

$$Sc = \arctan(Bx1/Bz1) - \arctan(Bx2/Bz2) \quad [4.11h], \text{ or}$$

or the reciprocal of these:

$$Sc = |dBxz|/|Bxz| \quad [4.11i], \text{ or}$$

$$Sc = 1/|Bxz| \quad [4.11j],$$

etc.
a fine signal:

$$Sf = \text{Arctan } 2(dBx/dx, dBz/dx) \quad [4.12a], \text{ or}$$

$$Sf = \text{Arctan}(Bx1/Bz1) \quad [4.12b], \text{ or}$$

$$Sf = \text{Arctan}(Bx2/Bz2) \quad [4.12c], \text{ or}$$

$$Sf = (\arctan(Bx1/Bz1) + \arctan(Bx2/Bz2))/2 \quad [4.12d],$$

etc.

But of course, the present invention is not limited to these specific formulas, and the skilled person having the benefit of the present disclosure can easily think of other variants.

The combination of Sc and Sf then yield a single value for X or α, as explained above.

FIG. 6(b) is a schematic block-diagram showing another exemplary arrangement of sensor elements as can be incorporated in the linear position sensor device 102 of FIGS. 1(a) to 1(c) and/or in the angular position sensor device 202 of FIGS. 3(a) to 3(d). The sensor arrangement shown in FIG. 6(b) contains two horizontal Hall elements HH1, HH2 (without IMC) spaced apart over a distance ΔX, and two vertical Hall elements VH1, VH2 spaced apart over said distance ΔX. The two horizontal Hall elements HH1, HH2 can be used to measure the Bz field at two different positions, and the two vertical Hall elements VH1, VH2 can be used to measure the Bx field at two different locations.

More in particular, the following formulas may be used to determine an position X (if used in FIGS. 1(a) to 1(c)) or α (if used in FIGS. 3(a) to 3(d)):
The out-of plane magnetic field component at a first location X1 can be determined as:

$$Bz1 = HH1 \quad [5.1]$$

The out-of plane magnetic field component at a second location X2 can be determined as:

$$Bz2 = HH2 \quad [5.2]$$

From these two values, an out-of-plane magnetic field gradient dBz can be calculated as follows:

$$dBz = HH1 - HH2 \quad [5.3]$$

The in-plane magnetic field component at a first location X2 can be determined as:

$$Bx1 = VH1 \quad [5.4]$$

The in-plane magnetic field component at a second location X2 can be determined as:

$$Bx2 = VH2 \quad [5.5]$$

From these two values, an in-plane magnetic field gradient dBx can be calculated as follows:

$$dBx = VH1 - VH2 \quad [5.6]$$

From these values, an average in-plane magnetic field component |Bx| can be calculated as:

$$|Bx| = (Bx1 + Bx2)/2 \quad [5.7]$$

and an average out-of plane magnetic field component |Bz| can be calculated as:

$$|Bz| = (Bz1 + Bz2)/2 \quad [5.8]$$

a magnitude (or norm) of the magnetic field components:

$$|Bxz| = sqrt(sqr(Bx) + sqr(Bz)) \quad [5.9]$$

a magnitude (or norm) of the magnetic field gradients:

$$|dBxz| = sqrt(sqr(dBx/dx) + sqr(dBz/dx)) \quad [5.10]$$

Based on these values, a coarse signal Sc and a fine signal Sf can be calculated using the same formulas [4.11a] to [4.12d] as mentioned in FIG. 6(a).

The combination of Sc and Sf then yield a single value for X or α, as explained above.

FIG. 6(c) shows a sensor arrangement having only a single integrated magnetic concentrator (IMC) and only two horizontal Hall elements HP1, HP2 arranged on the X-axis. This can be seen as a subset of the structure of FIG. 6(a), capable of providing only Bx1 and Bz1, but quite surprisingly, this is sufficient to allow the derivation of a coarse signal Sc and a fine signal Sf, from which a unique position can be determined over an increased range with improved accuracy, for example in accordance with one or more of the following formulas:

$$Sc = (Bx1)^2 + (Bz1)^2 \quad [6.1], \text{ or}$$

$$Sc = sqrt[(Bx1)^2 + (Bz1)^2] \quad [6.2], \text{ or}$$

$$Sc = 1/[(Bx1)^2 + (Bz1)^2] \quad [6.3], \text{ or}$$

$$Sc = 1/sqrt[(Bx1)^2 + (Bz1)^2] \quad [6.4],$$

and $$Sf = \arctan(Bx1/Bz1) \quad [6.5]$$

While not shown, this sensor arrangement preferably also comprises a temperature sensor and/or a mechanical stress sensor, preferably arranged in the vicinity of the IMC, e.g. adjacent the IMC or underneath the IMC, for allowing compensation of the measured signals for temperature compensation and/or stress compensation.

FIG. 6(d) shows a sensor arrangement having only one horizontal Hall element HH1 and only one vertical Hall element VH1, arranged in close vicinity of each other (e.g. at a distance smaller than 400 μm (micron, or smaller than 300 micron, or smaller than 200 micron, or smaller than 100 micron). This can be seen as a subset of the structure of FIG. 6(b) and again, quite surprisingly, this is sufficient to allow the derivation of a coarse signal Sc and a fine signal Sf, from which a unique position can be determined over an increased range with improved accuracy, for example based on one or more of the formulas [6.1] to [6.5].

FIG. 6(e) shows a sensor arrangement having three sensor locations, each comprising an integrated magnetic concentrator (IMC) and two horizontal Hall elements. This can be seen as a superset of the structure of FIG. 6(a). The first sensor is capable of providing Bx1, Bz1, the second sensor is capable of providing Bx2, Bz2, and the third sensor is capable of providing Bx3, Bz3. From these signals three ratios can be determined: R1=Bx1/Bz1, R2=Bx2/Bz2, R3=Bx3/Bz3.

Using this structure four gradients can be determined: ΔBx12, ΔBz12 between the first and second sensor, and ΔBx23, ΔBz23 between the second and third sensor.

Using this structure, it is furthermore possible to calculate the coarse signal Sc based on the following formulas:

$$v1 = \arctan(\Delta Bx12/\Delta Bz12),$$

$$v2 = \arctan(\Delta Bx23/\Delta Bz23),$$

$$Sc = (v1 - v2 + k \cdot 360°,$$

where k is chosen such that Sc lies in the range from 0° to 360°, or $$Sc = 1/(v1 - v2 + k \cdot 360°$$

and it is possible to calculate a fine signal Sf, for example using one of the following formulas:

$$Sf = \arctan(\Delta Bx12/\Delta Bz12), \text{ or}$$

$$Sf = \arctan(\Delta Bx23/\Delta Bz23), \text{ or}$$

$$Sf = \arctan(Bx1/Bz1) = \arctan(R1), \text{ or}$$

$$Sf = \arctan(Bx2/Bz2) = \arctan(R2), \text{ or}$$

$$Sf = \arctan(Bx3/Bz3) = \arctan(R3), \text{ or}$$

$$Sf = (\arctan(R1) + \arctan(R2) + \arctan(R3))/3, \text{ etc.}$$

These signals look very similar to those shown in FIG. 5(e) to FIG. 5(h).

FIG. 6(f) shows a variant of the sensor structure of FIG. 6(e) using three horizontal Hall elements HH1 to HH3, and three vertical Hall elements VH1 to VH3. This structure is also capable of measuring Bx1, Bz1 at the first sensor location; Bx2, Bz2 at the second sensor location, and Bx3, Bz3 at the third sensor location. The same formulas as mentioned in FIG. 6(e) are also applicable here.

FIG. 7(a) is a schematic block-diagram showing another exemplary arrangement of sensor elements as can be incorporated in the linear position sensor device 152 of FIGS. 2(a) and 2(b) and/or in the angular position sensor device 252 of FIGS. 4(a) to 4(d).

The sensor arrangement shown in FIGS. 7(a) to 7(d) contains two IMC structures, each with four horizontal Hall elements, and can be seen as a variant of the sensor arrangement of FIG. 6(a), in which:

the horizontal Hall elements HP1 and HP2 can be used to determine Bu at position U1, e.g. using the formula:

$$Bu1 = HP1 - HP2 \quad [7.1]$$

the horizontal Hall elements HP5 and HP6 can be used to determine Bv at position U1, e.g. using the formula:

$$Bv1 = HP5 - HP6 \quad [7.2]$$

The horizontal Hall elements HP3 and HP4 can be used to determine Bu at position U2=U+ΔU, e.g. using the formula:

$$Bu2 = HP3 - HP4 \quad [7.3]$$

The horizontal Hall elements HP7 and HP8 can be used to determine Bv at position U2=U+ΔU, e.g. using the formula:

$$Bv2 = HP7 - HP8 \quad [7.4]$$

From these magnetic field component values Bu1, Bv1, Bu2, Bv2, which are measured directly or indirectly, other values can be calculated, for example one or more of the following:

a first gradient along the U-direction (where the division by $\Delta U$ is omitted, because it is constant):

$$dBu = Bu1 - Bu2 \qquad [7.5]$$

a second gradient along the U-direction (where the division by $\Delta U$ is omitted, because it is constant):

$$dBv = Bv1 - Bv2 \qquad [7.6]$$

an average first magnetic field component value:

$$|Bu1| = (Bu1 + Bu2)/2 \qquad [7.7]$$

an average second magnetic field component value:

$$|Bv| = (Bv1 + Bv2)/2 \qquad [7.8]$$

an average magnitude (or norm) of the magnetic field:

$$|Buv| = sqrt(sqr(Bu) + sqr(Bv)) \qquad [7.9]$$

a norm of the magnetic field gradients:

$$|dBuv| = sqrt(sqr(dBu/du) + sqr(dBv/du)) \qquad [7.10]$$

a course signal:

$$Sc = |Buv|/|dBuv| \qquad [7.11]$$

or any of the formulas [4.11b] to [4.11j] wherein Bx is replaced by Bu, and Bz is replaced by Bv. a fine signal:

$$Sf = \text{Arctan } 2(dBu/du, dBv/du) \qquad [7.12]$$

or any of the formulas [4.12b] to [4.12d] wherein Bx is replaced by Bu, and Bz is replaced by Bv.

The combination of Sc and Sf then yield a single value for X or α, as explained above.

But of course, the present invention is not limited to these specific formulas, and variants are also possible. For example, instead of calculating the average of Bu1 and Bu2 in formula [7.7], one can also use |Bu|=|Bu| or |Bu|=|Bu2|.

FIG. 7(b) shows a sensor arrangement comprising two sensors spaced apart along the U-axis, each sensor comprising two vertical Hall elements, one oriented in the U-direction, and one oriented in the V-direction, as can be incorporated in the linear position sensor device 152 of FIGS. 2(a) and 2(b) and/or in the angular position sensor device 252 of FIGS. 4(a) to 4(d). The sensor arrangement comprises:
a first vertical Hall VH1 for measuring Bu1 oriented in the U-direction at position U1,
a second vertical Hall VH3 for measuring Bv1 oriented in the V-direction at position U1,
a third vertical Hall VH2 for measuring Bu2 oriented in the U-direction at position U2=U1+ΔU,
a fourth vertical Hall VH4 for measuring Bv2 oriented in the V-direction at position U2=U1+ΔU.

The formulas [7.5] to [7.12], or any of the formulas [4.11b] to [4.11j] wherein Bx is replaced by Bu, and Bz is replaced by Bv, or any of the formulas [4.12b] to [4.12d] wherein Bx is replaced by Bu, and Bz is replaced by Bv, can then be used to obtain a coarse signal Sc and a fine signal Sf, from which a single position value X or α can be obtained, as explained above.

FIG. 7(c) shows a sensor arrangement having only a single integrated magnetic concentrator (IMC) and only four horizontal Hall elements HP1, HP2, HP5, HP6. This can be seen as a subset of the structure of FIG. 7(a), capable of providing Bu1 and Bv1, but quite surprisingly, this is sufficient to allow the derivation of a coarse signal Sc and a fine signal Sf, from which a unique position can be determined over an increased range with improved accuracy, in analogy with the formulas mentioned in FIG. 6(c), after replacing Bx by Bu, and Bz by Bv.

FIG. 7(d) shows a sensor arrangement having only two vertical Hall elements VH1 and VH3. This can be seen as a subset of the structure of FIG. 7(b), capable of providing Bu1 and Bv1, but quite surprisingly, this is sufficient to allow the derivation of a coarse signal Sc and a fine signal Sf, from which a unique position can be determined over an increased range with improved accuracy, in analogy with the formulas mentioned in FIG. 6(d), after replacing Bx by Bu, and Bz by Bv.

While not shown, it is also possible to provide a sensor structure which is a superset of FIG. 7(a) and FIG. 7(b), having three sensor locations instead of two. This structure is capable of measuring Bu1, Bv1 at the first sensor location, Bu2, Bv2 at the second sensor location, and Bu3, Bv3 at the third sensor location. The same formulas as mentioned in FIG. 6(e) and FIG. 6(f) are also applicable here, after replacing Bx by Bu, and Bz by Bv.

Figure 8:
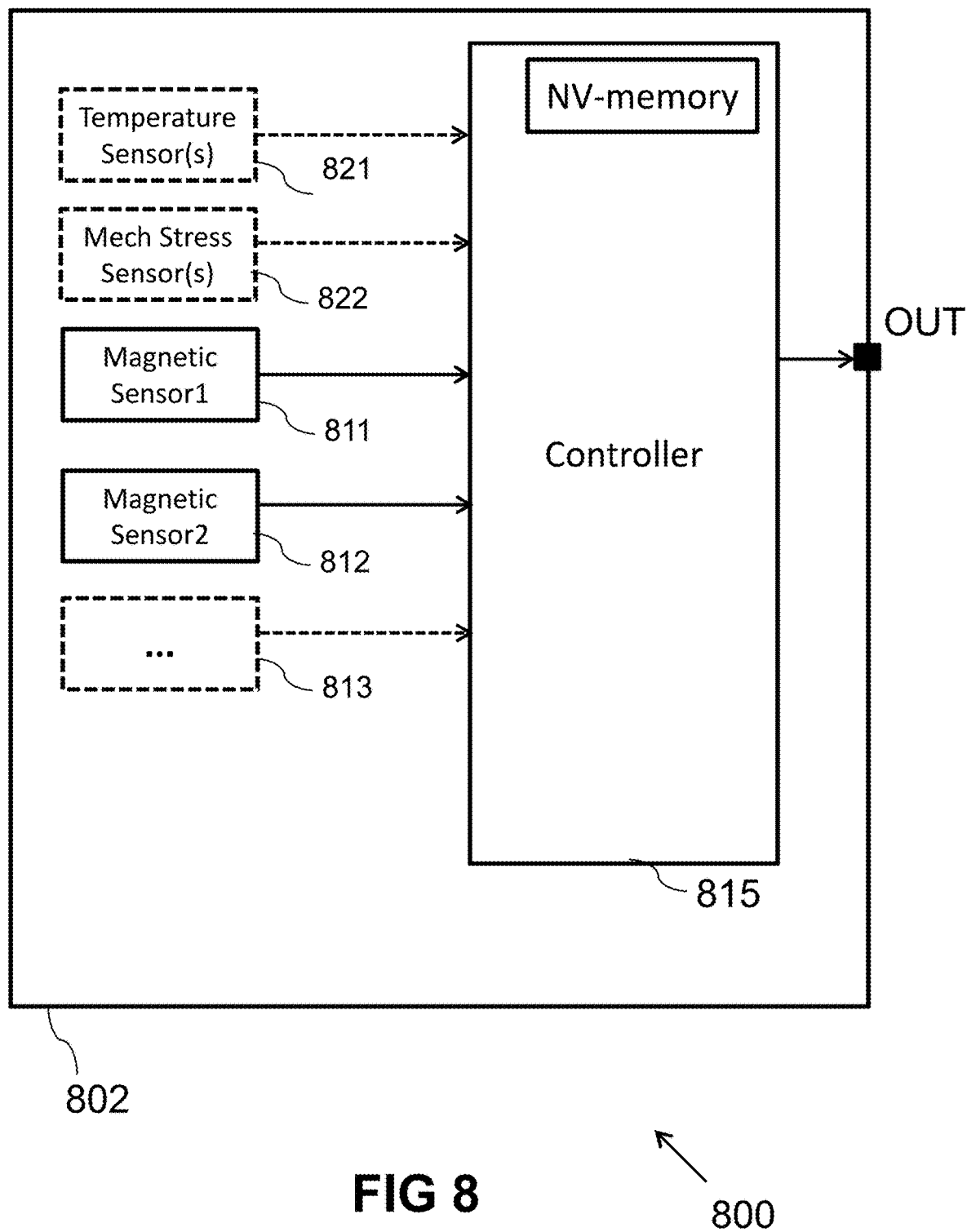
FIG. 8 shows a schematic block diagram of sensor devices as can be used in the position sensor system of FIGS. 1(a) to FIGS. 4(a) to 4(d).

FIG. 8 shows an exemplary schematic block diagram of a sensor device 800, as can be used in the linear position sensor system 100, 200 of FIGS. 1(a) to 1(c) or FIGS. 2(a) and 2(b), or in the angular position sensor system 300, 400 of FIGS. 3(a) to 3(d) or FIGS. 4(a) to 4(d).

The position sensor device 800 shown in FIG. 8 comprises a plurality of at least two magnetic sensor elements 811, 812, (e.g. as shown in FIG. 6(c) or FIG. 6(d) or FIG. 7(d)), or at least four magnetic sensor elements (e.g. as shown in FIG. 6(a), FIG. 6(b), FIG. 7(b), FIG. 7(c)) or at least six magnetic sensor elements (e.g. as shown in FIG. 6(e), FIG. 6(f)), but the sensor device may comprise more than six magnetic sensor elements, for example eight magnetic sensor elements, as shown in FIG. 7(a).

The sensor device 800 may optionally further comprise at least one temperature sensor 821, e.g. one temperature sensor per sensor location, for measuring a temperature of the substrate at said sensor location, for allowing compensation of the measured signal in manners known per se in the art.

The sensor device 800 may optionally further comprise at least one mechanical stress sensor 822, e.g. one stress sensor per sensor location, for measuring a temperature of the substrate at said sensor location, for allowing compensation of the measured signal in manners known per se in the art.

The position sensor device 800 further comprises a processing unit 815 adapted for calculating a coarse signal "Sc" and a fine signal "Sf", based on some or all of the signals obtained from the magnetic sensor elements, for example using any of formulas described above.

The processing unit 815 is further adapted for determining said linear position X or said angular position a based on both the coarse signal Sc and on the fine signal Sf, for example using a look-up table and interpolation, or in any other suitable way.

The processing unit 815 may comprise a programmable device, adapted for performing a method of determining said linear or angular position, in a way as described above, or as will be described in FIG. 14 to FIG. 17.

Figure 9:
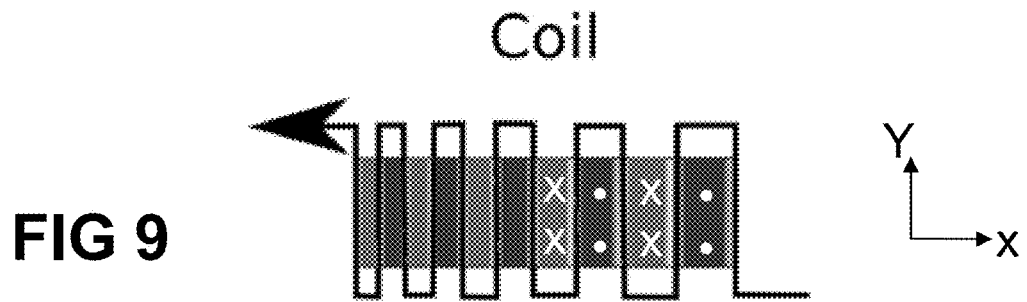
FIG. 9 illustrates a first method of producing a magnetic structure as may be used in the linear position sensor system of FIGS. 1(a) to 1(c) or FIGS. 2(a) and 2(b), based on magnetising a magnetic material using a (strong) current flowing through a conductor.

FIG. 9 illustrates a first method of producing a magnetic structure 901 as may be used in the linear position sensor system of FIGS. 1(a) to 1(c) or FIGS. 2(a) and 2(b). This method is based on magnetising a magnetic material using a relatively strong current (a technique known per se in the art, but not for this particular topology). What is shown is a top view of a surface of a structure comprising magnetic material. At a small distance above the surface, an electrical conductor is positioned as shown, forming a zig-zag, and a relatively large current is injected through the conductor, inducing a large magnetic field, which enters the page of the drawing (indicated by x), and which comes out of the page of the drawing (indicated by •), only a few vectors are shown.

In the example of FIG. 9 the pole distances increase monotonically from the left end of the magnetic structure to the right end, but that is not absolutely required, as will be described in more detail in FIG. 18(a) to FIG. 19(f).

Figure 10:
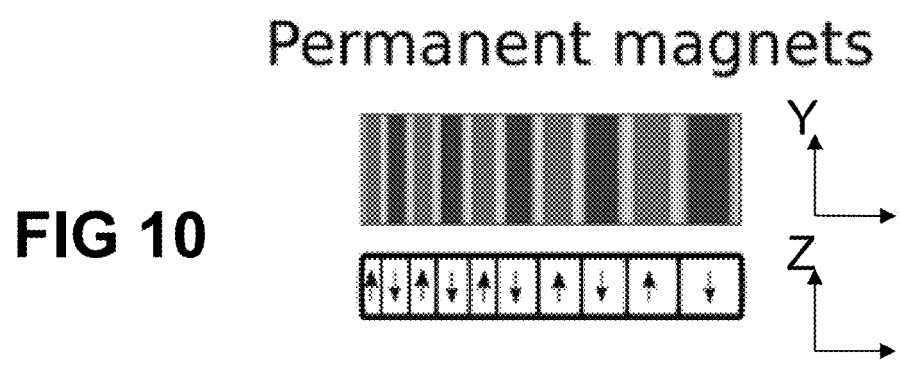
FIG. 10 illustrates a second method of producing a magnetic structure as may be used in the linear position sensor system of FIGS. 1(a) to 1(c) or FIGS. 2(a) and 2(b).

FIG. 10 illustrates a second method of producing a magnetic structure as may be used in the linear position sensor system of FIGS. 1(a) to 1(c) or FIGS. 2(a) and 2(b).

Such a magnet structure can be produced for example by a technique for making bonded magnets. This technique is known per se, albeit for equidistant magnet poles. Typically, a mixture known as "feed stock" containing magnetic particles is injected in a cavity of a mold, and one or more permanent magnets are located in close vicinity of, but outside the cavity during molding.

Figure 11:
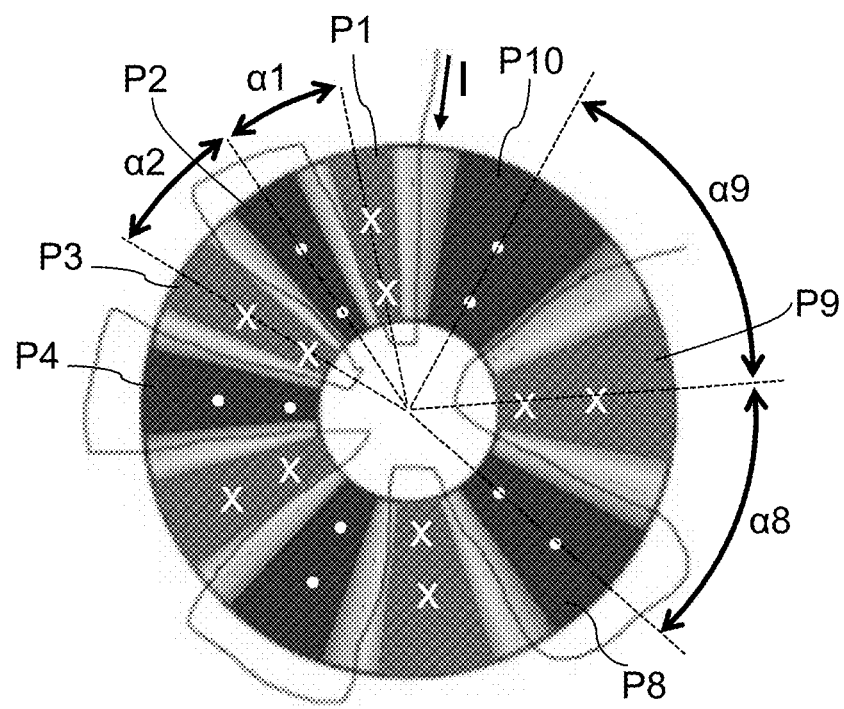
FIG. 11 illustrates a method of producing a magnetic structure as may be used in the angular position sensor system of FIGS. 3(a) to 3(d) or FIGS. 4(a) to 4(d), based on magnetising a magnetic material using a (strong) current flowing through a conductor.

FIG. 11 illustrates a method of producing a magnetic structure, e.g. a ring magnet or a disk magnet as may be used in the angular position sensor system of FIGS. 3(a) to 3(d) or FIGS. 4(a) to 4(d), based on magnetising a magnetic material. A similar technique as described in FIG. 9 is used here, mutatis mutandis.

Figure 3A:
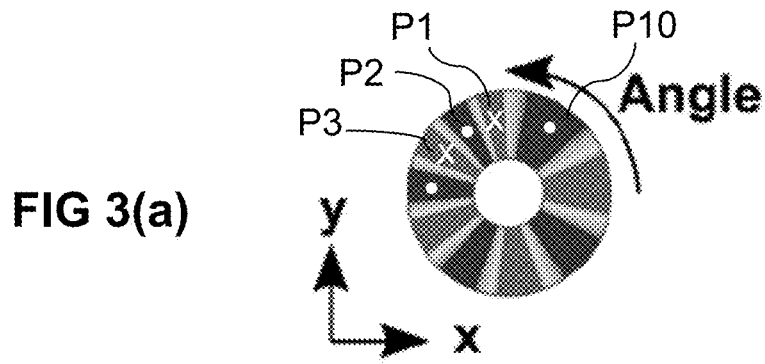
FIG. 3(a) to FIG. 3(d) illustrate an exemplary angular position sensor system according to an embodiment of the present invention.
Figure 3B:
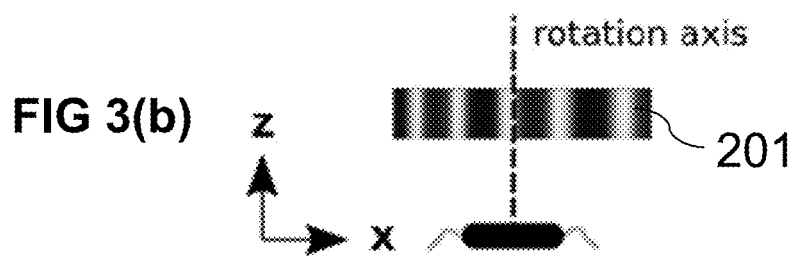
Figure 3C:
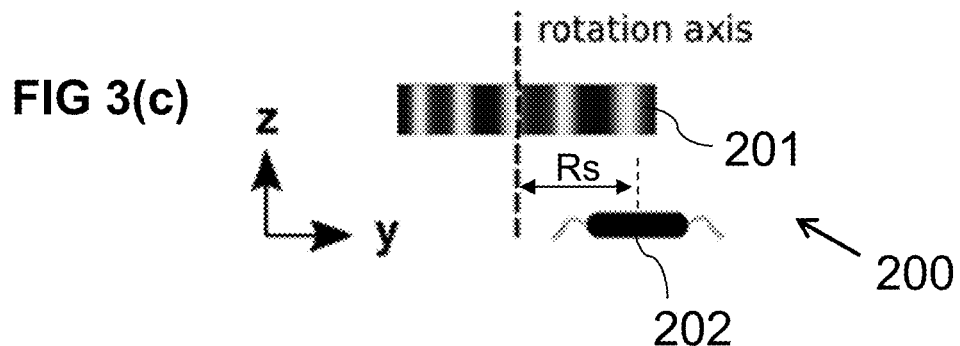
Figure 3D:
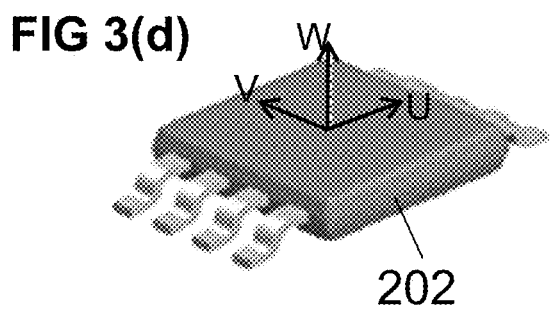
Figure 4A:
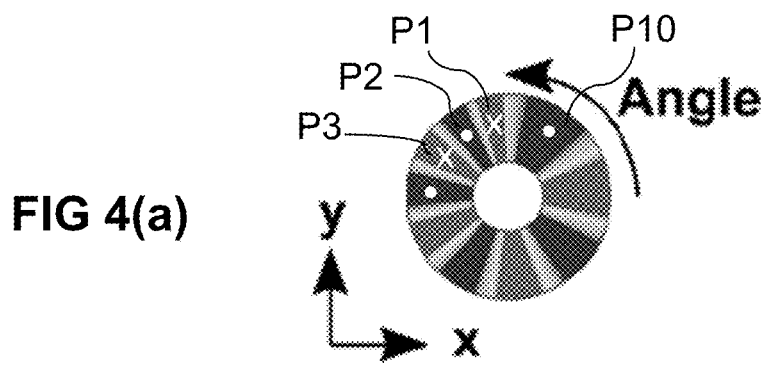
FIG. 4(a) to FIG. 4(d) illustrate another exemplary angular position sensor system according to an embodiment of the present invention, which can be seen as a variant of FIGS. 3(a) to 3(d).
Figure 4B:
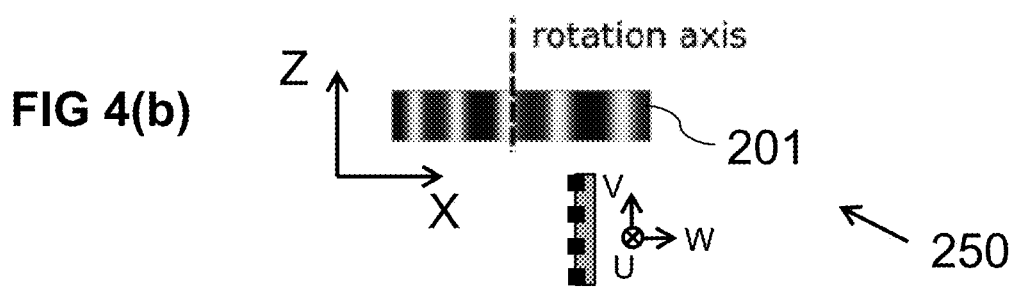
Figure 4C:
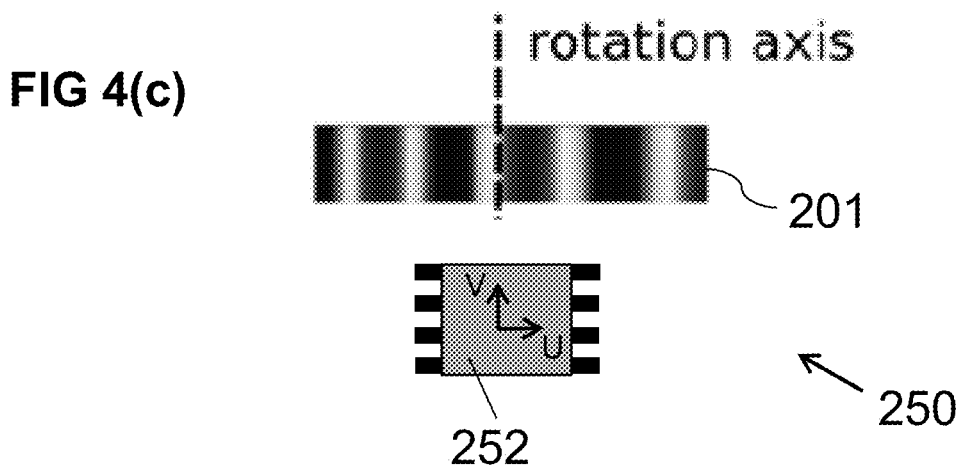
Figure 4D:
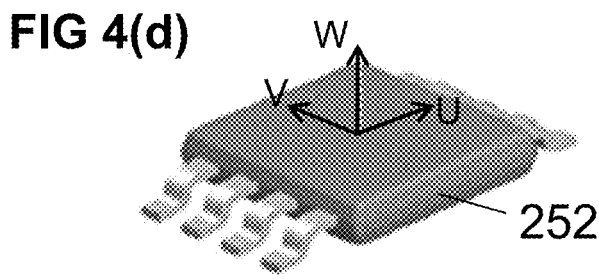

It is noted that in this drawing it is clearly shown that $\alpha 1 < \alpha 2 < \alpha 3 << \alpha 9$. In this particular example, the number of poles (which can be seen by a sensor device facing one of the ring shaped or circular surfaces, e.g. arranged as shown in FIG. 3(c) is 10, and the ratio of $\alpha 9/\alpha 1$=about 2.63, and the multiplication factor $F=\alpha 3/\alpha 2=\alpha 2/\alpha 1$=about 1.13, but as described above, the present invention is not limited thereto, and a different number of poles and/or a different ratio between the first and second angular distance, and/or a different multiplication factor F or a plurality of multiplication factors may be used. In fact, also the angular distance does not need to increase monotonically, as will be described in more detail in FIG. 20(a) to FIG. 24.

Figure 12:
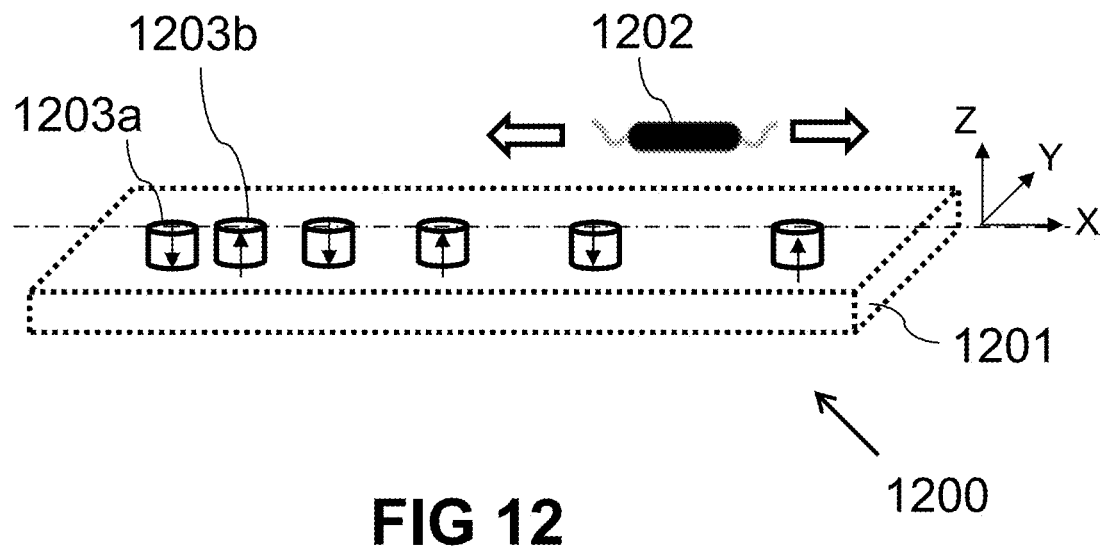
FIG. 12 illustrates yet another magnetic structure as may be used in the linear position sensor system of FIGS. 1(a) to 1(c). This magnetic structure contains a plurality of discrete magnets.

FIG. 12 illustrates yet another magnetic structure 1201 as may be used in the linear position sensor system of FIGS. 1(a) to 1(c). The magnetic structure 1201 comprises a non-magnetic structure functioning as a holder, with a plurality of openings, and in each opening a permanent magnet 1203 is inserted. The magnets can be axially magnetized, or the magnetization can also be in-plane or isotropic.

The same principles as explained above are also applicable here, mutatis mutandis. The magnets may be cylindrical magnets, but that is not absolutely required. The cylindrical magnets may have a single diameter (as shown) or may have different diameters (not shown). What is important is that the distance between the centers of the magnets varies.

The sensor device 1202 is oriented such that its semiconductor substrate is perpendicular to the direction of the remanent magnetic field inside the magnets, and such that its internal X-axis (along which the sensor elements are spaced apart, e.g. as illustrated for in FIG. 6(a) to FIG. 6(f)), is parallel to the X-direction of the magnetic structure, along which the discrete magnets are located.

Figure 13:
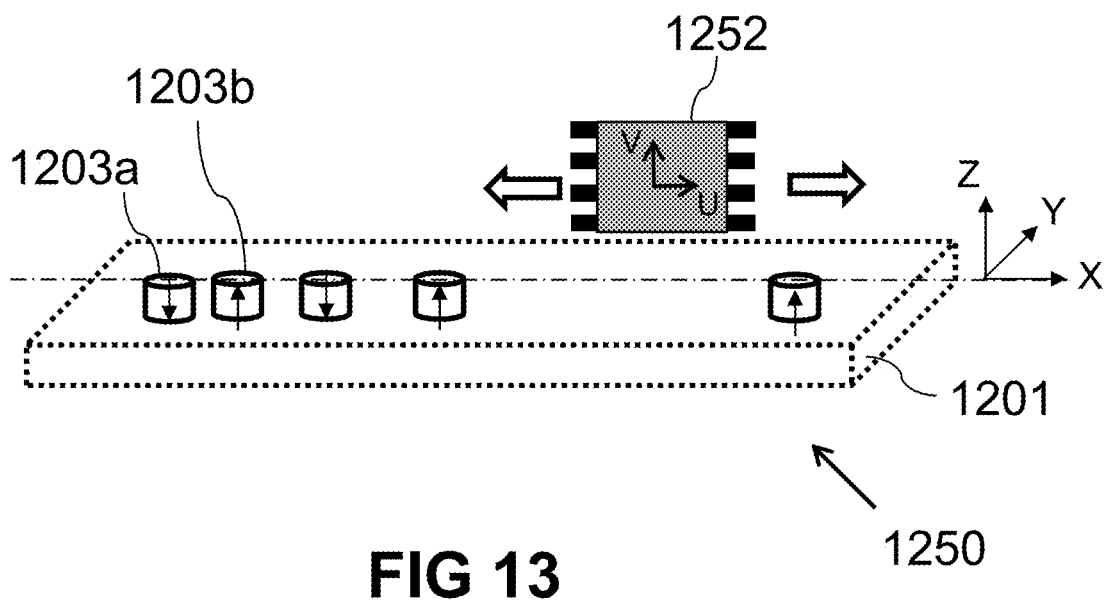
FIG. 13 shows a variant of FIG. 12.

FIG. 13 shows a variant of FIG. 12, where the sensor device 1252 is oriented such that its semiconductor substrate is parallel to the direction of the remanent magnetic field inside the magnets 1203, and such that its internal U-axis (along which the sensor elements are spaced apart, e.g. as illustrated in FIG. 7(a) to FIG. 7(d)), is parallel to the X-direction of the magnetic structure, along which the discrete magnets are located.

FIG. 14 illustrates a method 1400 of determining a position of a sensor device relative to a magnetic structure having a plurality of poles (e.g. the magnetic structure of FIGS. 1(a) to 1(c) or FIGS. 2(a) and 2(b) or FIGS. 3(a) to 3(d) or FIGS. 4(a) to 4(d) or FIG. 12 or FIG. 13 or FIGS. 18(a) and 18(b) or FIGS. 20(a) and 20(b)), wherein a distance (Xpp, αpp) between centres of adjacent poles varies along a movement direction or along the movement trajectory, and wherein the magnetic structure is movable (e.g. linearly or rotationally) relative to the sensor device or vice versa, and wherein the sensor device comprises a plurality of at least two magnetic sensor elements (e.g. as shown in FIG. 6(c) or FIG. 6(d) or FIG. 7(d)) capable of measuring one pair of two orthogonal magnetic field components at a sensor location.

The method 1400 comprises the steps of:
a) measuring 1401 at a first sensor location (e.g. x1 or u1) a first magnetic field component (e.g. Bx1 or Bu1) oriented in a first direction (e.g. X or U, e.g. the movement direction or the direction of relative movement, or tangential to the movement trajectory), and a second magnetic field component (e.g. Bz1 or Bv1) oriented in a second direction perpendicular to the first direction;
b) determining a fine signal (Sf) based on a ratio (R1) of said first and second magnetic field component (e.g. Bx1 and Bz1) measured at the first sensor location;
c) determining 1403 a coarse signal (Sc) based on (e.g. based solely) on said first and second magnetic field component (e.g. Bx1 and Bz1);
d) determining 1404 the position (e.g. X, α) based on both the coarse signal (Sc) and the fine signal (Sf).

In an embodiment, step (b) comprises: calculating the fine signal as a goniometric function of said ratio, e.g. according to the formula: Sf=arctan(R1), where R1=Bx1/Bz1, thus Sf=arctan(Bx1/Bz1).

In an embodiment, step (c) comprises: calculating the coarse signal Sc as a function of S, S being the sum of the squares of the magnetic field components Bx1 and Bz1.

In an embodiment, step (c) comprises: calculating the coarse signal Sc according to one of the formulas [6.1] to [6.4].

It is an advantage of this method that it requires only a very simple sensor structure with a single sensor location where two orthogonal components are measured.

In particular embodiments, the sensor system comprises a sensor device having only two Hall elements, namely only one horizontal Hall element and only one vertical Hall element (see FIG. 6(d)), or having only two horizontal Hall elements and IMC (see FIG. 6(c)), or having only two vertical Hall elements defining an angle of 90° (see FIG. 7(d)). This requires only very simple hardware.

FIG. 15 illustrates a method 1500 of determining a position of a sensor device relative to a magnetic structure having a plurality of poles (e.g. the magnetic structure of FIGS. 1(a) to 1(c) or FIGS. 2(a) and 2(b) or FIGS. 3(a) to 3(d) or FIGS. 4(a) to 4(d) or FIG. 12 or FIG. 13 or FIGS. 18(a) and 18(b) or FIGS. 20(a) and 20(b)), wherein a distance (Xpp, αpp) between centres of adjacent poles varies along a movement direction or along the movement trajectory, and wherein the magnetic structure is movable (e.g. linearly or rotationally) relative to the sensor device or vice versa, and wherein the sensor device comprises a plurality of at least four magnetic sensor elements (e.g. as shown in FIG. 6(a) or FIG. 6(b) or FIG. 7(a) or FIG. 7(b)) capable of measuring a first pair of two orthogonal magnetic field components (e.g. Bx1, Bx2) measured at at first sensor location (e.g. X1 or U1), and a second pair of two orthogonal magnetic field components (e.g. Bx2, Bz2) measured at second sensor location (e.g. X2 or U2).

This method 1500 comprises the steps of:
a) measuring 1501 at a first sensor location (e.g. X1 or U1), a first magnetic field component (e.g. Bx1 or Bu1) oriented in a first direction (e.g. X or U, e.g. the movement direction or the direction of relative movement, or tangential to the movement trajectory), and a second magnetic field component (e.g. Bz1 or Bv1) oriented in a second direction (e.g. Z or V) perpendicular to the first direction;
b) determining 1502 a first fine signal (Sf1) based on a ratio (R1) of said first and second magnetic field component;
c) measuring 1503 at a second sensor location (e.g. X2 or U2), spaced from the first sensor location in the first direction, a third magnetic field component (e.g. Bx2 or Bu2) parallel with the first magnetic field component (e.g. Bx1 or Bu1), and a fourth magnetic field component (e.g. Bz2 or Bv2) parallel with the second magnetic field component (e.g. Bz1 or Bv1);
d) determining 1504 a second fine signal (Sf2) based on a second ratio R2 of the third and fourth magnetic field components measured at the second sensor location;
e) determining 1505 a coarse signal (Sc) based on said first and second fine signal Sf1, Sf2;
f) determining 1506 a third fine signal (Sf3) as the first fine signal (Sf1), or as the second fine signal (Sf2), or as a sum or average or weighted average of the first and second fine signal (Sf1, Sf2);
g) determining 1507 the position (e.g. X, α) based on the coarse signal Sc and the third fine signal (Sf3).

Step (b) may comprise: calculating the first fine signal (Sf1) as a function of R1, R1 being a ratio of the field components measured at the sensor first location, R1=Bx1/Bz1, e.g. using a goniometric function.

Step (b) may comprise: calculating the first fine signal according to the formula:

$$Sf=\arctan(R1), \text{ where } R1=Bx1/Bz1, \text{ thus } Sf=\arctan(Bx1/Bz1).$$

Step (d) may comprise: calculating the second fine signal as a function of R2, R2 being a ratio of the field components measured at the second location, R2=Bx2/Bz2, e.g. using a goniometric function.

Step (d) may comprise: calculating the first fine signal according to the formula:

$$Sf=\arctan(Bx2/Bz2).$$

Step (e) may comprise: calculating the coarse signal Sc based on a difference between the first and the second fine signal, for example according to the formula: Sc=f(Sf1−Sf2), or Sc=1/f(Sf1−Sf2), for example according to the formula: Sc=Sf1−Sf2+k*360°, where k is an integer value chosen such that Sc is a value in the range from 0° to 360°.

It is noted that this method does not use magnetic field gradients.

FIG. 16 illustrates a method 1600 of determining a position of a sensor device relative to a magnetic structure having a plurality of poles (e.g. the magnetic structure of FIGS. 1(a) to 1(c) or FIGS. 2(a) and 2(b) or FIGS. 3(a) to 3(d) or FIGS. 4(a) to 4(d) or FIG. 12 or FIG. 13 or FIGS. 18(a) and 18(b) or FIGS. 20(a) and 20(b)), wherein a distance (Xpp, αpp) between centres of adjacent poles varies along a movement direction or along the movement trajectory, and wherein the magnetic structure is movable (e.g. linearly or rotationally) relative to the sensor device or vice versa, and wherein the sensor device comprises a plurality of at least four magnetic sensor elements (e.g. as shown in FIG. 6(a) or FIG. 6(b) or FIG. 7(a) or FIG. 7(b)) capable of measuring a first pair of two orthogonal magnetic field components (e.g. Bx1, Bz1) measured at a first sensor location (e.g. X1 or U1), and a second pair of two orthogonal magnetic field components (e.g. Bx2, Bz2) measured at second sensor location (e.g. X2 or U2).

This method 1600 comprises the steps of:
a) measuring 1601 at a first sensor location (e.g. X1 or U1), a first magnetic field component (e.g. Bx1 or Bu1) oriented in a first direction (e.g. X or U, e.g. the movement direction or the direction of relative movement, or tangential to the movement trajectory), and a second magnetic field component (e.g. Bz1 or Bv1) oriented in a second direction (e.g. Z or V) perpendicular to the first direction;
b) determining 1602 a first fine signal (e.g. Sf1) based on a first ratio (R1) of said first and second magnetic field component (Bx1, Bz1), both measured at the first sensor location;
c) measuring 1603 at a second sensor location (e.g. X2 or U2), spaced from the first sensor location in the first direction, a third magnetic field component (e.g. Bx2 or Bu2) parallel with the first magnetic field component (e.g. Bx1 or Bu1), and a fourth magnetic field component (e.g. Bz2 or Bv2) parallel with the second magnetic field component (e.g. Bz1 or Bv1);
d) optionally determining 1604 a second fine signal (Sf2) based on a second ratio (R2) of the third and fourth magnetic field component (Bx2, Bz2), both measured at the second location;
e) calculating 1605 a first gradient (dBx/dx) based on the first and third magnetic field component (Bx1, Bx2), and calculating a second gradient (dBz/dx) based on the second and fourth magnetic field component (Bz1, Bz2);
f) determining 1606 a coarse signal Sc based on at least some of said magnetic field components and/or said magnetic field gradients;
g) determining 1607 a third fine signal (Sf3) as the first fine signal (Sf1), or as the second fine signal (Sf2), or as a sum or average or weighted average of the first and second fine signal (Sf1, Sf2);
h) determining 1608 the position (e.g. X, α) based on the coarse signal Sc and the third fine signal (Sf3).

Step (b) may comprise: calculating the first fine signal as a function of R1, R1 being a ratio of the field components measured at the sensor first location, e.g. R1=Bx1/Bz1, e.g. using a goniometric function.

Step (b) may comprise: calculating the first fine signal according to the formula:

$$Sf=\arctan(Bx1/Bz1).$$

Step (e) may comprise: calculating the coarse signal based on a sum of products of magnetic field components and a sum of squares of magnetic field gradients.

Step (e) may comprise: calculating the coarse signal Sc based on one of the following formulas:

$$Sc=(Bx1*Bx1+Bz1*Bz1)/(dBx/dx*dBx/dx+dBz/dx*dBz/dx), \text{ or}$$

$Sc=(Bx1*Bx2+Bz1*Bz2)/(dBx/dx*dBx/dx+dBz/dx*dBz/dx)$, or $Sc=(Bx2*Bx2+Bz2*Bz2)/(dBx/dx*dBx/dx+dBz/dx*dBz/dx)$, or $Sc=sqrt(Bx1*Bx1+Bz1*Bz1)/sqrt(dBx/dx*dBx/dx+dBz/dx*dBz/dx)$, or $Sc=sqrt(Bx1*Bx2+Bz1*Bz2)/sqrt(dBx/dx*dBx/dx+dBz/dx*dBz/dx)$, or $Sc=sqrt(Bx2*Bx2+Bz2*Bz2)/sqrt(dBx/dx*dBx/dx+dBz/dx*dBz/dx)$, or the reciprocal of these expressions, e.g.

$Sc=(dBx/dx*dBx/dx+dBz/dx*dBz/dx)/(Bx1*Bx1+Bz1*Bz1)$ for the first expression, etc.

Step (g) may comprise calculating the third fine signal according to any of the following formulas: Sf3=Sf1; or Sf3=Sf2; or Sf3=(Sf1+Sf2)/2; or Sf3=(Sf1+2*Sf2)/3, etc.

FIG. 17 illustrates a method 1700 of determining a position of a sensor device relative to a magnetic structure having a plurality of poles (e.g. the magnetic structure of FIGS. 1(a) to 1(c) or FIGS. 2(a) and 2(b) or FIGS. 3(a) to 3(d) or FIGS. 4(a) to 4(d) or FIG. 12 or FIG. 13 or FIGS. 18(a) and 18(b) or FIGS. 20(a) and 20(b)), wherein a distance (Xpp, app) between centres of adjacent poles varies along a movement direction or along the movement trajectory, and wherein the magnetic structure is movable (e.g. linearly or rotationally) relative to the sensor device or vice versa, and wherein the sensor device comprises a plurality of at least six magnetic sensor elements (e.g. as shown in FIG. 6(e) or FIG. 6(f)) capable of measuring a first pair of two orthogonal magnetic field components (e.g. Bx1, Bz1) measured at a first sensor location (e.g. X1 or U1), and a second pair of two orthogonal magnetic field components (e.g. Bx2, Bz2) measured at second sensor location (e.g. X2 or U2), and a third pair of two orthogonal magnetic field components (e.g. Bx3, Bz3) measured at a third sensor location (e.g. X3 or U3).

The method 1700 comprises the steps of:
a) measuring 1701 three first magnetic field components (e.g. Bx1, Bx2, Bx3) oriented in a first direction (e.g. X) at three different locations along said first direction, and calculating two first gradients (e.g. $\Delta Bx12/\Delta x$, $\Delta Bx23/\Delta x$) of these first magnetic field components;
b) measuring 1702 three magnetic field components (e.g. Bz1, Bz2, Bz3) oriented in a second direction perpendicular to the first direction, in said locations, and calculating two second gradients (e.g. $\Delta Bz12/\Delta x$, $\Delta Bz23/\Delta x$) of these second magnetic field components;
c) calculating 1703 a coarse signal (Sc) based on these gradients;
d) calculating 1704 a fine signal Sf based on one or more ratio (e.g. R1,R2,R3), each ratio being a division of a first magnetic field component (oriented in the first direction) and a corresponding second magnetic field component (oriented in the second direction) measured at the same location as the first magnetic field component;
e) determining 1705 said position (X,α) based on the coarse signal Sc and the fine signal Sf.

Step c) may comprise: calculating the coarse signal, based on the following set of formulas:
v1=arctan($\Delta Bx12/\Delta Bz12$); v2=arctan($\Delta Bx23/\Delta Bz23$); Sc=v1−v2+k*360° where k is an integer value chosen such that the value of Sc is a value in the range from 0° to 360°.

Step d) may comprise: calculating the fine signal based a first ratio R1 of a first and the corresponding second magnetic field components (Bx1, Bz1), both measured at the first sensor location, e.g. according to the formula: Sf=arctan (Bx1/Bz1).

Step d) may comprise: calculating the fine signal based on the second ratio R2 in accordance with the following formulas: R2=(Bx2/Bz2), and Sf=arctan(R2).

Step d) may comprise: calculating the fine signal based on the third ratio R3 in accordance with the following formulas: R3=(Bx3/Bz3), and Sf=arctan(R3).

Step d) may comprise: calculating the fine signal based on two of these ratios, e.g. based on R1 and R2, or R1 and R3, or R2 and R3, or based on three ratios R1, R2, R3, for example as an average, or as a weighted average.

FIG. 18(a) to FIG. 19(f) describe linear position sensor systems and FIGS. 20(a) and 20(b) to FIG. 24 describe angular position sensor systems comprising a magnetic structure in which the pole distances do not vary monotonically along the movement trajectory, but increase over a first portion, and decrease over a second portion of the movement trajectory.

Figure 18A:
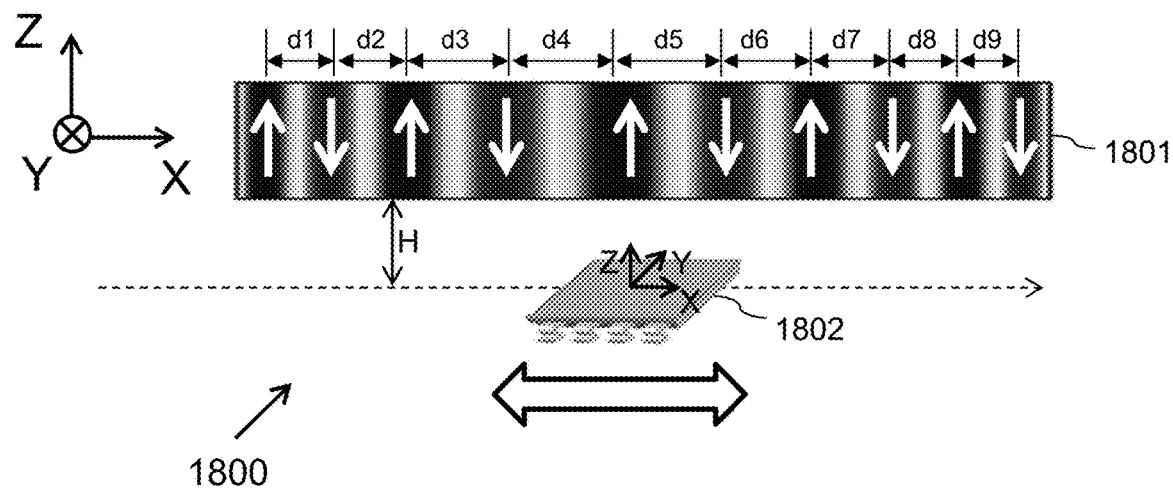
FIG. 18(a) shows a schematic block-diagram of another linear position sensor system according to an embodiment of the present invention, wherein the distances between adjacent poles of the magnetic structure increase in a first portion and decrease in a second portion of the magnetic structure, which can be seen as a variant of FIGS. 1(a) to 1(c).

FIG. 18(a) shows a schematic block-diagram of another linear position sensor system 1800, which can be seen as a variant of FIGS. 1(a) to 1(c). As can be seen in FIG. 18(a), the pole distances between centers of adjacent poles also vary along the movement direction (X) of the sensor device, but in contrast to FIGS. 1(a) to 1(c), the distances of the magnetic structure of FIGS. 18(a) and 18(b) do not increase or decrease monotonically from one end of the magnetic structure 1801 to the other end, but the distances increase over a first portion of the magnetic structure, and decrease over a second portion of the magnetic structure. In the particular example of FIG. 18(a), when considering the distances from the left end to the right end of the drawing, the distances first increase from d1 to d5, and then decrease from d6 to d9.

The magnetic field created by the magnetic structure 1801 of FIG. 18(a) will be different from that created by the magnetic structure 101 of FIGS. 1(a) to 1(c), and the sensor device 1802 is adapted accordingly (e.g. by using a non-volatile memory holding different values or different coefficients of polynomials), as will be explained in more detail in FIG. 19(a) to FIG. 19(f). The main principles, however, remain the same, since the linear position is still calculated based on a coarse signal Sc and a fine signal Sf.

FIG. 19(a) to FIG. 19(f) show signals similar to those of FIG. 5(b) to FIG. 5(h), but for the magnet structure of FIG. 18(a) in which the pole distances do not monotonically increase.

Figure 19A:
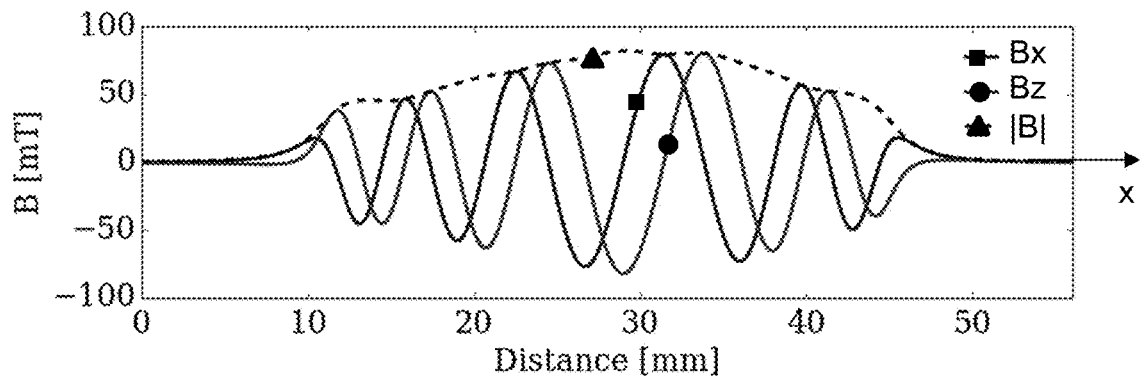
FIG. 19(a) to FIG. 19(f) show waveforms of signals which can be measured by the sensor device of FIG. 18(a) or can be derived therefrom.

FIG. 19(a) shows magnetic field components Bx (black square), Bz (black circle), and a magnitude |B| (black triangle) which can be derived therefrom, e.g. using formula [1].

Figure 19B:
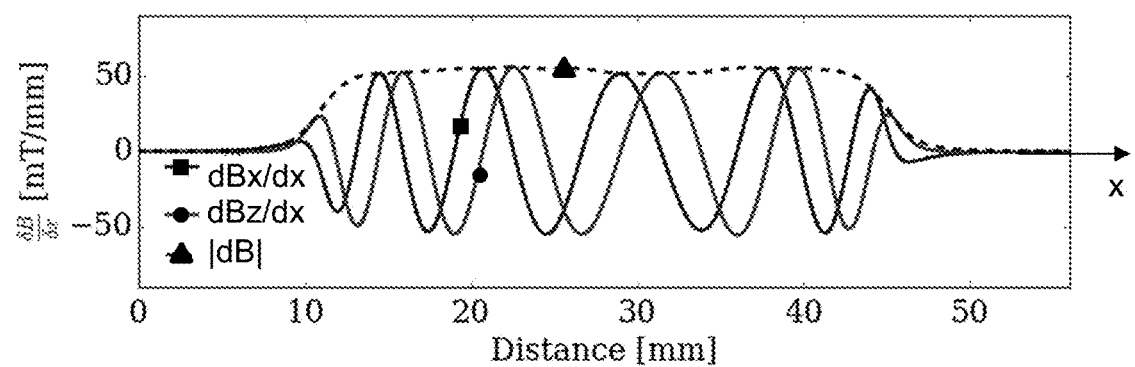

FIG. 19(b) shows gradient signals dBx/dx (black square), dBz/dx (black circle), and a magnitude |dB| (black triangle) which can be derived therefrom, e.g. using formula [2].

Figure 19C:
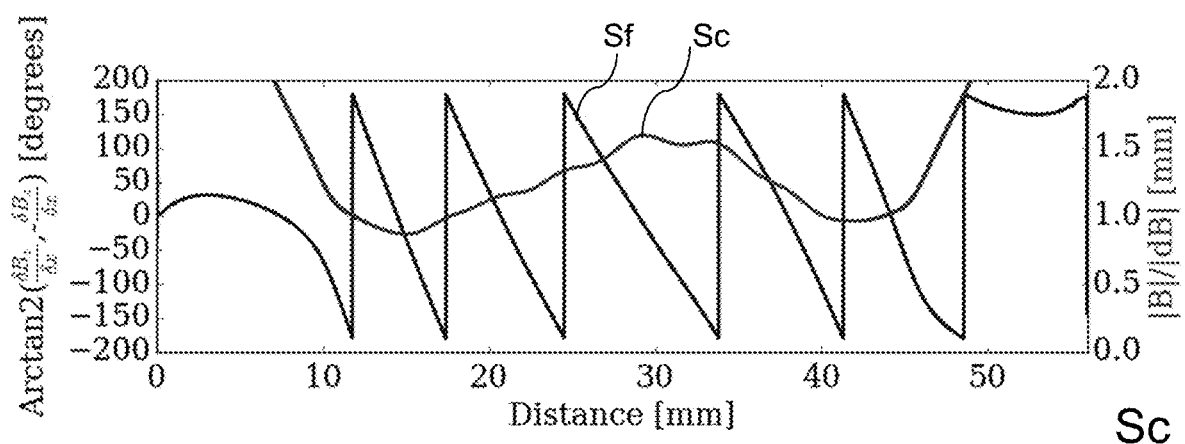

FIG. 19(c) shows a coarse signal Sc, as can be obtained by formula [3], and a fine signal Sf as can be obtained by formula [6], but it will be understood by the reader that these are not the only possible formulas which can be used to obtain a coarse signal and a fine signal. For example, any of the formulas [4.11a] to [4.11j] can be used to calculate a coarse signal Sc, and any of the formulas [4.12a] to [4.12d] can be used to calculate a fine signal Sf.

It was surprisingly found that a fine signal Sf calculated in accordance with formula [4.12b], Sf=Arctan(Bx1/Bz1), looks very similar to the sawtooth-signal shown in FIG. 19(c), despite the fact that the magnitude of the component signals is not constant.

Figure 19D:
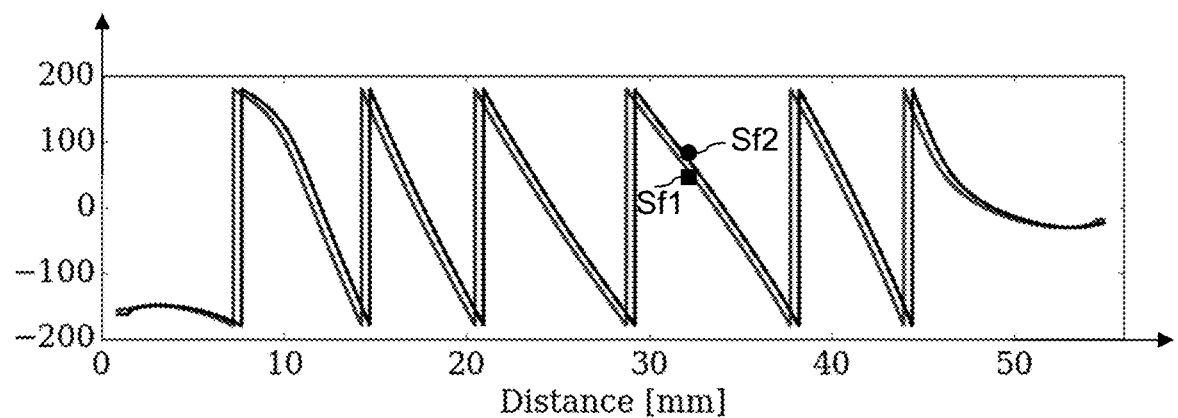

FIG. 19(d) shows two saw-tooth-waveforms similar to those of FIG. 19(c).

In some embodiments, the saw-tooth waveforms are determined as: Sf1=arctan(Bx1/Bz1) and Sf2=arctan(Bx2/Bz2). This can be performed by a sensor device having only two sensor locations (see e.g. FIG. 6(a), FIG. 6(b), FIG. 7(a), FIG. 7(b)) and is not based on gradients.

In other embodiments, the saw-tooth waveforms are determined as: Sf1=arctan($\Delta$Bx12/$\Delta$Bz12) and Sf2=arctan ($\Delta$Bx23/$\Delta$Bz23). This requires three sensor locations (see e.g. FIG. 6(e), FIG. 6(f), or a variant of FIG. 7(a) and FIG. 7(b) with three sensor locations) and is based on gradients.

Figure 19E:
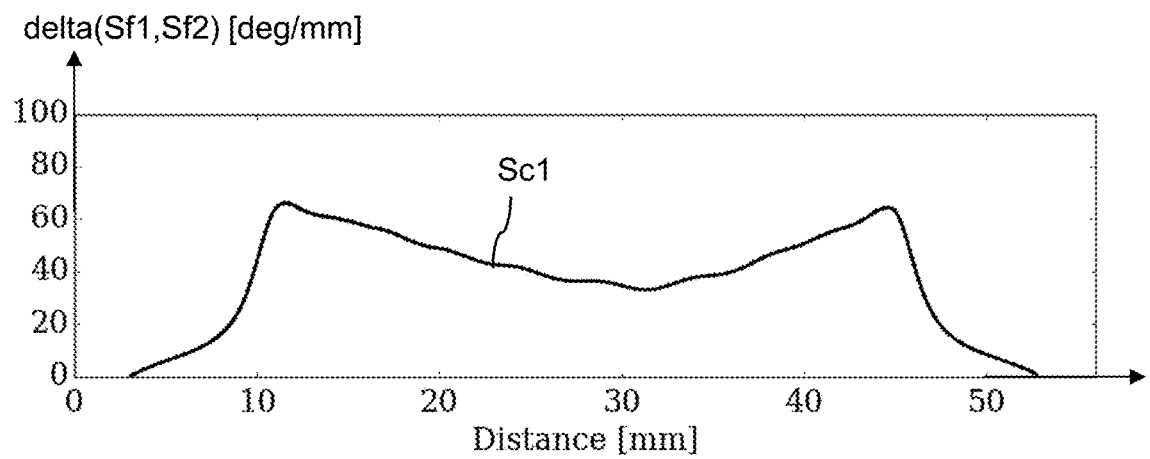
Figure 19F:
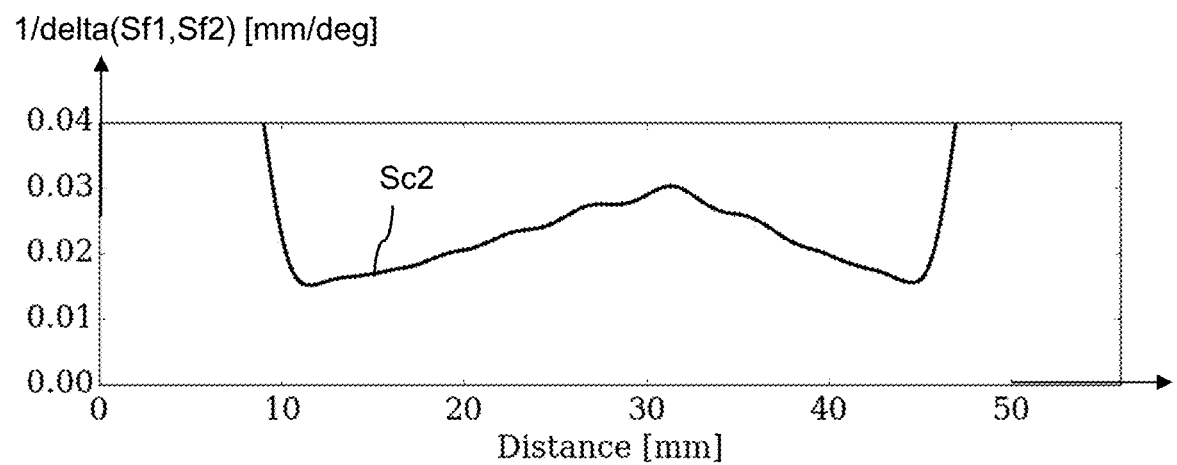

In both cases, however, a coarse signal Sc1 can be determined as a difference between Sf1 and Sf2, e.g. Sc1= (Sf1−Sf2) as shown in FIG. 19(e), or as Sc2=1/(Sf1−Sf2) as shown in FIG. 19(f), which is the reciprocal or "multiplicative inverse" of the signal Sc1 of FIG. 19(e).

In an embodiment, the signal Sc1 of FIG. 19(e) is used as the coarse signal, and the linear position is calculated based on the combination of Sc1 and a fine signal Sf, e.g. chosen equal to one of Sf1, Sf2 of FIG. 19(d) or an average or weighted average of Sf1 and Sf2.

In another embodiment, the signal Sc2 of FIG. 19(c) is used as the coarse signal, and the linear position is calculated based on the combination of Sc2 and a fine signal Sf, e.g. chosen equal to one of Sf1, Sf2 of FIG. 19(d) or an average or weighted average of Sf1 and Sf2.

The determination of the actual position of the sensor device relative to the magnet can be determined in the same manner as explained in FIG. 5(d) and FIG. 5(h).

It is noted that the magnetic structure is preferably asymmetric, e.g. by using a first factor F1 for the pole distances in the first (increasing) portion, and a second factor F2 larger than F1 for the pole distances in the second (decreasing) portion. Referring back to the example of FIG. 18(a), the distances d1-d5 may increase according to a first factor F1 over said first portion, and may decrease in accordance with a second factor F2, different from the first factor F1, over said second portion. As can be appreciated from FIG. 19(e) and FIG. 19(f), the effect hereof is that the coarse signals Sc1, Sc2 will have a different "slope" over the first and second portion, which may help to increase the probability that the combination of the Sc and Sf values are unique over the entire range. As already indicated above (when discussing FIGS. 1(a) to 1(c)), many values of Factor1 and Factor2 can be used, for example in the range from about 111% to about 800%, or from 111% to 400%. In fact, it is not required that the distances d1-d5 vary in a multiplicative way using a constant factor F1, but this is convenient for the understanding and the description. It suffices that the distances are different.

Figure 18B:
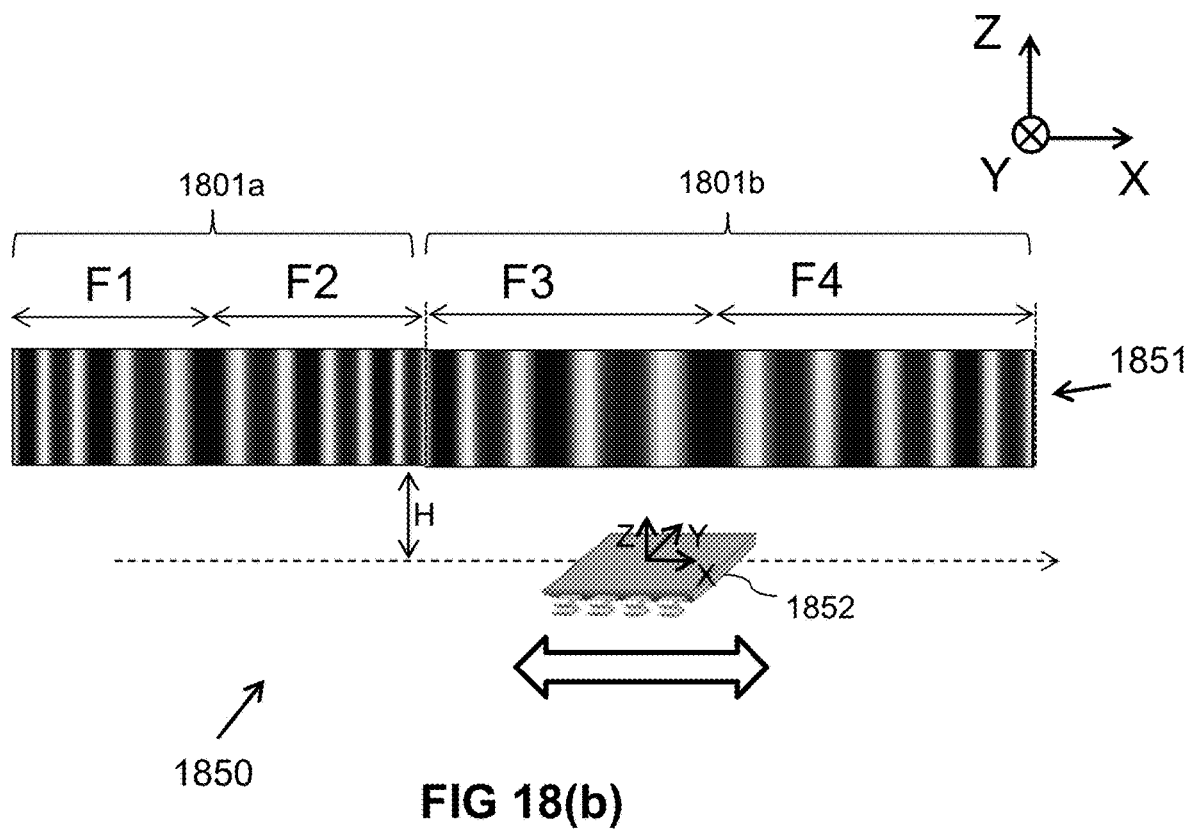
FIG. 18(b) shows a schematic block-diagram of another linear position sensor system according to an embodiment of the present invention, comprising two magnets, each having a magnet as described in FIG. 18(a).

FIG. 18(b) shows a system 1850 comprising at least two magnetic structures 1801a, 1801b as shown in FIG. 18(a), each structure having different factors. Again, factors are only used here for ease of explanation, but they are not absolutely required. It suffices that the pole-distances are different. In the specific example shown, the system comprises: (i) a first magnetic structure 1801a identical to that of FIG. 18(a) having a first portion in which the distances increase by a factor F1, and a second portion in which the distances decrease by a factor F2 different from F1, and (ii) a second magnetic structure 1801b having a first portion in which the distances increase by a factor F3 different from F1 and F2, and a second portion in which the distances decrease by a factor F4 different from any of F1 to F3.

While the system of FIG. 18(b) contains only two different magnetic structures, of course the present invention is not limited thereto, and in alternative embodiments, the system may have 3 different magnets, or 4 different magnets, or even more, allowing to determine a unique position over an even larger range, with high accuracy. If gradients are used, the position can moreover be determined in a manner which is highly robust against an external disturbance field, and against magnetic degradation and temperature variations. If gradients are not used, an accurate position of the sensor device 1852 relative to the magnetic structure can still be determined in the absence of an external disturbance field, or in the presence of a relatively weak disturbance field, especially if temperature compensation and/or stress compensation is used.

An advantage of using magnetic structures having a portion with increasing pole distances and a portion with decreasing pole distances, mounted adjacent each other (as shown in FIG. 18(b)), is that the magnetic signals (not shown, but similar to FIGS. 19(a) to 19(f)) will vary more smoothly near the transitions between the different magnetic structures, rather than abruptly. This offers the further advantage that the coarse signal(s) Sc and the fine signal(s) Sf derived therefrom may be less erratic, and that the linear position derived therefrom may be more accurate.

Although not explicitly shown, a combined magnetic structure as shown in FIG. 18(b) will create a coarse signal with four zones: a first zone related to factor F1, a second zone related to factor F2, a third zone related to factor F3 and a fourth zone related to factor F4, but in contrast to the left end and the right end of the signals shown in FIG. 19(a) to FIG. 19(c), advantageously, the signals of the combined structure will vary smoothly not only between the first and second zone, and between the third and fourth zone, but also between the second and third zone. Since the slope of the coarse signal in each of these four zones is different, the probability that a particular value of the fine signal corresponds to only one coarse signal is very high, which can easily be verified by performing a simulation using specific dimensions and factors of the particular magnetic structure intended to be used.

The sensor device 1852 can find the unique position relative to the combined magnetic structure in the same or a similar manner as described above (see FIG. 5(d)), by first determining a set of candidate positions based on the fine signal only, and then selecting the best of these candidate positions, by looking also at the coarse signal (or coarse signals). In this way, the unique position can be determined with respect to the total length formed by the two (or more) magnetic structures which are located adjacent each other.

In a variant (not shown) of FIG. 18(b), the position sensor system comprises four different magnetic structures, each having a monotonically increasing distance, as shown in FIGS. 1(a) to 1(c):
  i) a first magnetic structure with factor F1 for the first zone,
  ii) a second magnetic structure with factor F2 for the second zone, but turned by 180° such that the transition between the end of the first magnetic structure and the beginning of the second magnetic structure is less abrupt,
  iii) a third magnetic structure with factor F3 for the third zone,
  iv) a fourth magnetic structure with factor F4 for the fourth zone, but turned by 180° such that the transition between the end of the third magnetic structure and the beginning of the fourth magnetic structure is less abrupt.

By choosing four different factors F1 to F4, a magnetic structure identical or very similar to the one shown in FIG. 18(b), (which is composed of only two magnetic structures, but each having increasing and decreasing distances) will be obtained. The magnetic field generated by such a structure can be simulated, in a similar manner as described above, and curves similar to those shown in FIG. 19(a) to FIG. 19(f) can be generated, and the sensor device of this sensor system can be configured to find a unique position along this combined magnetic structure, in a manner similar as described above.

FIG. 20(a) and FIG. 20(b) show an axially magnetized ring magnet 2001, in top view and perspective view respectively. This magnet can be seen as a variant of the ring magnet shown in FIGS. 3(a) to 3(d), FIGS. 4(a) to 4(d) and FIG. 11. The magnet 2001 comprises a plurality of poles (in the example: 10 poles can be seen at the top surface). The angular distances α1, α2, α3, α4, α5, α6 between centres of adjacent poles (measured at the periphery of the ring magnet) increase over a first portion of the ring magnet (from α1 to α6) and the angular distances α6, α7, α8, α9, α10, α1 decrease over a second portion of the ring magnet (from α6 to α10) when "walking" at the periphery in clockwise direction. (the same is true in counter-clockwise direction). Or expressed in mathematical terms, in the example shown in FIG. 20(a), α1 is the smallest angular distance and α6 is the largest angular distance, and α1<α2<α3<α4<α5<α6, and α6>α7>α8>α9>α10>α1. As can be seen, by choosing α10 only slightly different from α1, the transition from α10 to α1, and vice versa, will be very smooth.

Or stated in simple terms, FIG. 20(a) and FIG. 20(b) show a ring magnet, (but the same is true for a disk magnet) which is axially magnetized and has a plurality of "pie segments" of different sizes. The sizes vary in such a way, that, when starting from the pie having the smallest size, and turning in clockwise direction, the size of the pie segments encountered first increase, and then decrease.

Said angular distances may increase with a first predefined factor F1 in said first angular portion, and may decrease with a second predefined factor F2, different from the first predefined factor F1, over said second angular portion. But as already mentioned above, a constant factor F1 over the first portion is not required, and also a constant factor F2 over the second portion is not required but helps to explain the invention in a simple manner. In order to work, it suffices that the pole-distances are different. The number of pies in the first angular portion (where the distances increase) may be the same as the number of pies in the second angular portion (where the distances decrease), or may be different from the number of pies in the second angular portion. Some specific numerical examples will be given further (in FIG. 24).

In the example of FIG. 20(a) and FIG. 20(b), the angular distances are preferably chosen such α10 is only slightly larger than α1, which is not the case in FIG. 11, where the angular distance changes abruptly from segment P10 to segment P1, because α1 is the smallest distance and α10 is the largest distance in the embodiment of FIG. 11.

Figure 22A:
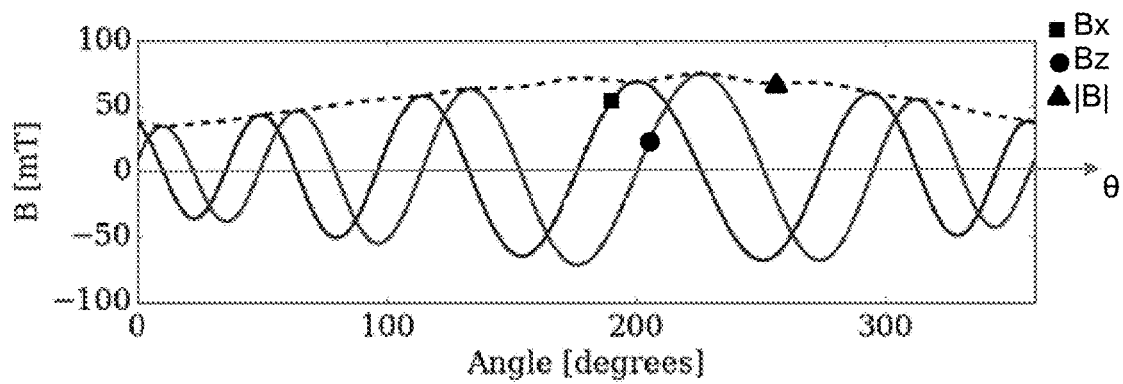
FIG. 22(a) to FIG. 22(f) show signals which can be measured by the position sensor of FIG. 21 or can be derived therefrom.
Figure 22B:
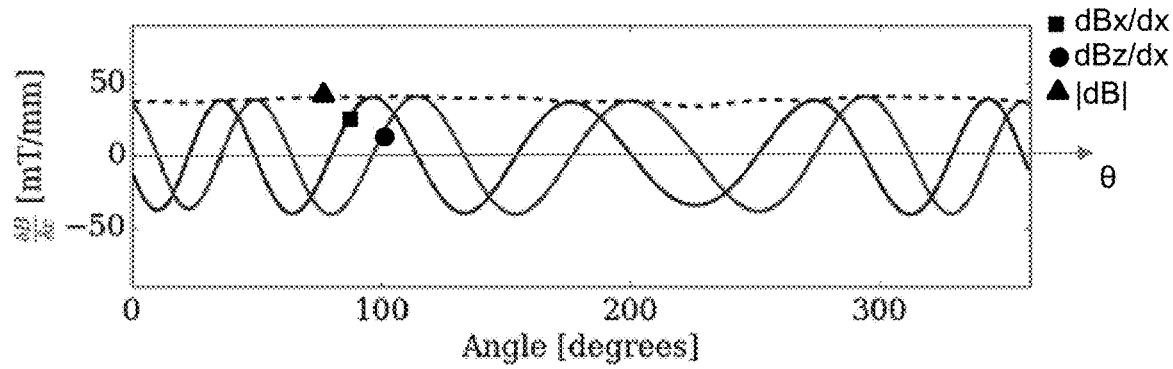
Figure 22C:
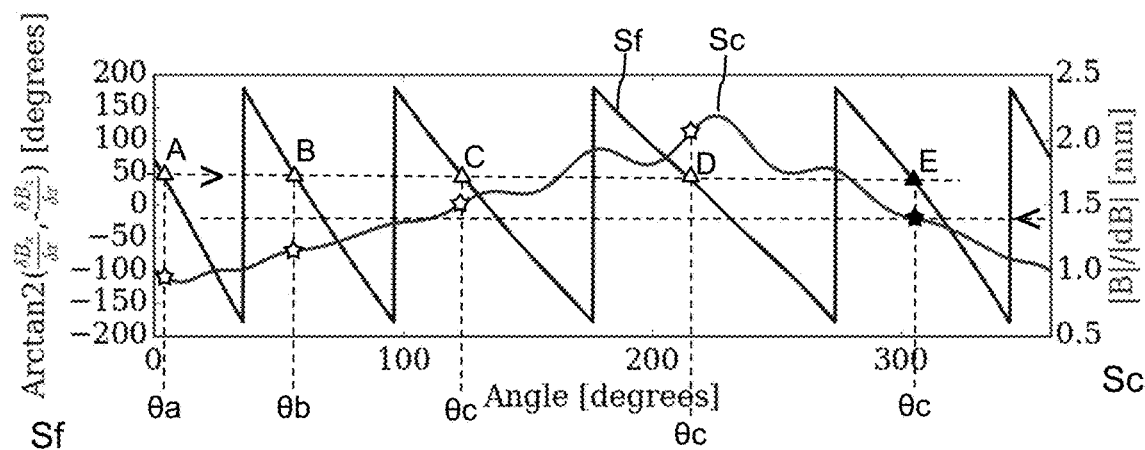
Figure 22D:
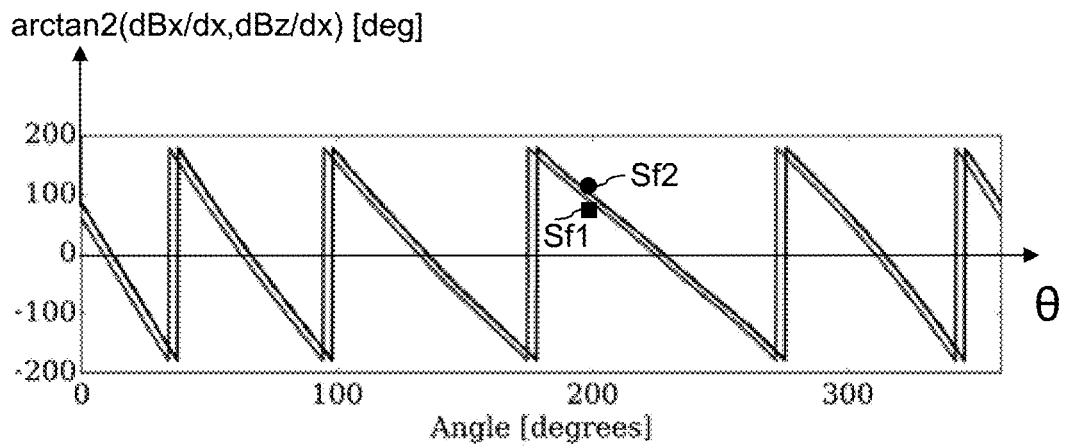
Figure 22E:
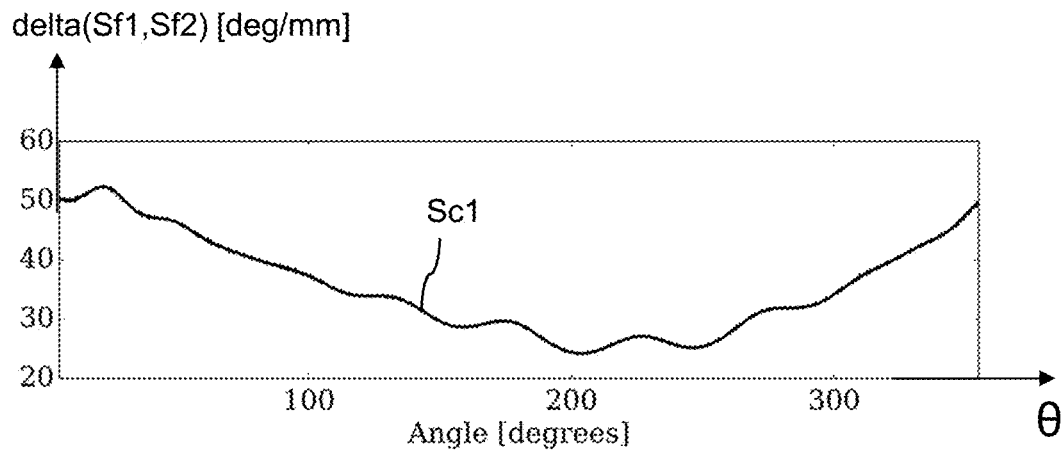
Figure 22F:
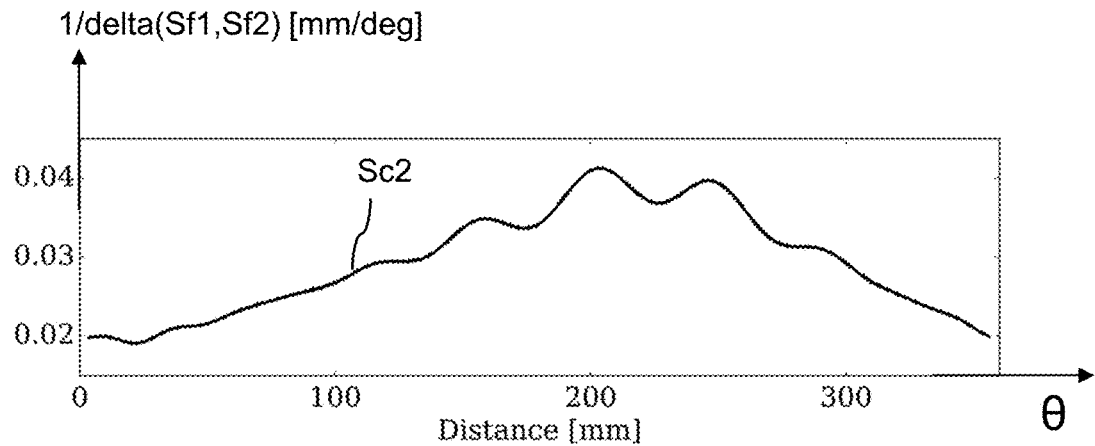

The main advantage of using a ring magnet with increasing and decreasing angular distances can be appreciated from FIG. 22(d) to FIG. 22(f), showing that the fine signals Sf1, Sf2 and the coarse signals Sc1, Sc2 are continuous near 0° and 360°, and are less erratic. This offers the further advantage that the angular position derived from these signals is more accurate over the entire 360° range, also in the vicinity of the smallest pie segment.

FIG. 21 shows an angular position sensor system 2100 comprising an axially magnetized magnet 2101 like the one shown in FIG. 20, and a position sensor device 2102 located offset (at distance Rs) from the rotation axis, facing a bottom surface of the magnet 2101. This sensor system 2100 can be seen as a variant of the sensor system of FIGS. 3(a) to 3(d), and the same principles and formulas apply, but the specific data, which is e.g. stored in the non-volatile memory of the sensor device 2102, is now based on the fine and coarse signals shown in FIG. 22(a) to FIG. 22(f). As mentioned above, this data can be determined by simulation and/or by calibration, or in any other suitable way.

FIG. 22(a) to FIG. 22(f) are similar to FIG. 5(a) to FIG. 5(h) and to FIG. 19(a) and FIG. 19(f) and will not be discussed in detail anymore. As mentioned above, even though the waveforms shown in FIG. 22(b) to FIG. 22(d) are based on gradients, that is not required for the invention to work, and similar waveforms can also be obtained without using gradients. Indeed, similar as described above, a fine signal Sf1 calculated for example as Sf1=arctan(R1)=arctan(Bx1/Bz1) will look like the sawtooth shown of FIG. 22(c), and the same is true for a second function Sf2=arctan(R2)=arctan(Bx2/Bz2) based on component signals measured at a second sensor location. These fine signals Sf1, Sf2 are slightly shifted, and will look like FIG. 22(d), and a difference between these signals will look like the signal Sc1 of FIG. 22(e), and the reciprocal of said difference will look like the signal Sc2 of FIG. 22(f). An advantage of not using gradients is that the sensor device needs only a single sensor location capable of measuring two orthogonal components (e.g. Bx1 and Bz1), or only two sensor locations, each capable of measuring two orthogonal components. Thus, the size of the sensor device can be decreased.

FIG. 23(a) and FIG. 23(b) show a radially magnetized ring magnet 2301, in top view and in perspective view respectively. This magnet 2301 can be seen as a variant of the magnet of FIGS. 20(a) and 20(b), except that the magnet of FIGS. 23(a) and 23(b) is radially magnetized, whereas the magnet of FIGS. 20(a) and 20(b) is axially magnetized. Everything else described above for the axially magnetized magnet 2001 of FIGS. 20(a) and 20(b), is also applicable for the radially magnetized magnet 2301 of FIGS. 23(a) and 23(b), in particular related to the angular distances α1 to α10, the first portion in which the distances increase, and the second portion in which the distances decrease.

FIG. 24 shows an angular position sensor system 2400 comprising a radially magnetized magnet 2401 like the one shown in FIGS. 23(a) and 23(b), and a position sensor device 2402 located outside of the magnet, at a radial distance Rs from the rotation axis larger than the outer radius of the ring magnet. This position is sometimes referred to as "on the equator". The sensor device 2402 is facing a cylindrical side surface of the magnet 2401. The sensor device 2402 contains a semiconductor substrate. A coordinate system with three orthogonal axes X,Y,Z is attached to the sensor device such that the X and Y axis are parallel to the semiconductor plane, and the Z-axis is orthogonal to the semiconductor plane.

In an embodiment, the sensor device 2402 has a sensor structure capable of measuring a magnetic field component Bx1 in the X-direction parallel to the semiconductor substrate, in a circumferential direction of the magnet, and a magnetic field component Bz1 oriented perpendicular to the semiconductor substrate of the sensor device, and oriented in a radial direction of the magnet, for example as shown in FIG. 6(c) or FIG. 6(d). In this case, an angular position can be determined using the method of FIG. 14.

In another embodiment, the sensor device 2402 is configured for measuring an in-plane gradient dBx/dx of a magnetic field component Bx along the X-direction (circumferential direction of the magnet), and an out-of-plane gradient dBz/dx of a magnetic field component Bz oriented in the Z-direction (radial direction of the magnet) along the X-direction. The sensor device is oriented such that the X-axis is oriented in a circumferential direction of the magnet, i.e. tangential to an imaginary circle having a center on the rotation axis of the magnet, and such that the Z-axis is oriented in a radial direction of the magnet. As a consequence, the Y-axis is parallel to the rotation axis of the magnet, Bx is oriented in a circumferential direction of the magnet, and Bz is oriented in a radial direction of the magnet. The sensor device 2402 of FIG. 24 will measure signals Bx and Bz which are very similar to the signals measured by the sensor device of FIG. 21, and hence also the gradient signals dBx/dx and dBz/dx are very similar, and from these gradient signals, a fine signal Sf and a coarse signal Sc can be derived, similar to what is shown in FIG. 22(a) to FIG. 22(f).

In a variant of the magnet of FIGS. 20(a) and 20(b) and FIGS. 23(a) and 23(b), the ring magnet has exactly four pie segments, with four different pie sizes, namely size1, size2, size3, size4, wherein size1 is the smallest size, and size3 is the largest size, and wherein:
 a) size1<size4<size2<size3, or
 b) size1<size2<size4<size3

In a particular example of (a), the sizes are: size1=70°, size2=95°, size3=110°, and size4=85°.

In a particular of (b), the sizes are: size1=70°, size2=85°, size3=110°, and size4=95°.

But of course the present invention is not limited to these particular examples, and the skilled person having the benefit of the present disclosure can easily find other suitable values.

In another variant of the magnet of FIGS. 20(a) and 20(b) and FIGS. 23(a) and 23(b), the ring magnet has exactly six pie segments, with six different pie sizes, namely size1, size2, size3, size4, sizes, size6, wherein size1 is the smallest size, and size4 is the largest size, and wherein:
 a) size1<size6<size2<size5<size3<size4, or
 b) size1<size6<size2<size3<size5<size4, or
 c) size1<size2<size6<size5<size3<size4, or
 d) size1<size2<size6<size3<size5<size4.

In a particular example of (a), the sizes are: size1=30°, size6=42°, size2=55°, and size5=65°, size3=78° and size4=90°. But of course the present invention is not limited to this particular example, and the skilled person having the benefit of the present disclosure can easily find other suitable values.

Finally, while the magnets shown in FIGS. 3(a) to 3(d) and FIG. 11 and FIGS. 20(a) and 20(b) and FIGS. 23(a) and 23(b) are ring magnets, the invention will also work with disk magnets.

The invention claimed is:

1. A position sensor system for determining a position of a sensor device relative to a magnetic structure, the system comprising:
 said magnetic structure comprising a plurality of poles;
 said sensor device comprising at least two sensor elements located at a first sensor location;
 the magnetic structure being movable relative to the sensor device in a movement direction or along a movement trajectory, or vice versa;
 wherein a distance between centres of adjacent poles of the magnetic structure varies along the movement direction or along the movement trajectory;
 the sensor device is adapted:
  a) for measuring at said first sensor location a first magnetic field component oriented in a first direction substantially parallel to said movement direction or tangential to said movement trajectory, and a second magnetic field component oriented in a second direction substantially perpendicular to the first direction;
  b) for determining a fine signal based on a ratio of said first and said second magnetic field component;
  c) for calculating a coarse signal based on said first and second magnetic field component; and
  d) for determining said position based on both the coarse signal and the fine signal.

2. The position sensor system according to claim 1, wherein the fine signal is determined in accordance with the following formula:
 Sf=arctan(Bx1/Bz1),
wherein Sf is the fine signal, Bx1 is the first magnetic field component oriented in the first direction, Bz1 is the second magnetic field component oriented in the second direction.

3. The position sensor system according to claim 1, wherein the magnetic structure has an elongated shape having a linear axis.

4. The position sensor system according to claim 1, wherein the magnetic structure has a curved shape having a curved axis.

5. The position sensor system according to claim 1, wherein the remanent magnetic field inside the magnetic material is oriented substantially perpendicular to the first direction or substantially parallel to said second direction.

6. The position sensor system according to claim 1, wherein said distance between centres of adjacent poles varies strict monotonically.

7. The position sensor system according to claim 1, wherein the sensor device is configured for measuring only two orthogonal magnetic field components at a single sensor location, and for deriving the coarse signal and the fine signal based only on these two orthogonal components.

8. The position sensor system according to claim 1,
 wherein the sensor device comprises only one integrated magnetic concentrator and only two horizontal Hall elements, including a first and a second horizontal Hall element arranged on opposite sides of the magnetic concentrator; or
 wherein the sensor device comprises only one integrated magnetic concentrator and only four horizontal Hall elements, arranged at a periphery of the magnetic concentrator and spaced apart by approximately 90°; or
 wherein the sensor device comprises only one horizontal Hall element and only one vertical Hall element, arranged at substantially a single sensor location; or
 wherein the sensor device comprises only two vertical Hall element, arranged at substantially a single sensor location, and oriented with their axes of maximum sensitivity in two orthogonal directions.

9. The position sensor system according to claim 1,
 wherein the sensor device comprises a first integrated magnetic concentrator and a first and a second horizontal Hall element arranged on opposite sides of the first magnetic concentrator, and a second integrated magnetic concentrator located at a predefined distance from the first magnetic concentrator, and a third and a fourth horizontal Hall element arranged on opposite sides of the second magnetic concentrator, the first, second, third and fourth horizontal Hall element being collinear; or wherein the sensor device comprises a first integrated magnetic concentrator and a first group of four horizontal Hall element arranged near an edge of the first magnetic concentrator, and a second integrated magnetic concentrator located at a predefined distance from the first magnetic concentrator, and a second group of four horizontal Hall elements arranged near an edge of the second magnetic concentrator; or wherein the sensor device comprises two horizontal Hall elements spaced over a first distance in the first direction and comprises two vertical Hall elements spaced over a second distance in the first direction.

10. The position sensor system according to claim 1, wherein the sensor device is adapted for determining said position by determining a plurality of at least two candidate positions based on the fine signal, and then selecting one of these candidate positions based on the coarse signal.

11. A method of determining a position of a sensor device relative to a magnetic structure having a plurality of poles, said sensor device comprising at least two sensor elements located at a first sensor location, the magnetic structure being movable relative to the sensor device in a movement direction or along a movement trajectory, or vice versa;

wherein a distance between centres of adjacent poles of the magnetic structure varies along the movement direction or along the movement trajectory; and wherein the method comprises the steps of:
a) measuring at said first sensor location a first magnetic field component oriented in a first direction substantially parallel to said movement direction or tangential to said movement trajectory, and a second magnetic field component oriented in a second direction substantially perpendicular to the first direction;
b) determining a fine signal based on a ratio of said first and second magnetic field component measured at said first sensor location;
c) calculating a coarse signal based on at least said first and second magnetic field component; and
d) determining said position based on both the coarse signal and the fine signal.

12. The method according to claim 11, comprising the steps of:
a) measuring at a first sensor location a first magnetic field component oriented in a first direction, and a second magnetic field component oriented in a second direction perpendicular to the first direction;
b) determining a fine signal based on a ratio of said first and second magnetic field component measured at the first sensor location;
c) determining a coarse signal based on said first and second magnetic field component;
d) determining the position based on both the coarse signal and the fine signal.

13. A method according to claim 11, comprising the steps of:
a) measuring at a first sensor location, a first magnetic field component oriented in a first direction, and a second magnetic field component oriented in a second direction perpendicular to the first direction;
b) determining a first fine signal based on a first ratio of the first and second magnetic field component measured at the first sensor location;
c) measuring at a second sensor location, spaced from the first sensor location in the first direction, a third magnetic field component parallel with the first magnetic field component, and a fourth magnetic field component parallel with the second magnetic field component;
d) determining a second fine signal based on a second ratio of said third and fourth magnetic field component measured at said second location;
e) determining a coarse signal based on said first and second fine signal;
f) determining a third fine signal as the first fine signal, or as the second fine signal, or as a sum or average or weighted average of the first and the second fine signal;
g) determining the position based on both the coarse signal and the third fine signal.

14. A method according to claim 11, comprising the steps of:
a) measuring at a first sensor location, a first magnetic field component oriented in a first direction, and a second magnetic field component oriented in a second direction perpendicular to the first direction;
b) determining a first fine signal based on a first ratio of said first and second magnetic field component measured at the first location;
c) measuring at a second sensor location, spaced from the first sensor location in the first direction, a third magnetic field component parallel with the first magnetic field component, and a fourth magnetic field component parallel with the second magnetic field component;
d) optionally determining a second fine signal based on a second ratio of the third and fourth magnetic field component measured at the second location;
e) calculating a first gradient along the first direction based on the first and third magnetic field component, and calculating a second gradient along the first direction based on the second and fourth magnetic field component;
f) determining a coarse signal based on at least some of said magnetic field components and/or said magnetic field gradients;
g) determining a third fine signal as the first fine signal, or as the second fine signal, or as a sum or average or weighted average of the first and the second fine signal;
h) determining the position based on both the coarse signal and the third fine signal.

15. A method according to claim 11, comprising the steps of:
a) measuring three first magnetic field components oriented in a first direction at three different locations spaced apart along said first direction, and calculating two first gradients of these first magnetic field components;
b) measuring three magnetic field components oriented in a second direction perpendicular to the first direction at said three different locations, and calculating two second gradients of these second magnetic field components;
c) calculating a coarse signal based on these gradients;
d) calculating a fine signal based on one or more ratio, each ratio being a division of a first magnetic field component, and a corresponding second magnetic field component measured at the same location as the first magnetic field component;
e) determining said position based on the coarse signal and the fine signal.

* * * * *